United States Patent
Hasegawa

(10) Patent No.: US 7,548,306 B2
(45) Date of Patent: Jun. 16, 2009

(54) OPTICAL ENCODER, METHOD FOR PREPARING THE OPTICAL ENCODER, AND MOVING SPEED CONTROLLING DEVICE AND APPARATUS USING THE OPTICAL ENCODER

(75) Inventor: Koichi Hasegawa, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/213,743

(22) Filed: Jun. 24, 2008

(65) Prior Publication Data
US 2009/0002681 A1    Jan. 1, 2009

(30) Foreign Application Priority Data
Jun. 28, 2007    (JP) .............................. 2007-171122

(51) Int. Cl.
*G01P 3/36* (2006.01)
(52) U.S. Cl. ................... 356/28; 356/28.5; 356/139.04; 356/139.05; 356/141.2
(58) Field of Classification Search ....... 356/3.01–3.15, 356/4.01–4.1, 5.01–5.15, 6–22, 28, 28.5, 356/29
See application file for complete search history.

(56) References Cited

U.S. PATENT DOCUMENTS 7,187,305 B2 * 3/2007 Ellis et al. ..................... 341/14
2005/0189203 A1 * 9/2005 Kodani et al. ................. 200/14
2006/0250292 A1 * 11/2006 Yamagata .................... 341/192
2008/0001106 A1 * 1/2008 Igarashi et al. ............... 250/566

FOREIGN PATENT DOCUMENTS

| JP | 05-17511 | 3/1993 |
| JP | 3039605 | 7/1997 |
| JP | 2002-357457 | 12/2002 |
| JP | 2005-134763 | 5/2005 |

* cited by examiner

*Primary Examiner*—Thomas H Tarcza
*Assistant Examiner*—Luke D Ratcliffe
(74) *Attorney, Agent, or Firm*—Harness, Dickey & Pierce, P.L.C.

(57) ABSTRACT

An optical encoder including a sensor module including a light emitting member, a light receiving member opposite to the light emitting member to receive the emitted light, and at least one boss extending in a first direction; a shade member located between the light emitting member and the light receiving member and having a shading pattern; a first support supporting the sensor module and including at least one recessed portion engaged with the boss, and a groove connected with the recessed portion and extending in a second direction, wherein the sensor module is attached to the first support by being moved in the second direction while the boss is guided by the groove, and wherein the recessed portion has a depth greater than the height of the boss, and a portion of the groove adjacent to the recessed portion has a depth less than the height of the boss.

16 Claims, 44 Drawing Sheets

INSERTING DIRECTION

OUTPUT SIGNAL
FROM ENCODER

OPTICAL ENCODER, METHOD FOR PREPARING THE OPTICAL ENCODER, AND MOVING SPEED CONTROLLING DEVICE AND APPARATUS USING THE OPTICAL ENCODER

BACKGROUND OF THE INVENTION

1. Field of the Invention

The present invention relates to an optical encoder, and more particularly to an optical encoder having a sensor module including a light emitting element and a light receiving element. In addition, the present invention also relates to a moving speed controlling device for controlling the moving speed of a member and an apparatus (such as image forming apparatus), which use an optical encoder. Further, the present invention relates to a method for preparing an optical encoder.

2. Discussion of the Related Art

It is well known that in various conventional apparatus such as image forming apparatus, the moving speed of a moving member is detected with an optical encoder to control the moving speed according to the detection result. Optical encoders are classified into transmission type optical encoders and reflection type optical encoders.

Transmission type optical encoders typically include a sensor module including a light emitting element and a light receiving element; and a shade member (such as pulse code wheels) which moves together with a moving member and which has a predetermined pattern located between the light emitting member and the light receiving member to shade the light emitted by the light emitting element toward the light receiving element.

Reflection type optical encoders typically include a light emitting element for emitting light toward a moving member, and a light receiving element for receiving the light reflected from the moving member.

Transmission type optical encoders are superior to reflection type optical encoders in view of detection precision.

In image forming apparatus (such as copiers, facsimiles, and printers), the moving speed of a transfer belt, which feeds a receiving material such that a toner image formed on an image bearing member is transferred onto a predetermined portion of the receiving material, is detected with a transmission type optical encoder to be controlled at a predetermined speed as disclosed in a published unexamined Japanese patent application No. (hereinafter referred to as JP-A) 2005-134763. However, transmission type optical encoders have a drawback concerning assembling property such that it is not easy to precisely attach a sensor module (for use in a transmission type optical encoder) to an apparatus. Therefore, various proposals for properly attaching a sensor module (or a transmission type optical encoder) have been made.

A conventional method for attaching a sensor module for use in transmission type optical encoders will be explained by reference to FIGS. 1-4.

FIGS. 1-4 illustrate a background transmission type optical encoder.

Referring to FIG. 1, an optical encoder 101 includes a sensor module 102, and a pulse code wheel 103, which serves as a shade member and which moves together with a roller 105 (which is a moving member). The roller 105 has a shaft 106, which is rotatably supported by a frame 104 with a bearing 121 (illustrated in FIG. 4) therebetween. The pulse code wheel 103 is pressed into the shaft 106 to be fixed to the shaft.

Referring to FIG. 4, the sensor module 102 includes a light emitting member 107 and a light receiving member 108. The sensor module 102 has bosses 109 and 110 to be respectively fit into round recessed portions 111 and 112 formed on the frame 104.

As illustrated in FIG. 3, the sensor module 102 has holes 113 and 114, which are located on both the sides of the bosses 109 and 110. When the bosses 109 and 110 are fit into the recessed portions 111 and 112, the holes 113 and 114 are respectively linked with holes 115 and 116 (illustrated in FIG. 2) formed on the frame 104. Rivets 117 and 118 are inserted to the linked holes 113-115 and the other linked holes 114-116, respectively, such that the sensor module 102 is fixed to the frame 104.

As illustrated in FIG. 4, in the state in which the sensor module 102 is fixed to the frame 104, the pulse code wheel 103 enters into a space formed by the light emitting member 107 and the light receiving member 108.

The roller 105 rotatably supports a transfer belt (not shown) whose moving speed is to be controlled. In addition, optical modulation tracks (which are not shown in FIGS. 1-8 and which are similar to patterns 50a illustrated in FIG. 18A) are provided on the pulse code wheel 103, and the optical modulation tracks are detected with the sensor module 102 to determined the moving speed of the roller (i.e., the moving speed of the transfer belt). The moving speed of the transfer belt can be controlled at a predetermined speed by performing feedback controlling.

The sensor module 102 is poor in assembling property. The reason therefor will be explained by reference to FIGS. 2 and 4.

When assembling the sensor module 102, at first, the shaft 106 is fixed to the frame 104 with the bearing 121 therebetween. Next, the pulse code wheel 103 is pressed into the shaft 106 to be fixed, and the bosses. 109 and 110 are fit into the recessed portions 111 and 112, respectively, followed by positioning of the sensor module 102. The thus positioned sensor module 102 is fixed to the frame 104 using the rivets 117 and 118. In this assembling operation, it is not easy to press the pulse code wheel 103 into the shaft 106 while fixing the sensor module 102 to the frame 104 such that the pulse code wheel 103 is properly arranged in the space formed by the light emitting member 107 and the light receiving member 108.

Since the pulse code wheel 103 is typically a thin plate made of a material such as metals, resins and glass, a problem which occurs is that the pulse code wheel is contacted with the sensor module 102 in this assembling operation, there by deforming or damaging the pulse code wheel.

In attempting to easily perform the assembling operation, a method in which at first the pulse code wheel 103 is pressed into the shaft 106 to be positioned (i.e., to be fixed to the shaft), and then sensor module 102 is fixed to the frame 104 can be used. In this assembling operation, it is possible that the sensor module is contacted with the fixed pulse code wheel, thereby deforming or damaging the pulse code wheel.

In attempting to prevent such a wheel deforming/damaging problem, a method in which the distance between the light emitting member 107 and the light receiving member 108 is increased can be used. However, in this case the sensing property of the sensor module 102 deteriorates. Therefore, the method is not preferable.

Therefore, a technique of properly positioning a pulse code wheel in the space formed between a light emitting member and a light receiving member using a jig has been used for assembling a sensor module. This technique has a drawback in that the time needed for assembling the sensor module increases.

FIG. 6 illustrates another background transmission type optical encoder. This encoder has a long recessed portion 119 to be engaged with the bosses 109 and 110 instead of the round recessed portions 111 and 112. This optical encoder also has the same drawback as mentioned above.

FIGS. 7 and 8 illustrate another background transmission type optical encoder, which remedies the drawback.

This optical encoder has a recessed portion 120, which is to be engaged with the bosses 109 and 110 and which extends to the edge of the frame 104. When assembling the encoder, at first the shaft 106 is fixed to the frame 104 with the bearing 121 therebetween, and then the pulse code wheel 103 is pressed into the shaft to be fixed thereto. Thereafter, the sensor module 102 is attached to the frame 104 from a direction perpendicular to the shaft 106 (i.e., from the inserting direction indicated by an arrow in FIG. 8). In this inserting operation, the bosses 109 and 110 are guided by the recessed portion 120, and therefore it is possible to perform the assembling operation by merely attaching the sensor module 102 while pressing the sensor module toward the surface of the frame 104. The inserting operation is completed when the boss 109 is contacted with the end of the recessed portion 120. The sensor module 102 is then fixed to the frame 104 using the rivets 117 and 118. Therefore, the wheel deforming/damaging problem is hardly caused.

Optical encoders having a structure similar to the structure illustrated in FIGS. 7 and 8 are disclosed in JP-As 2002-357457 and 2006-129692.

However, the encoder illustrated in FIGS. 7 and 8 has the following drawback.

Specifically, when an optical encoder having such a structure is set as a speed controlling device in an image forming apparatus to control the moving speed of a transfer belt, fixation of the sensor module to the frame 104 deteriorates after long repeated used due to loosening of the rivets 117 and 118 caused by vibration of the image forming apparatus, etc. In this case, a problem in that the position of the sensor module 102 relatively to the frame 104 changes occurs.

More specifically, right after the image forming apparatus is assembled (i.e., the sensor module 102 is attached to the frame 104), the boss 109 is contacted with the end of the recessed portion 120 and thereby the sensor module 102 is properly positioned. However, after long repeated use, the rivets 117 and 118 deteriorate due to vibration, etc., there by deteriorating fixation of the sensor module to the frame 104, resulting in releasing of the boss 109 from the end of the recessed portion 120. In this case, the position of the light emitting member 107 and the light receiving member 108 relative to the pulse code wheel 103 changes, and there by a problem in that the signals, which the sensor module 102 obtains from the rotated pulse code wheel 103 (i.e., the rotated shaft 106), have an error or the sensor module 102 causes misdetection is caused. Therefore, the function of the sensor module 102 cannot be properly fulfilled, resulting in deterioration of image qualities and failure in the image forming apparatus. In addition, when the sensor module 102 is fixed to the frame using the rivets 117 and 118, the fixing operation has to be performed while pressing the sensor module in the inserting direction, resulting in increase of the assembling time. The same is true for the cases where the sensor module is attached to apparatuses other than image forming apparatuses, or the sensor module is fixed using screws instead of the rivets.

Because of these reasons, a need exists for an optical encoder having a sensor module, which can be easily set to an apparatus without damaging the shade member thereof (such as pulse code wheels) and in which the sensor module can maintain the position thereof even after long repeated use.

SUMMARY OF THE INVENTION

As an aspect of the present invention, an optical encoder for detecting a speed of a moving member is provided, which includes:

a sensor module including:

a light emitting member configured to emit light, a light receiving member opposed to the light emitting member in a first direction to receive the light emitted from the light emitting member, and at least one boss;

a shade member having a shading pattern, which has a light shading portion and a light transmitting portion and which is located between the light emitting member and the light receiving member to block the light, wherein one of the sensor module and the shade member moves together with the moving member so that the sensor module detects the speed of the moving member; and a first support configured to support the sensor module, including:

at least one recessed portion, which is engaged with the at least one boss to support the sensor module, and a guide groove, which is connected with the at least one recessed portion and which extends in a second direction, wherein the sensor module is attached to the first support by being moved in the second direction while the at least one boss is guided by the guide groove, and wherein the at least one recessed portion has a depth in the first direction greater than a height of the at least one boss, and at least a portion of the guide groove adjacent to the recessed portion has a depth in the first direction less than the height of the at least one boss.

As another aspect of the present invention, a moving speed controlling device is provided, which includes:

the optical encoder mentioned above, which is configured to detect the speed of the moving member; and a controller configured to control the speed of the moving member according to a detection result of the optical encoder.

As yet another aspect of the present invention, an apparatus is provided which includes:

a moving member;

the moving speed controlling device mentioned above, which is configured to control a speed of the moving member; and a second support configured to support the shade member of the optical encoder of the moving speed controlling device.

The first support can serve as the second support.

As a further aspect of the present invention, a method for preparing the optical encoder mentioned above, which includes:

setting the shade member;

moving the sensor module in the second direction while pressing the sensor module in the first direction so that the at least one boss is engaged with the at least one recessed portion after sliding on the groove and the shade member enters into a space formed by the light emitting member and the light receiving member of the sensor module; and fixing the sensor module to the first support.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Figure 9:
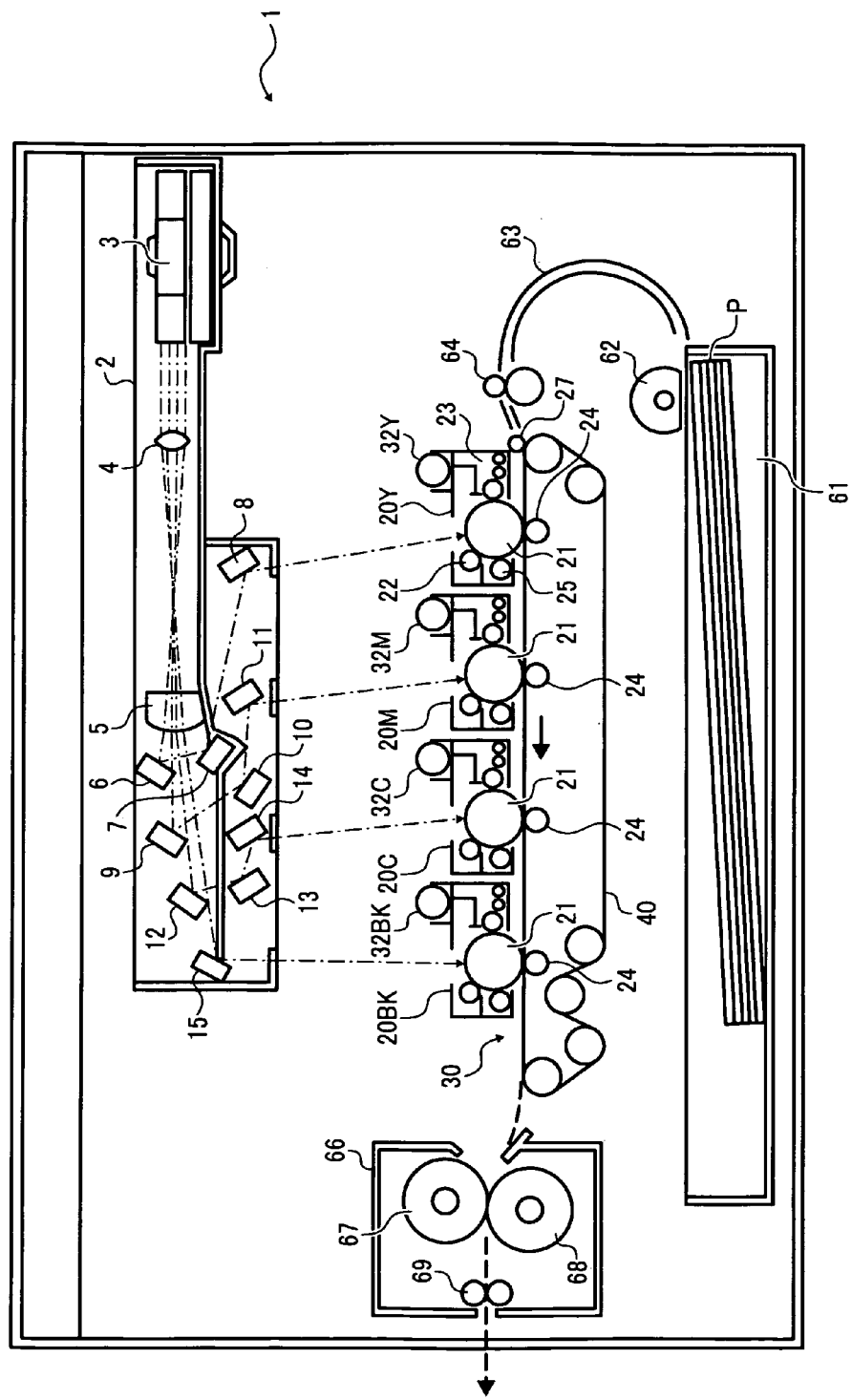
FIG. 9 is a schematic front view of an apparatus (an image forming apparatus) of an embodiment of the present invention, which includes an optical encoder and a moving speed controlling device of the present invention.
Figure 10:
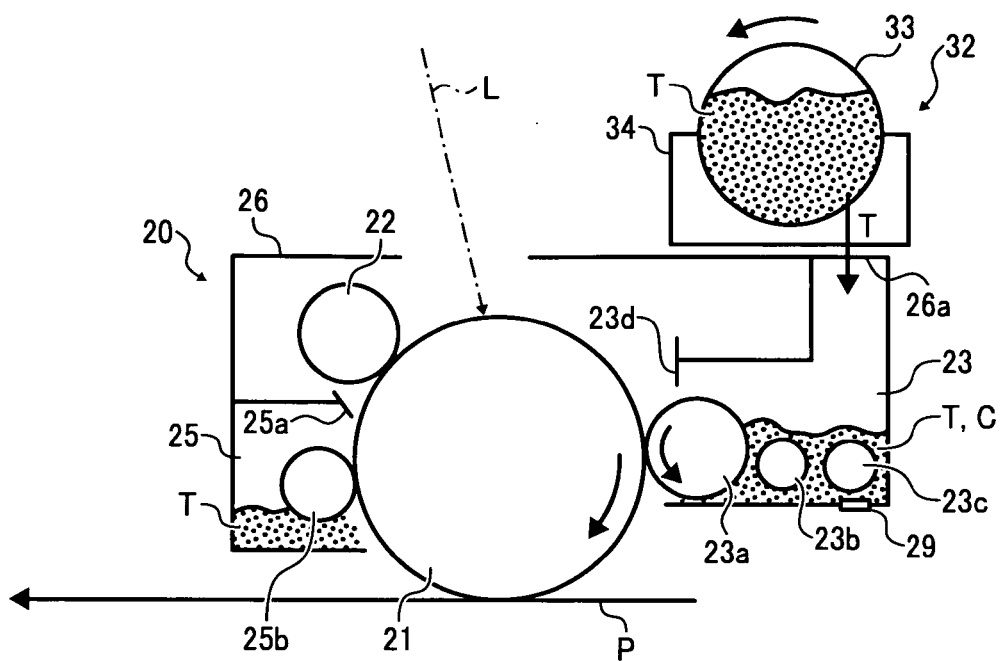
FIG. 10 is an enlarged view of the image forming section of the image forming apparatus illustrated in FIG. 9.
Figure 11:
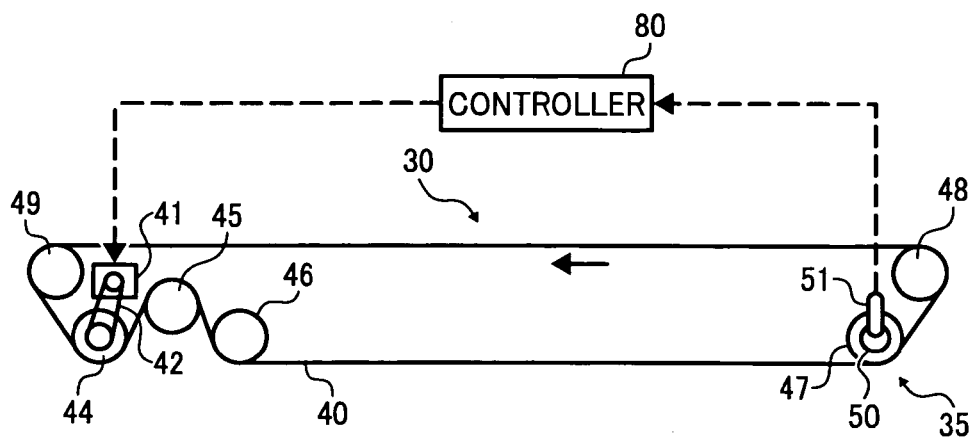
FIG. 11 is a schematic view of the moving speed controlling device of the image forming apparatus illustrated in FIG. 9.

FIG. 9 illustrates an optical encoder, a moving speed controlling device and an image forming apparatus of embodiments of the present invention, and FIGS. 10 and 11 are schematic views of the image forming section and the moving speed controlling device thereof, respectively. The image forming apparatus is a color laser printer. However, the image forming apparatus is not limited thereto and can be another printer (such as monochrome printers), a copier, a facsimile and a multifunctional image forming apparatus having two or more of printing, copying and facsimileing functions.

Referring to FIG. 9, an image forming apparatus 1 (i.e., a color laser printer) forms an image on a sheet of a receiving material P. Specific examples of the materials of the receiving material P include plain papers, thick papers, plastics (such as overhead projection sheets), etc. The image forming apparatus 1 can form images on sheets of various sizes.

The image forming apparatus 1 includes an optical unit 2 serving as a light irradiating device for irradiating a laser light beam to write an electrostatic image on an image bearing member; and four process cartridges 20 (20Y, 20M, 20C and 20BK), which serve as image forming devices and which include respective photoreceptor drums 21 serving as the image bearing member.

The image forming apparatus 1 further includes a transfer device, which includes a transfer belt unit 30 including a transfer belt 40 for feeding the receiving material sheet P to the process cartridges 20 and a transfer roller 24 contacted with an inner surface of the transfer belt 40 to transfer the images formed on the photoreceptor drums 21 to the receiving material sheet P.

In addition, the image forming apparatus 1 includes a cleaner 25 for collecting toner particles remaining on the surface of the photoreceptor drums 21 to clean the surface; toner supplying units 32 (32Y, 32M, 32C and 32BK) for supplying respective color toners to developing devices 23 of the process cartridges 20; a receiving material storing/feeding device 61 for storing and feeding sheets of the receiving material P; and a fixing device 66 for fixing the toner image on a sheet of the receiving material P.

FIG. 10 is an enlarged view of the image forming section of the image forming apparatus illustrated in FIG. 9. Referring to FIG. 10, each of the process cartridge 20 includes the photoreceptor drum 21, a charger 22 for charging the photoreceptor drum 21, the developing device 23 for developing an electrostatic image formed on the photoreceptor drum 21 with a developer including a color toner, the cleaner 25, etc. The process cartridge 20 is detachably attached to the image forming apparatus 1 as a unit. Thus, yellow, magenta, cyan and black color toner images are formed on the respective photoreceptor drums 21.

The transfer belt unit 30 includes the transfer belt 40, which is rotated in a direction indicated by an arrow in FIG. 9 (i.e., counterclockwise) while tightly stretched by plural driven rollers. The details of the transfer belt unit 30 will be explained later.

Next, the image forming operation of the image forming apparatus 1 will be explained by reference to drawings.

Referring to FIG. 9, the four photoreceptor drums 21 rotate clockwise. The circumferential surfaces of the photoreceptor drums 21 are uniformly charged with the respective chargers 22 at respective charging positions where the photoreceptor drums are opposed to the chargers. Since the photoreceptor drums 21 rotate, the charged portions of the photoreceptor drums reach respective light irradiation positions, at which the optical unit 2 irradiates the charged photo receptor drums with respective light beams modulated by image information of the respective color images to be reproduced.

The optical unit 2 includes a light source (not shown, such as laser diodes) emitting light beams according to the image signals of the color images to be reproduced. The thus emitted laser beams are reflected from the surface of a polygon mirror 3, and then pass through lenses 4 and 5. The laser beams then irradiate the surfaces of the respective charged photoreceptor drums 21 after passing respective light paths, thereby forming electrostatic latent images corresponding to the respective color images to be reproduced. Specifically, a laser beam corresponding to the yellow image to be reproduced irradiates the surface of the charged photo receptor drum 21Y after reflected from mirrors 6, 7 and 8. In this regard, since the laser beam is reflected from the surface of the polygon mirror rotated at a high speed, the laser beam scans the photoreceptor drum 21 in a main scanning direction parallel to the axis of the photoreceptor drum while the photoreceptor drum 21 is rotated in a sub-scanning direction. Thus, an electrostatic latent image corresponding to the yellow image to be reproduced is formed on the surface of the photoreceptor drum 21Y.

Similarly, a laser beam corresponding to the magenta image to be reproduced irradiates the surface of the charged photoreceptor drum 21M after reflected from mirrors 9, 10 and 11, resulting in formation of an electrostatic latent image corresponding to the magenta image on the surface of the photo receptor drum 21M. In addition, a laser beam corresponding to the cyan image to be reproduced irradiates the surface of the charged photoreceptor drum 21C after reflected from mirrors 12, 13 and 14, resulting in formation of an electrostatic latent image corresponding to the cyan image on the surface of the photoreceptor drum 21C. Further, a laser beam corresponding to the black image to be reproduced irradiates the surface of the charged photoreceptor drum 21BK after reflected from a mirror 15, resulting in formation of an electrostatic latent image corresponding to the black image on the surface of the photoreceptor drum 21BK.

Since the photoreceptor drums 21 rotate, the electrostatic latent images of the photoreceptor drums reach respective development positions, at which the developing devices 23 are opposed to the respective electrostatic latent images. In this developing process, the developing devices 23 supply the respective color toners to the electrostatic latent images, resulting in formation of yellow, magenta, cyan and black color toner images on the respective photoreceptor drums 21Y, 21M, 21c and 21BK.

After the developing process, the photoreceptor drums 21 reach respective transfer positions, at which the photoreceptor drums are opposed to the transfer belt 40. At the transfer positions, the transfer rollers 24 are arranged so as to press the transfer belt 40 to the respective photoreceptor drums 21. Specifically, the color toner images formed on the respective photoreceptor drums 21 are transferred one by one, by the respective transfer rollers 24, to the proper positions of the receiving material sheet P fed by the transfer belt 40.

After the transfer process, the surfaces of the photoreceptor drums 21 are cleaned by the cleaner 25 at the cleaning positions where the photoreceptor drums are opposed to the respective cleaners, and the color toner particles remaining on the photoreceptor drums 21 are collected. Thus, the cleaning process is performed.

After the cleaning process, the photoreceptor drums 21 are subjected to a discharging process in which the charges remaining on the photoreceptor drums are removed with a discharging device such that the photoreceptor drums are ready for the next image forming processes. Thus, a series of toner image forming processes is completed.

On the other hand, a feeding roller 62 of the receiving material storing/feeding section 61 feeds a sheet of the receiving material P toward a guide 63. The receiving material sheet P is guided to a registration roller 64 by the guide 63. The receiving material sheet P is timely fed by the registration roller 64 to a contact point of the transfer belt 40 with a suction roller 27. The receiving material sheet P is then fed by the transfer belt 40 toward the four transfer positions, at which the different color toner images on the respective photoreceptor drums are transferred to the receiving material sheet P one by one, resulting in formation of a combined multi-color toner image, in which, yellows magenta, cyan and black toner images are overlaid.

The receiving material sheet P bearing the combined multi-color toner image thereon is released from the transfer belt 40 and is then fed to the fixing device 66. In the fixing device 66, the combined multi-color toner image is fixed to the receiving material sheet P at a nip formed by a heat roller 67 and a pressure roller 68, resulting in completion of the fixing process.

After the fixing process, the receiving material sheet P bearing the fixed toner image thereon is discharged from the image forming apparatus 1 by a discharging roller 69. Thus, a series of image forming processes is completed, and a full color image is produced.

Next, the process cartridges 20 will be explained by reference to FIG. 10. Since the process cartridges have the same structure except that the toners contained in the toner supplying units are different in color, one of the process cartridges will be explained without using the suffixes (i.e., Y, M, C and BK).

Referring to FIG. 10, in the process cartridge 20, the photoreceptor drum 21, charger 22, developing device 23 and cleaner 25 are set in a case 26 as a unit.

The developing device 23 includes a developing roller 23a, two agitating rollers 23b and 23c, a doctor blade 23d, a toner concentration sensor 29, etc., and a developer including a carrier C and a color toner T is contained in the developing device 23.

The cleaner 25 includes a cleaning blade 25a, a cleaning roller 25b, etc.

The toner image forming process mentioned above will be explained in detail.

The developing roller 23a is counterclockwise rotated as illustrated in FIG. 10. The toner T in the developing device 23 is mixed and agitated with the carrier C by the agitating rollers 23b and 23c together with the toner T supplied from a toner bottle 33 of the toner supplying unit 32, and thereby the toner T is charged by the carrier C. The developer including the charged toner T and the carrier C is fed toward the developing roller 23a by the agitating roller 23b.

Since the toner T in the developing device 23 is used for forming toner images, the concentration of the toner T in the developer decreases. In order to control the toner concentration in the developing device 23 within a predetermined range, the toner T in the toner bottle 33 is properly supplied to the developing device 23 through openings 26a. The concentration of the toner T in the developer in the developing device 23 is measured with a sensor 29, which can measure the toner concentration by measuring the magnetic permeability of the developer. Numeral 34 denotes a support for rotatably supporting the toner bottle 33 such that the toner bottle can be rotated in the direction indicated by an arrow in FIG. 10.

The developer which includes the toner T and which is borne by the developing roller 23a, is transported to the developing region where the developing roller 23a is opposed to the photoreceptor drum 21 after being scraped with the doctor blade 23d. In the developing region, the toner in the developer is adhered to the electrostatic latent image formed on the photoreceptor 21. Specifically, the toner T is adhered to the surface of the photoreceptor drum 21 due to an electric field formed by the potential difference between irradiated portions of the photoreceptor drum exposed to the laser beam and non-irradiated portions thereof not exposed to the laser beam, resulting in formation of a toner image.

Almost all the toner adhered to the surface of the photoreceptor drum 21 is transferred onto the receiving material sheet P. The toner T remaining on the surface of the photoreceptor drum 21 without being transferred is collected by the cleaning blade 25a and the cleaning roller 25b, and the collected toner T is stored in the cleaner 25.

The structure and performance of the transfer belt unit 30 will be explained by reference to FIG. 11.

FIG. 11 illustrates an example of the moving speed controlling device of the present invention. Referring to FIG. 11, the transfer belt unit 30 includes the transfer belt 40, a driving roller 44, plural driven rollers 45, 46, 47, 48 and 49, a driving motor 41, a controller 80, etc. The transfer belt 40 is rotated by the driving roller 44 while tightly stretched by the rollers 44-49. The driving force of the driving motor 41 is transmitted to the driving roller 44 via a driving belt 42. Since the driving roller 44 is counterclockwise rotated in FIG. 11, the transfer belt 40 is rotated in the direction indicated by the arrow. The driven roller 45 is clockwise rotated and the driven rollers 46-49 are counterclockwise rotated while driven by the rotated transfer belt 40.

An optical encoder 35, which is a rotary encoder, is integrally provided on the driven roller 47 among the plural driven rollers 45-49. The optical encoder 35 includes a pulse code wheel 50, a transmission type photo-sensor 51 serving as a sensor module, a substrate 52 (illustrated in FIGS. 12 and 13), etc.

The optical encoder 35 determines the rotating speed (i.e., the moving speed) of the transfer belt 40 by measuring the rotating speed of the pulse code wheel 50. The controller 80 performs feedback controlling, i.e., the controller controls driving of the driving motor 41 on the basis of the detected rotation speed of the pulse code wheel (i.e., the moving speed of the transfer belt) so that the transfer belt 40 is moved at the predetermined speed.

Figure 12:
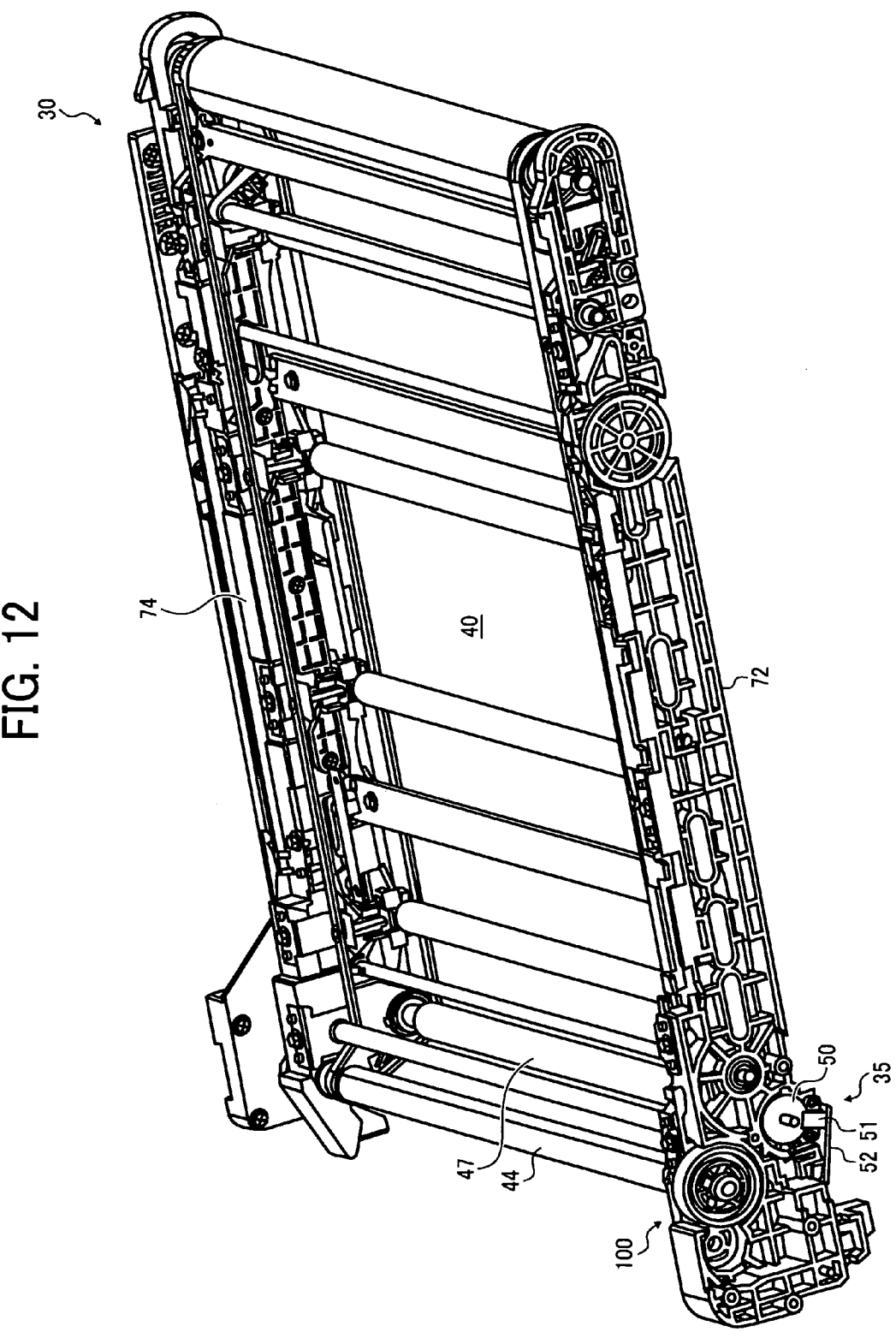
FIG. 12 is a schematic perspective view of the transfer belt unit of the image forming apparatus illustrated in FIG. 9.

The structure and performance of the transfer belt unit 30 will be explained by reference to FIGS. 12 to 46. In FIGS. 12 to 46, the positions of the driving roller 44 and the driven roller 47, and the positional relationships between the constitutional members are different from those in FIG. 11. In addition, although the driving force of the driving motor 41 is transmitted using the transfer belt 42 in FIG. 11, the driving force is transmitted to the driving roller 44 using a gear 100 in FIG. 12. In FIG. 12, only a part of the transfer belt 40 is illustrated.

FIRST EXAMPLE OF TRANSFER BELT UNIT

An example of the transfer belt unit 30 will be explained by reference to FIGS. 12 to 22.

Figure 13:
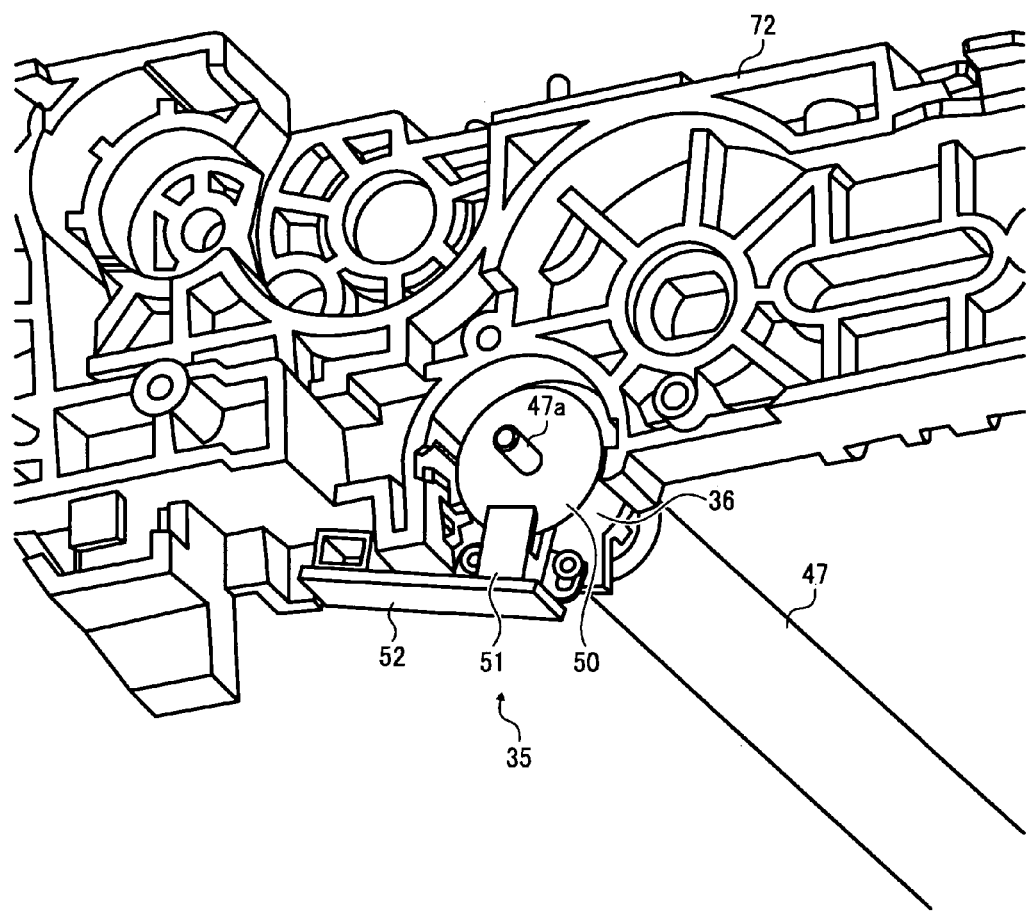
FIG. 13 is a schematic perspective view of an example of the optical encoder of the image forming apparatus illustrated in FIG. 9.
Figure 14:
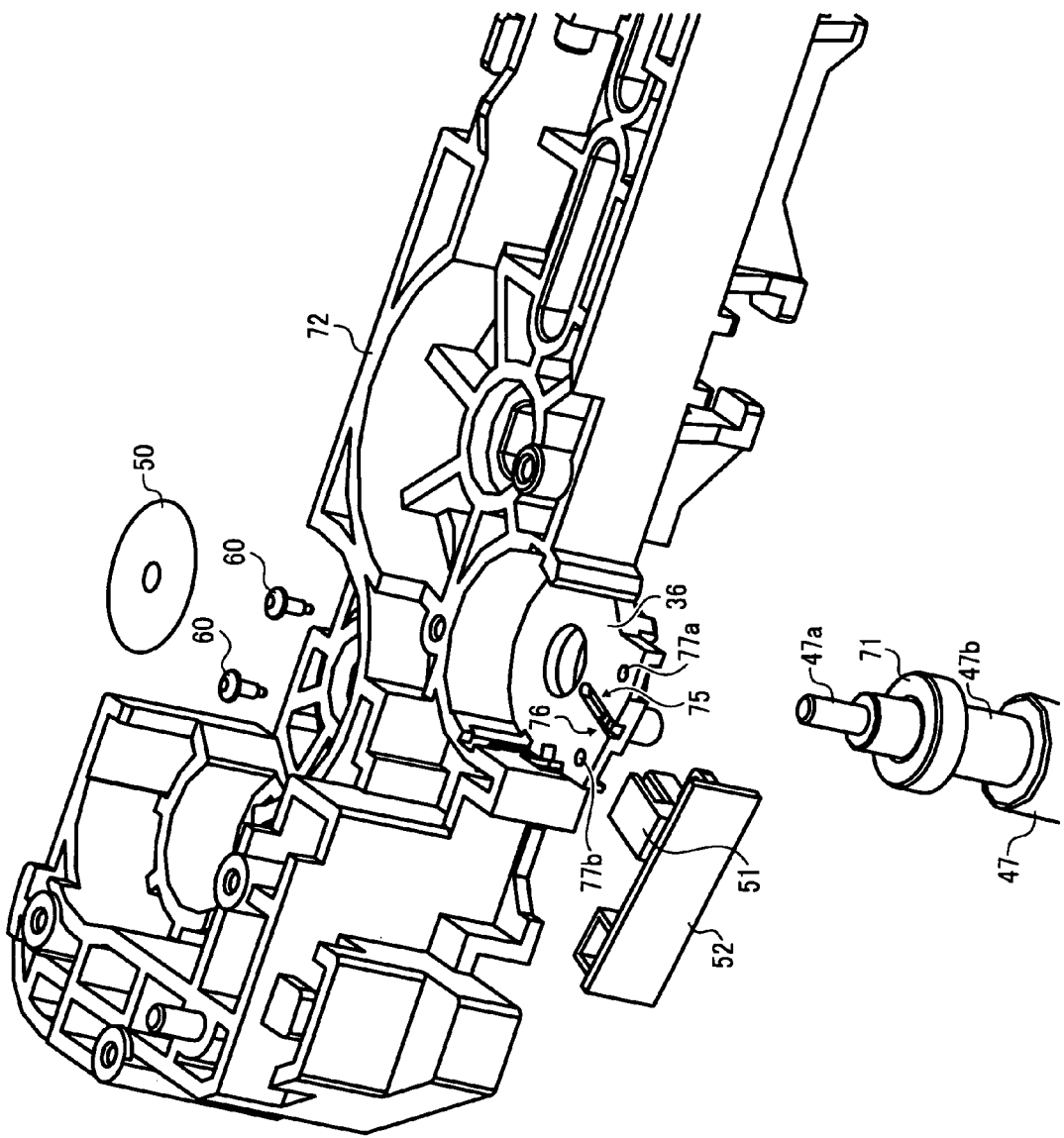
FIGS. 14-16 are schematic exploded views and a front view of the optical encoder illustrated in FIG. 13.
Figure 15:
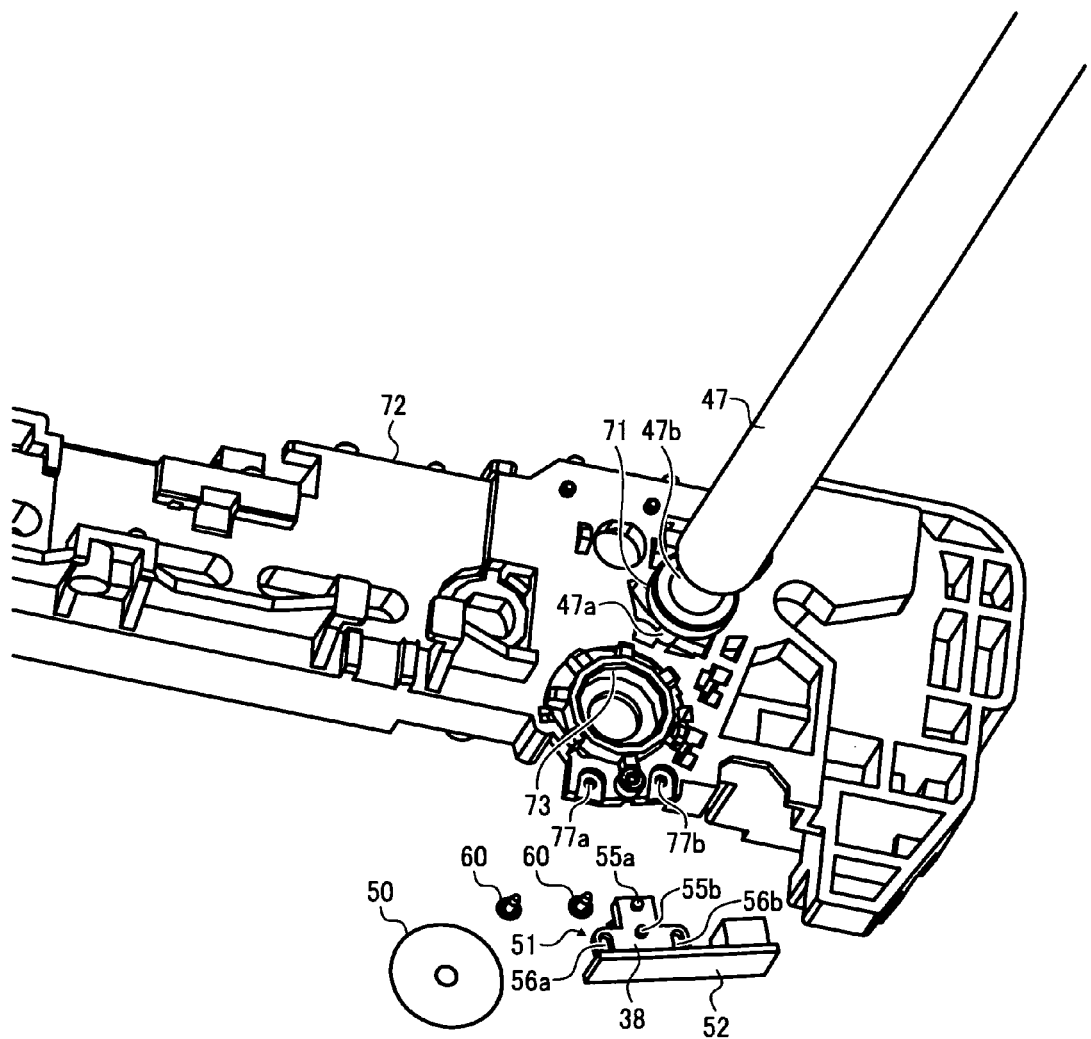
Figure 16:
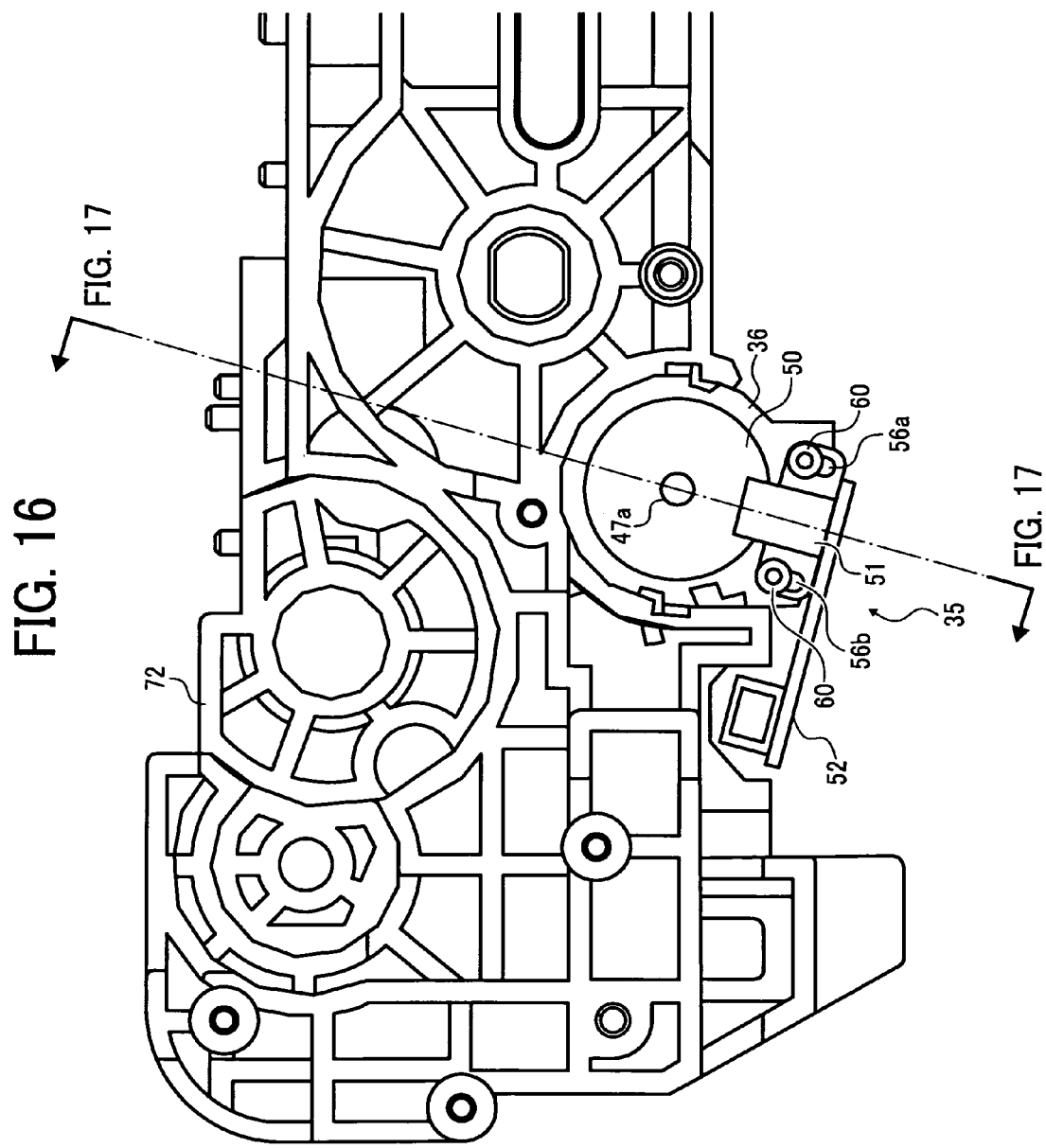
Figure 17:
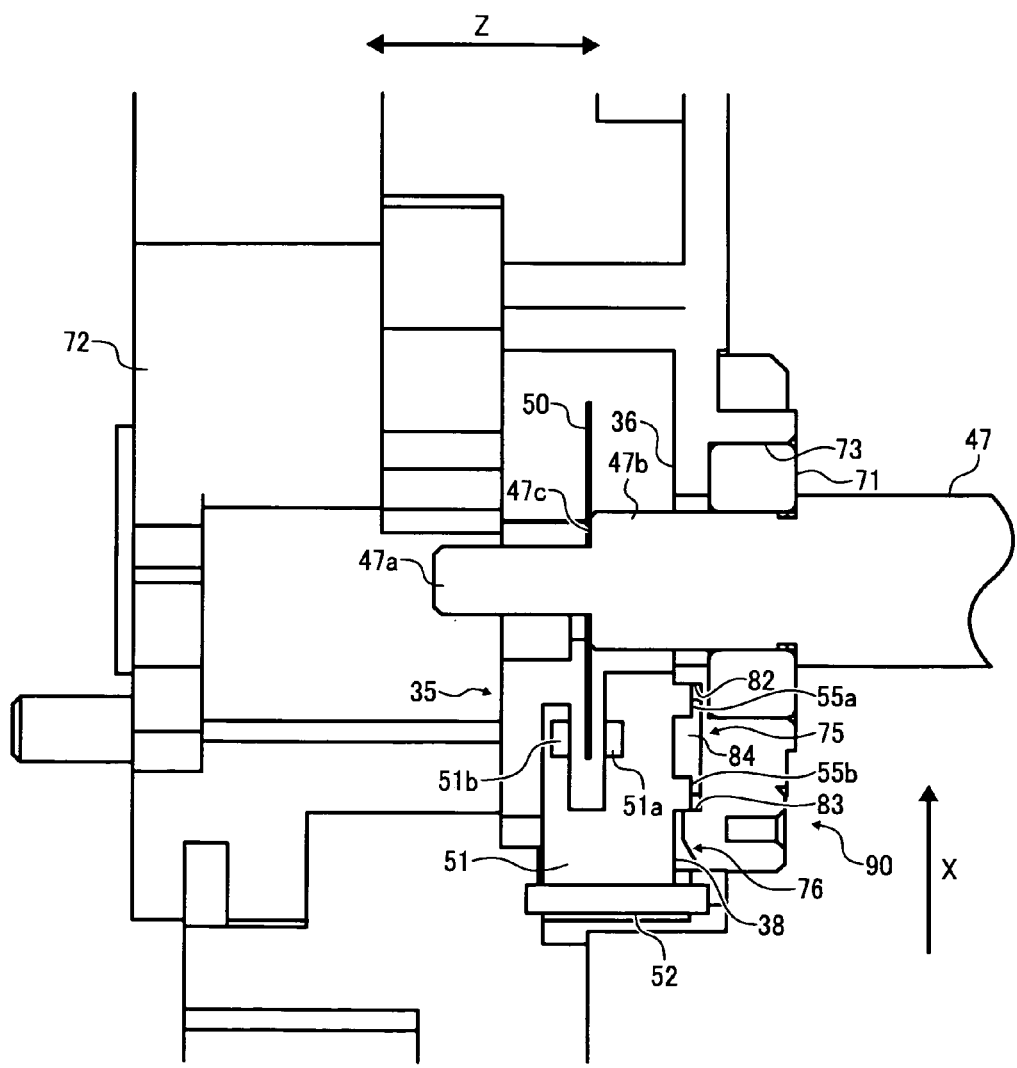
FIG. 17 is a schematic cross-sectional view of the optical encoder at the cut surface illustrated by a chain line in FIG. 16.

FIG. 12 is a perspective view of the first example of the transfer belt unit 30. FIG. 13 is an enlarged view illustrating the driven roller 47, on which the optical encoder 35 is provided, and the vicinity thereof. FIGS. 14 and 15 are exploded perspective views of the portion illustrated in FIG. 13 when observing the portion from the front side (FIG. 14) and from the inner side (FIG. 15). FIG. 16 is a front view of the portion illustrated in FIG. 13 when observing the portion from the front side. FIG. 17 is a cross-sectional view obtained by cutting the portion at a cut surface illustrated by a chain line in FIG. 16 and illustrating the photo-sensor attached to a support (i.e., frame).

Referring to FIGS. 12 to 16, a bearing 71 (illustrated in FIG. 15), into which a portion 47a of the shaft of the driven roller 47 is inserted upon application of pressure thereto to be fixed, is press-fit into a recessed portion 73 of a frame 72 upon application of a low pressure. Thus, the driven roller 47 is set to the frame 72. It is not illustrated, but the other end of the driven roller 47 is set to another frame 74 (illustrated in FIG. 12) using a bearing, which is the same as the bearing 71. Thus, the driven roller 47 is supported by the frames 72 and 74 via the bearings 71. The driven roller 47 is made of a material such as stainless steels.

Referring to FIG. 17, the photo-sensor 51 includes a light emitting member 51a serving as a light emitting element, and a light receiving member 51b, which serves as a light receiving element and which is opposed to the light emitting member 51a, bosses 55a and 55b, which are formed on a contact surface 38 of the photo-sensor 51 contacted with the frame 72 and which extend toward the frame 72 (i.e., in a direction Z), and elongated holes 56a and 56b (illustrated in FIGS. 15 and 16), which are formed on both sides of the bosses 55a and 55b, respectively. The contact surface 38 is a reference plane, and the height of the bosses 55a and 55b is measured on the basis of the contact surface.

Referring to FIG. 14, the frame 72 serving as a support has a surface 36 having a recessed portion 75 to be engaged with the bosses 55a and 55b, and holes 77a and 77b formed on both the sides of the recessed portion 75. The distance between the elongated holes 56a and 56b is equal to the distance between the holes 77a and 77b. The recessed portion 75 extends in a direction X (illustrated in FIG. 17).

Referring to FIG. 17, the contact surface 38 of the photo-sensor 51 is contacted with the surface 36 of the frame 72 when the bosses 55a and 55b are engaged with the recessed portion 75.

When the photo-sensor 51 is set such that the holes 56a and 56b are connected with the holes 77a and 77b, respectively, the bosses 55a and 55b are engaged with the recessed portion 75. This is the home position of the photo-sensor 51, and the photo-sensor 51 is fixed to the frame 72 using rivets 60 and 60 (such as nylon rivets).

Referring to FIG. 17, the driven roller 47 has a shaft having the first portion 47a and a second portion 47b having a larger diameter than the first portion at the end thereof. The second shaft 47b is connected with the driven roller 47 and has a smaller diameter than the driven roller 47. The first portion 47a is connected the second portion 47b. The pulse code wheel 50 is fit into the first portion 47a upon application of a relatively low pressure thereto. The pulse code wheel 50 is adhered to an end surface 47c of the second portion 47b using an adhesive tape (not shown). The bearing 71 is fit into the second portion 47b upon application of pressure thereto so as to be contacted with the end of the main body of the driven roller 47. Thus, the pulse code wheel 50 is supported by the frame 72 via the bearing 71 and the driven roller 47.

When the photo-sensor 51 acquires the home position, the outer portion of the pulse code wheel 50 is located between the light emitting member 51a and the light receiving member 51b. By fixing the photo-sensor 51 to the frame 72 using the rivets 60 and 60, the photo-sensor 51 can maintain the home position.

Next, the pulse code wheel 50 and the photo-sensor 51 will be explained by reference to drawings.

Figure 18A:
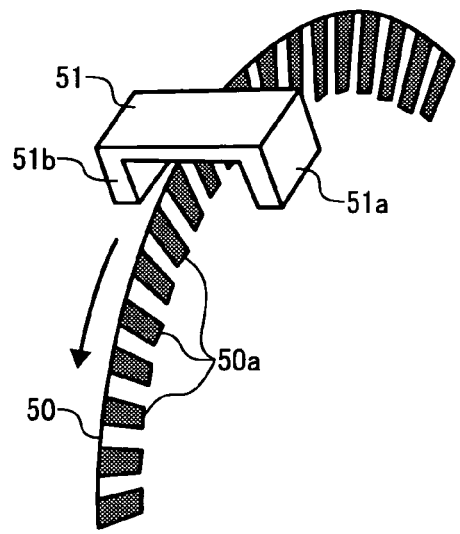
FIG. 18A is a schematic view illustrating the positional relationship between the sensor module and the shade member of the optical encoder of the present invention.
Figure 18B:
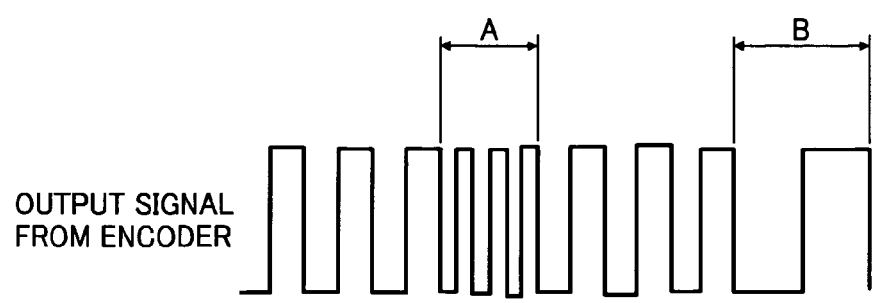
FIG. 18B is a schematic view illustrating a signal output from the optical encoder of the present invention.

FIGS. 18A and 18B respectively illustrate the positional relationship between the pulse code wheel 50 and the photo-sensor 51, and a signal output from the photo-sensor.

The pulse code wheel 50 is made of a flexible material such as polyethylene terephthalate (PET) and having a thickness of about 0.2 mm. As illustrated in FIG. 18A, black portions 50a serving as codes (shading pattern) are radially formed on a surface of an outer portion of the pulse code wheel 50. Thus, light shielding portions (i.e., the black portions 50a) and light transmitting potions, which are sandwiched by the black portions 50a, are alternately formed on the outer portion of the pulse code wheel, thereby forming light modulating tracks. The black portions 50a are typically prepared by a pattern drawing method using photo-resist. The pulse code wheel 50 is arranged such that the black portions 50a are present between the light emitting member 51a and the light receiving member 51b as illustrated in FIG. 18A.

When one of the black portions 50a shields the light emitting member and the light receiving member, the output from the photo-sensor is HIGH, and when one of the light transmitting potions is present between the light emitting member and the light receiving member, the output from the photo-sensor is LOW. The position of the photo-sensor 51 is adjusted such that the output can be well produced.

The pulse code wheel 50 is rotated together with the driven roller 47, which is rotated together with the transfer belt 40. Therefore, the controller 80 can determine the rotation speed of the pulse code wheel 50, the driven roller 47 and the transfer belt 40 on the basis of the intervals between waves of the output signal from the encoder, which is obtained by converting the signal output from the photo-sensor 51.

Specifically, the controller 80 determines that the rotation speeds of the pulse code wheel 50, the driven roller 47 and the transfer belt 40 are fast when the signal has a wave form A (the intervals of waves are relatively narrow) illustrated in FIG. 18B. In contrast, the controller determines that the rotation speeds are slow when the signal has a wave form B (the intervals of waves are relatively wide). Thus, the controller 80 determines the variation in rotation speed or rotation angle of the driven roller 47 and the transfer belt 40 on the basis of the results of detection of the black portions 50a by the photo-sensor 51.

The information concerning the rotation variation thus obtained by the controller 80 is fed back to the driving motor 41. Specifically, when the controller 80 determines that the rotation speed of the driven roller 47 (or the transfer belt 40) is slower than the predetermined speed, the controller increases the driving speed of the driving motor 41. In contrast, when the controller 80 determines that the rotation speed of the driven roller 47 (or the transfer belt 40) is faster than the predetermined speed, the controller decreases the driving speed of the driving motor 41. Thereby, the moving speed of the transfer belt 40 is stabilized, resulting in prevention of occurrence of a misalignment problem in that color toner images are not transferred onto the predetermined positions, resulting in formation of a misaligned color toner image on a receiving material sheet.

Thus, the pulse code wheel 50 serves as a shade member and has black portions 50a serving as a shading pattern. In addition, the frame 72 serves as a support (second support) supporting the pulse code wheel 50 via the driven roller and the bearing 71 while serving as a counterpart of the photo-sensor 51 (i.e., a first support for supporting the photo-sensor) because the photo-sensor is positioned on the basis of the frame 72 in this sample.

As illustrated in FIG. 17, the optical encoder 35 of the present invention includes a sensor module 90 in which the photo-sensor 51 is positioned relative to the frame 72 by engaging the bosses 55a and 55b with the recessed portion 75.

The transfer belt 40 and the driven roller 47 are a moving member which moves together with the pulse code wheel 50, and the rotation speed (or moving speed) thereof is determined by the optical encoder 35.

The frame 72 serves as a counterpart (i.e., a first support) of the photo-sensor 51 and the photo-sensor is positioned on the basis of the frame. In addition, the frame 72 serves as a second support for supporting the pulse code wheel 50, the driven roller 47 and the transfer belt 40.

The transfer belt unit 30 serves as a moving speed controlling device, which performs the above-mentioned feedback controlling to control the rotation speed (or moving speed) of the moving member (such as the transfer belt 40 and the driven roller 47).

The sensor module 90 will be explained in detail.

Figure 19:
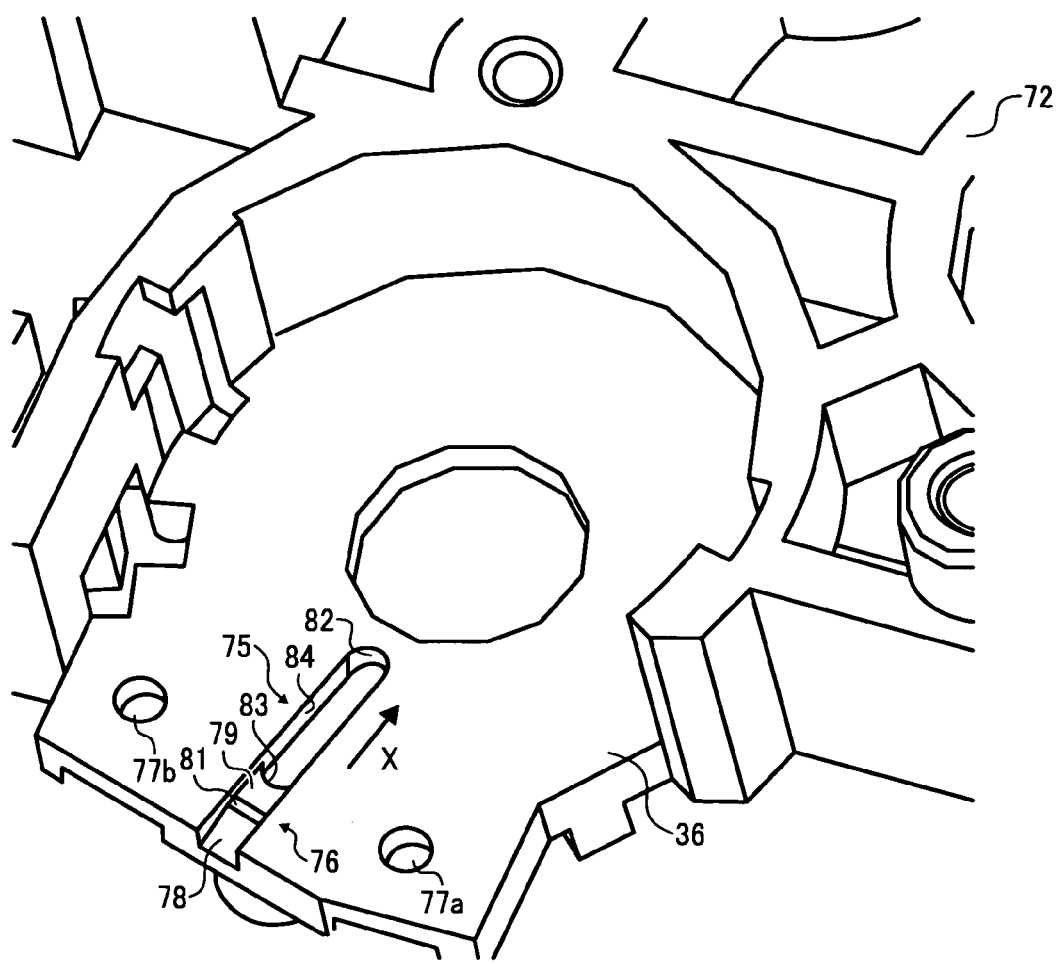
FIG. 19 is a schematic perspective view illustrating a recessed portion formed on a frame (i.e., support) of the optical encoder illustrated in FIG. 17.

Referring to FIG. 19, the frame 72 has the surface 36 on which the photo-sensor 51 is to be set. The surface 36 has the recessed portion 75 and a groove 76, which is connected with the recessed portion 75 and extends to an edge of the frame 72 in the direction X. The recessed portion 75 and the groove 76 have the same width and linearly extend in the direction X.

The groove 76 has a slanting surface 78, which slants such that the depth of the groove 76 decreases toward the recessed portion 75 (i.e., in the direction X), and a flat surface 79, which is connected with the recessed portion 75, and a curved surface 81 which is a convex surface and which is located between the slanting surface 78 and the flat surface 79 to smoothly connect the slanting surface with the flat surface. The slanting surface 78 is slanted relative to the surface 36, and the flat surface 79 is parallel to the surface 36.

Figure 21:
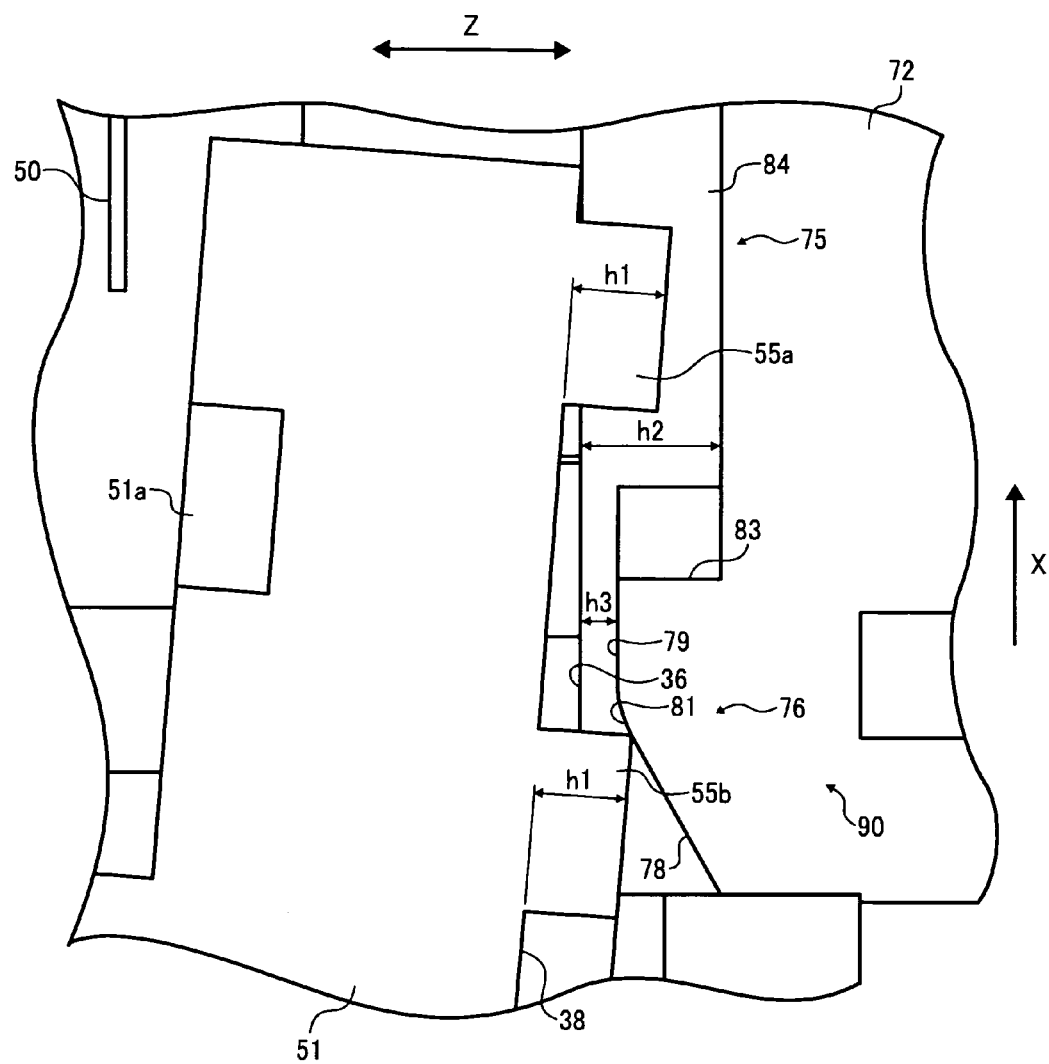
FIG. 21 is an enlarged view of the sensor module of the optical encoder illustrated in FIG. 20.

As illustrated in FIG. 21, the recessed portion 75 has a depth h2 measured on the basis of the surface 36, which is not less than a height h1 of the bosses 55a and 55b measured on the basis of the surface 38, and the flat surface 79 has a depth h3 measured on the basis of the surface 36, which is less than the height h1 of the bosses. Namely, the following relationship is satisfied:

$$H3 < h1 \leq h2.$$

Next, the method for preparing the optical encoder 35, i.e., the method for attaching the photo-sensor 51 to the frame 72, will be explained by reference to FIGS. 17, and 20-22.

Figure 20:
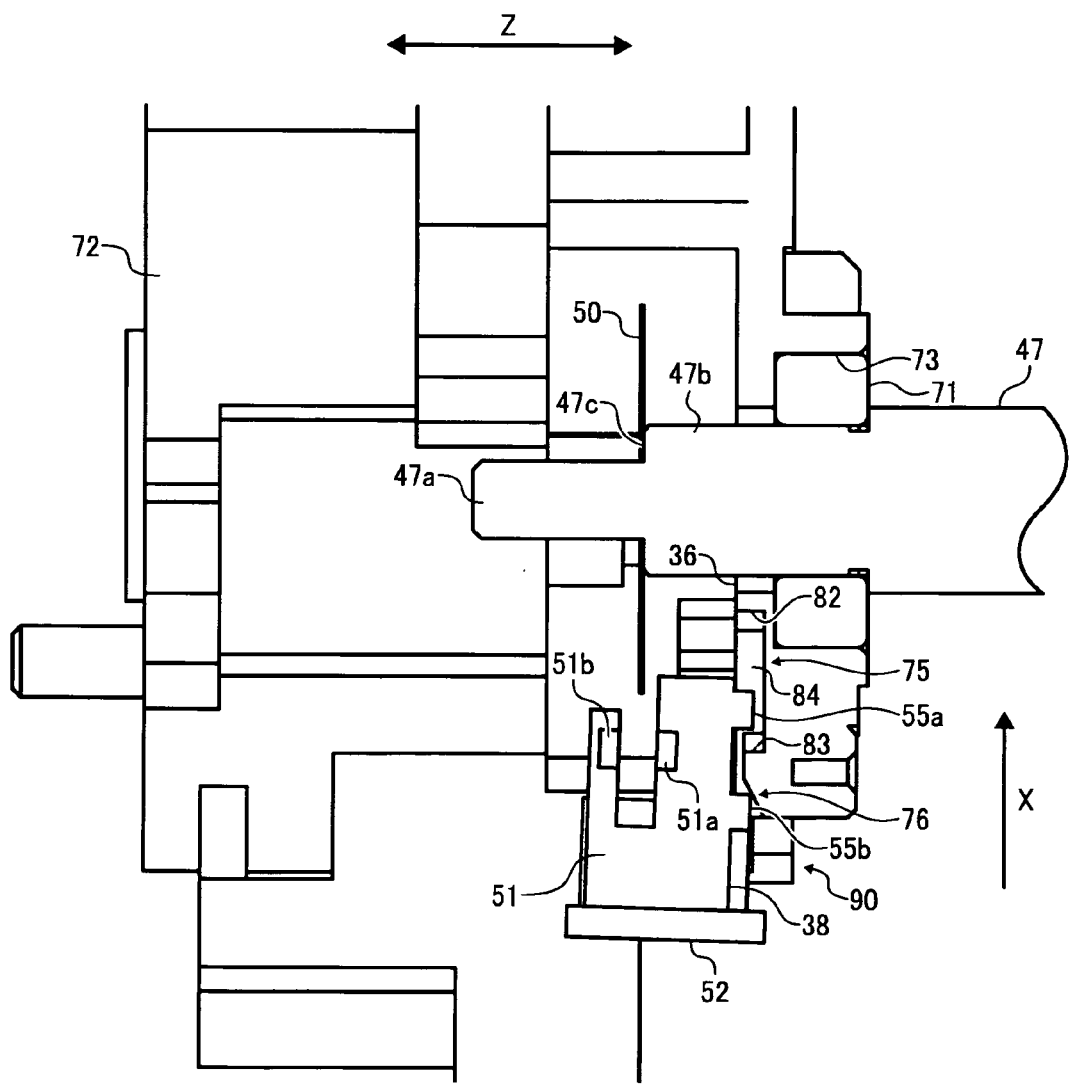
FIG. 20 is a cross-sectional view of the optical encoder illustrated in FIG. 17 in the process of setting the sensor module.
Figure 22:
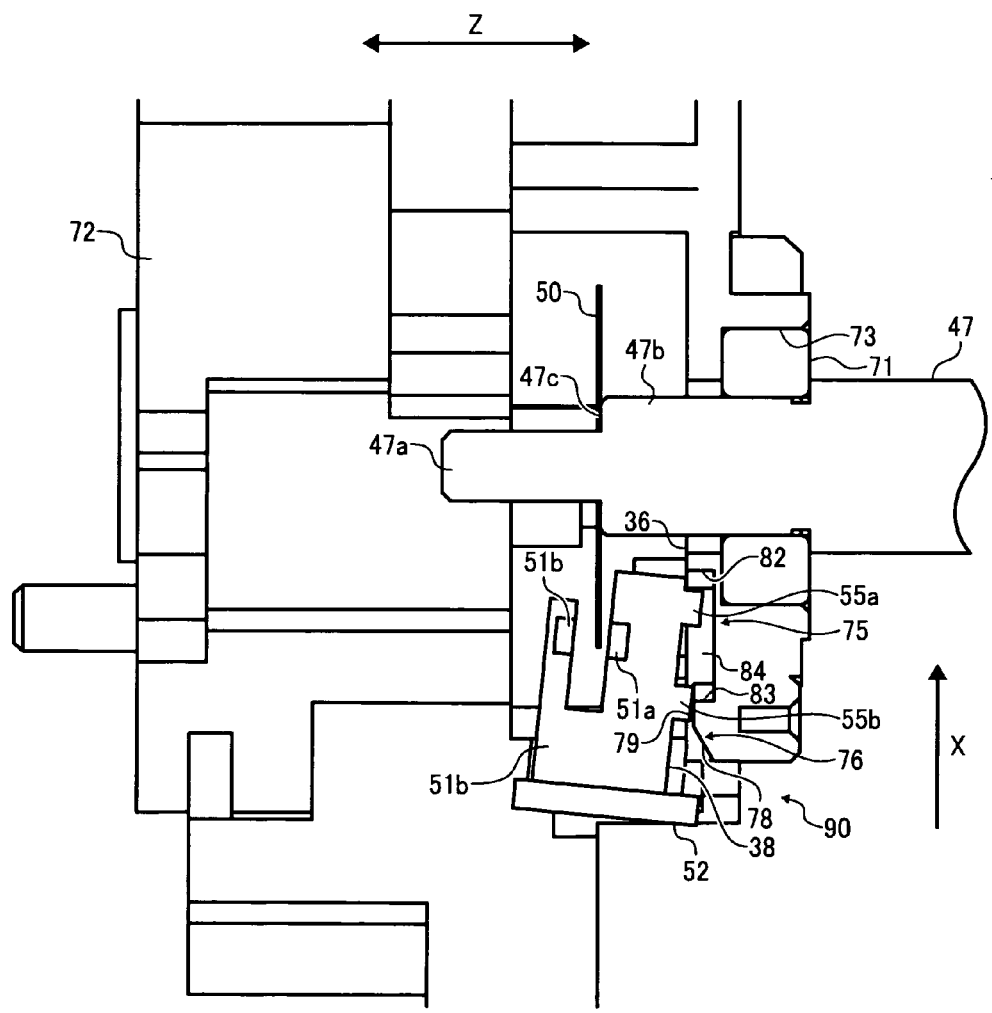
FIG. 22 is a cross-sectional view of the optical encoder illustrated in FIG. 17 in the process of setting the sensor module, wherein the sensor module is further moved in the first direction X so as to be close to the setting position.

FIG. 17 illustrates the cross-section of the photo-sensor 51 attached to the frame 72. FIGS. 20-22 are cross-sectional views illustrating the photo-sensor 51 when the photo-sensor is set on the frame 72, and FIG. 21 is an enlarged view.

As illustrated in FIG. 20, at first the pulse code wheel 50 is fit into the first portion 47a of the shaft of the driven roller 47 upon application of pressure thereto, and the pulse code wheel is adhered to the end surface 47c using an adhesive tape, etc. Next, in order to set the photo-sensor 51, the photo-sensor 51 attached to the substrate 52 is moved in the direction X from the outer end of the frame 72 such that the bosses 55a and 55b move along the groove 76. In this regard, the photo-sensor 51 is moved while being pressed in a direction Z from the top of the photo-sensor such that the bosses 55a and 55b can move along the groove 76. Since the groove 76 has the slanting surface 78 at the entrance thereof, the entrance has a large space when being observed from the direction X, and thereby the bosses 55a and 55b can be easily inserted into the groove 76.

Figure 1:
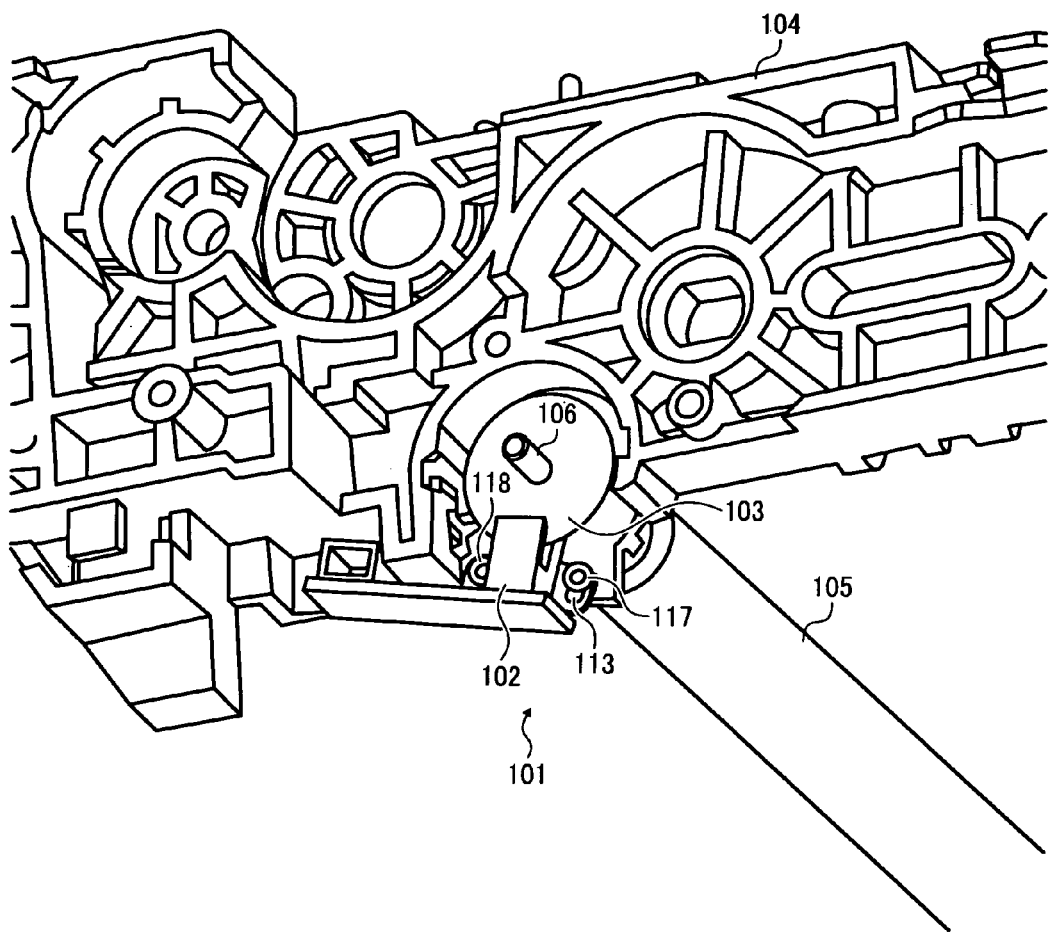
FIG. 1 is a schematic perspective view of a background optical encoder and a moving member.
Figure 2:
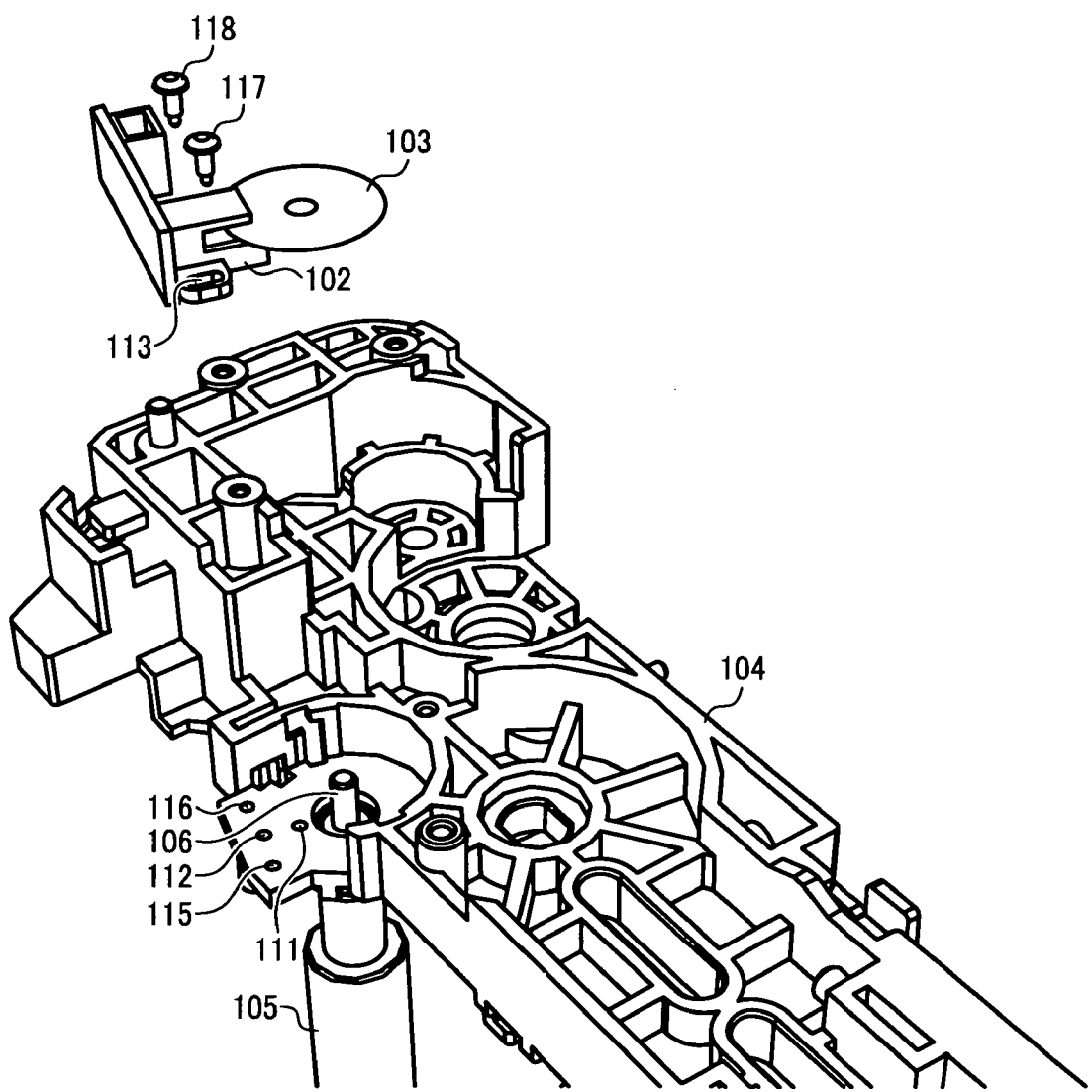
FIGS. 2 and 3 are a schematic exploded view and a schematic front view of the background optical encoder illustrated in FIG. 1.
Figure 3:
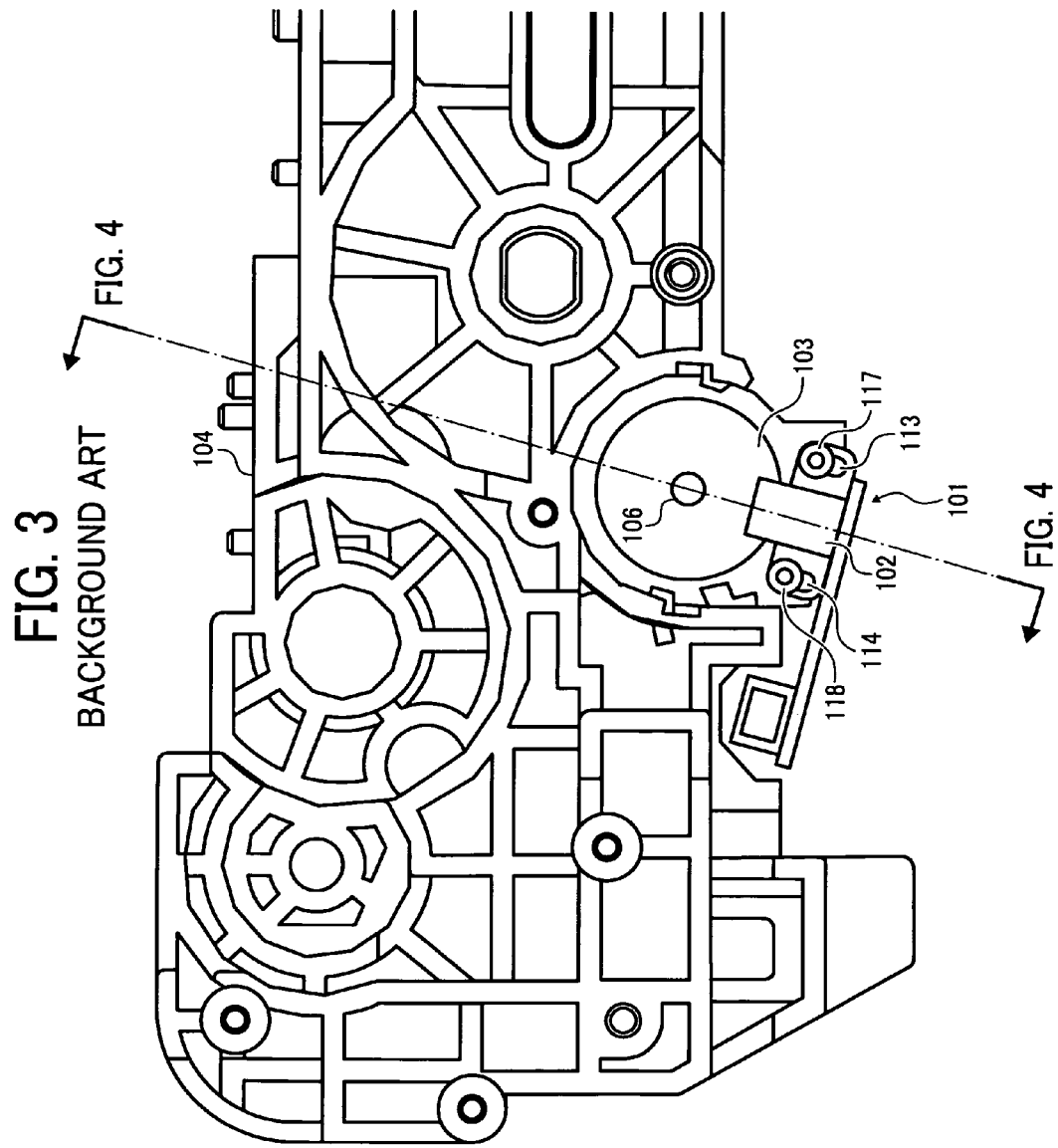
Figure 4:
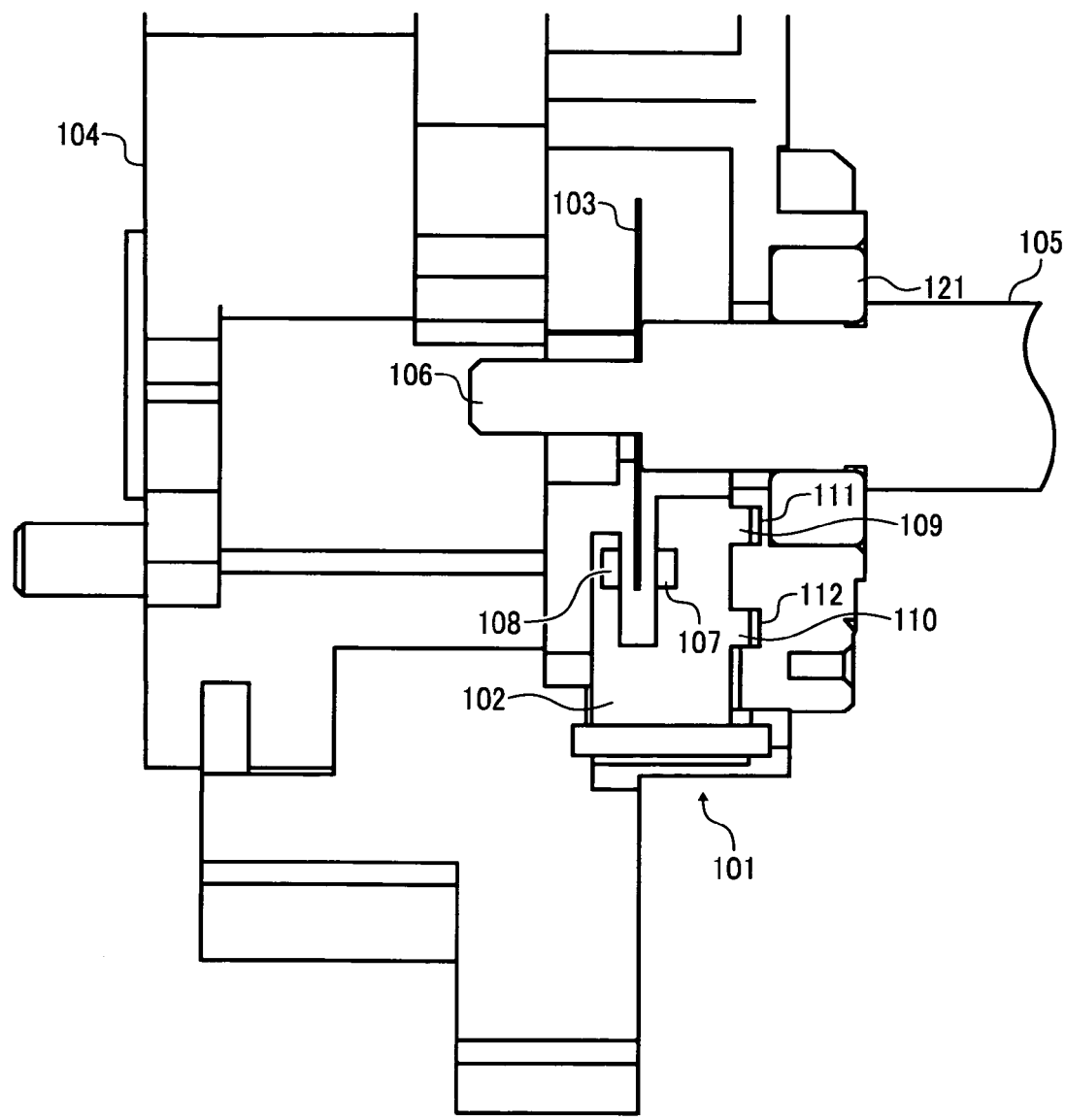
FIG. 4 is a schematic cross-sectional view of the background optical encoder illustrated in FIG. 1 at the cut surface illustrated by a chain line in FIG. 3.
Figure 5:
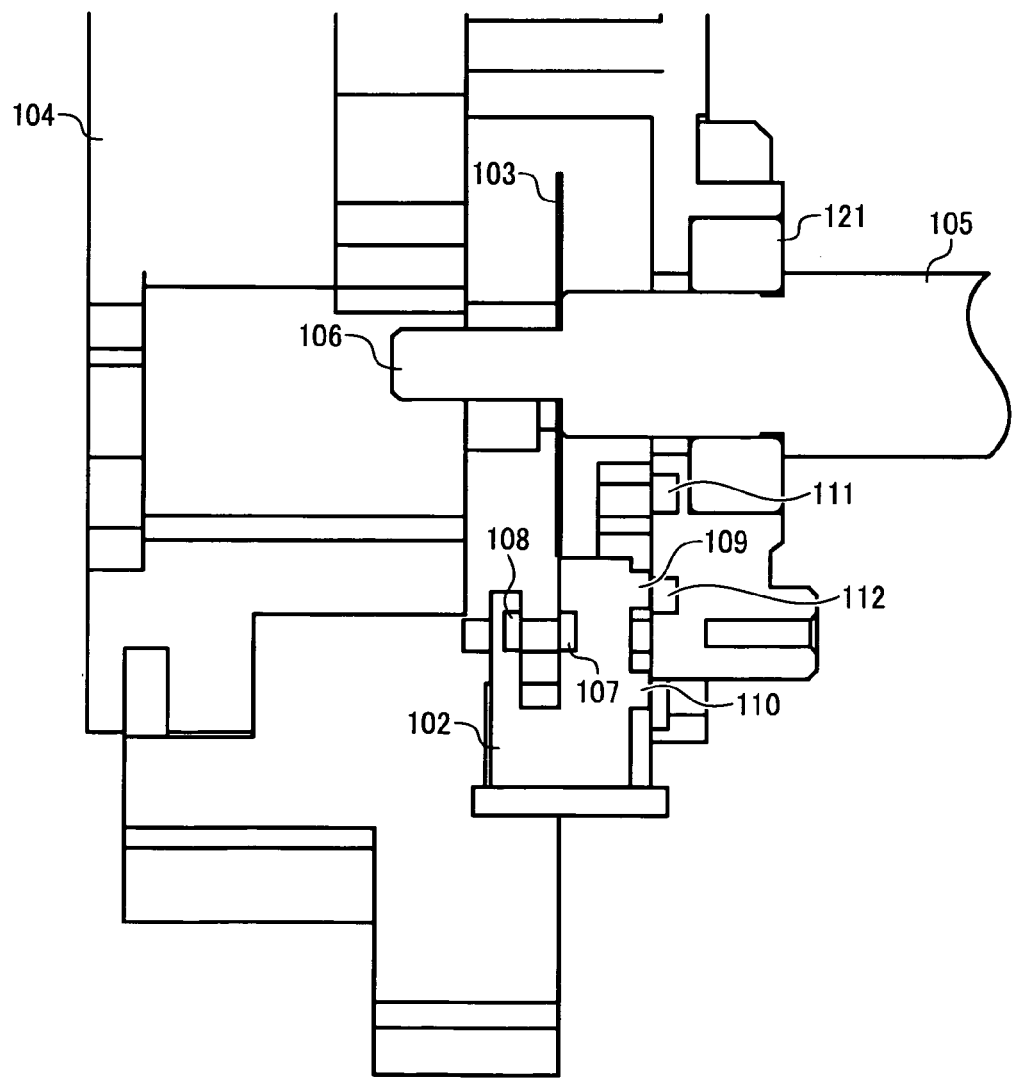
FIG. 5 is a schematic cross-sectional view of the background optical encoder illustrated in FIG. 3 in the process of setting the sensor module.
Figure 6:
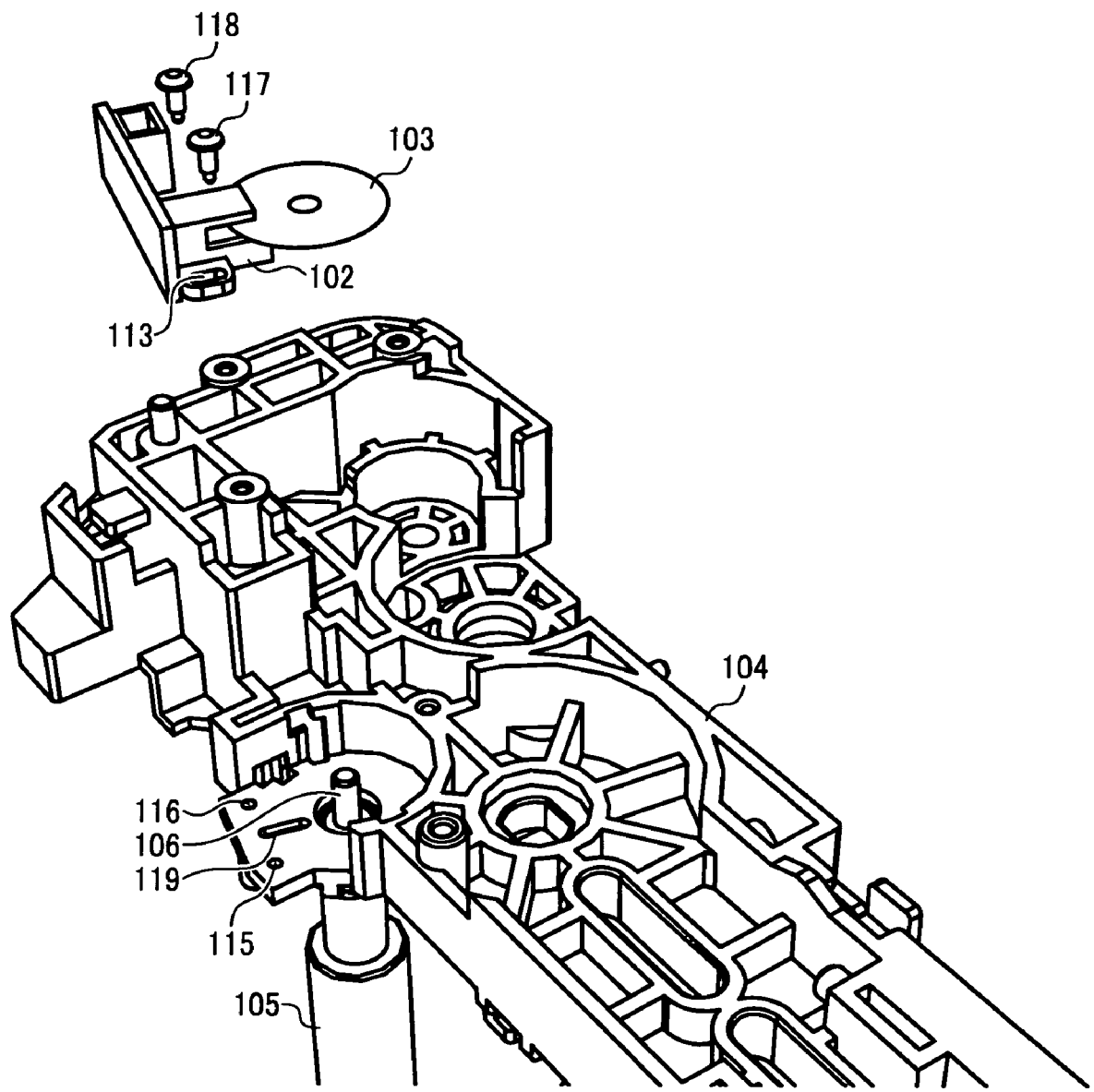
FIGS. 6 and 7 are schematic exploded views of other background optical encoders.
Figure 7:
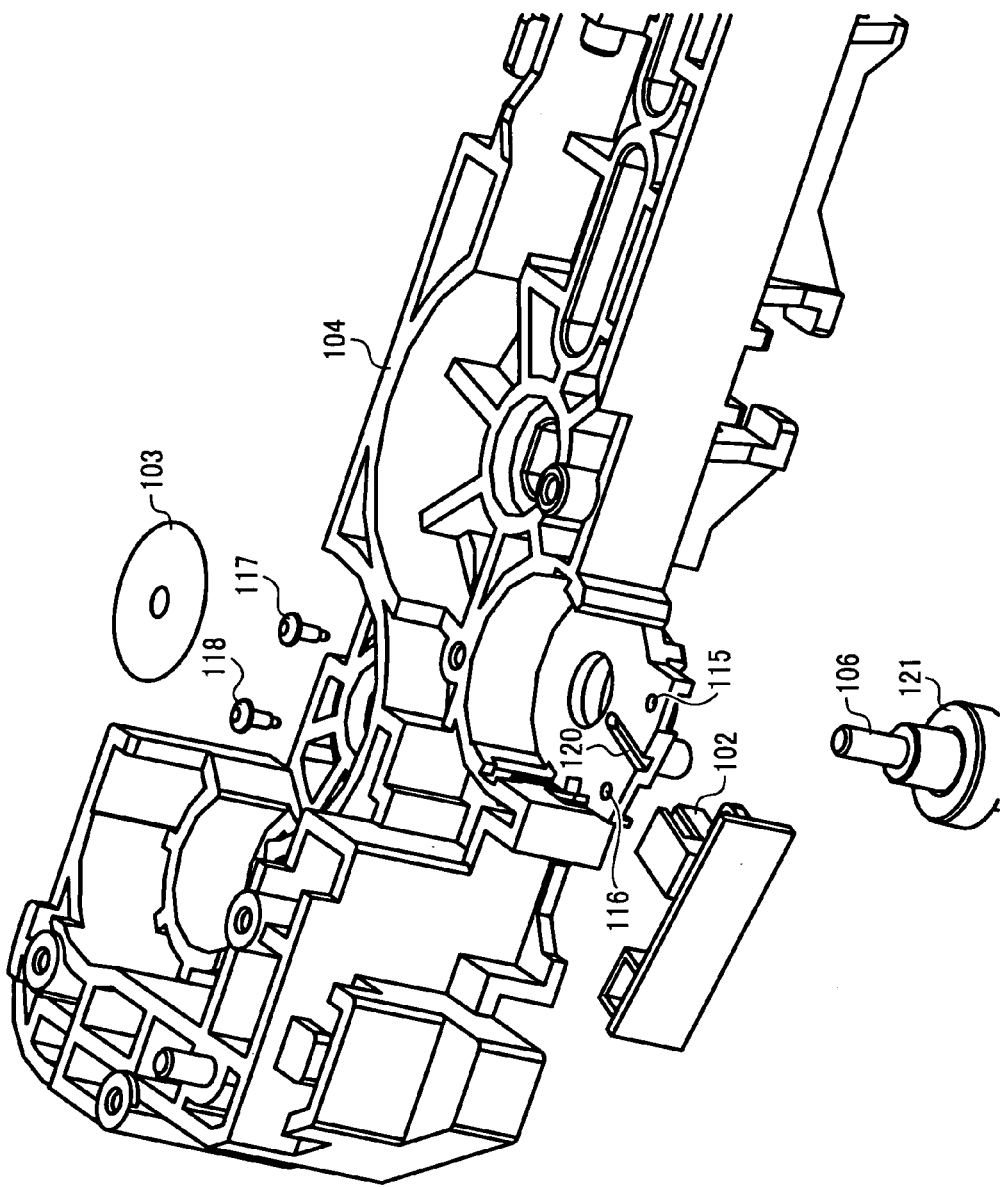
Figure 8:
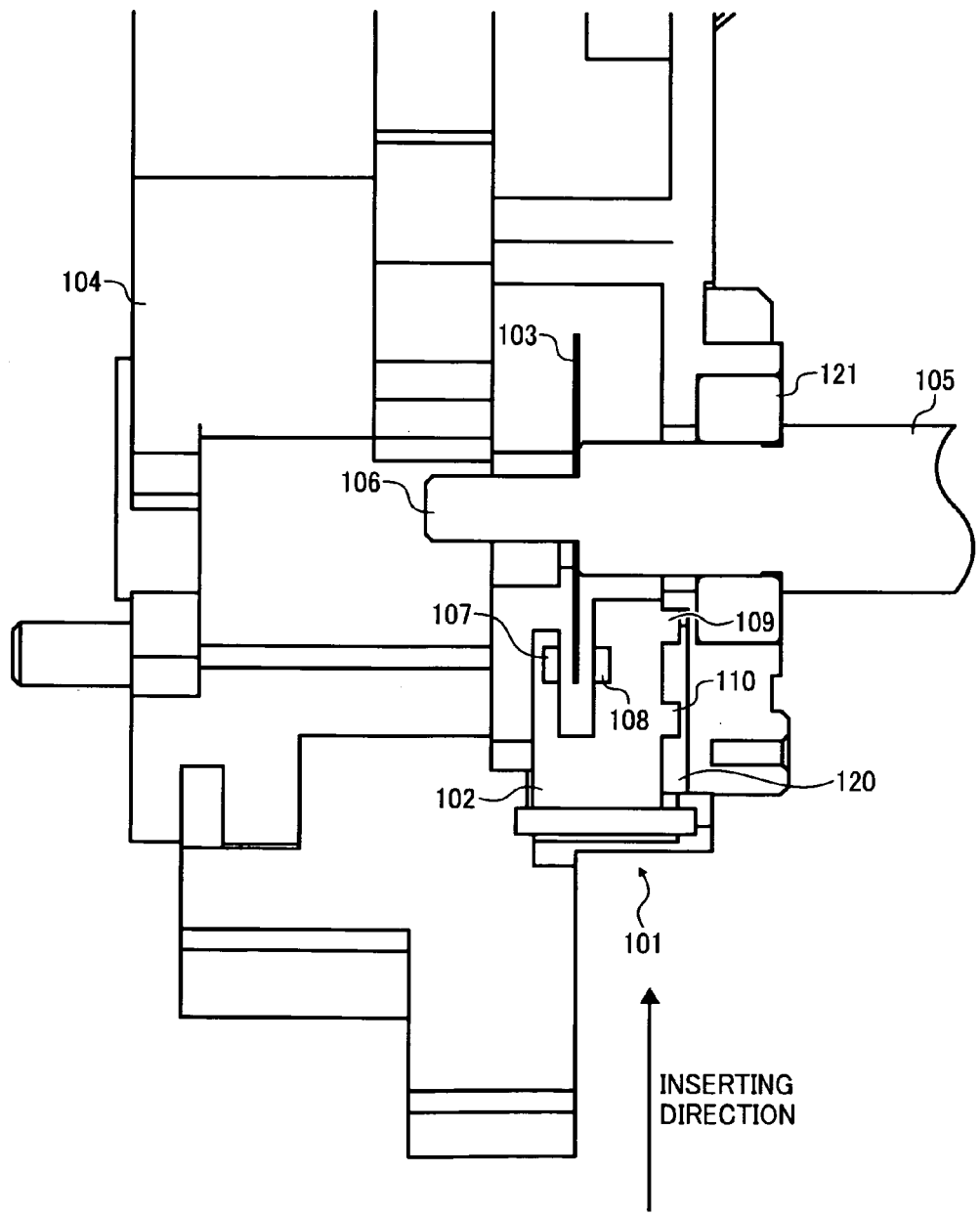
FIG. 8 is a schematic cross-sectional view of the background optical encoder illustrated in FIG. 7.

When the photo-sensor 51 is further moved in the direction X while the bosses 55a and 55b are inserted into the groove 76, the boss 55a enters into the recessed portion 75 as illustrated in FIG. 20. From insertion of the boss 55a into the groove 76 to entering of the boss to the recessed portion 75, the boss always moves along the groove 76. Therefore, the problem in that the photo-sensor 51 hits and damages the pulse code wheel 50 is not caused unlike the conventional sensor module illustrated in FIG. 5.

As illustrated in FIG. 20, when the boss 55a enters into the recessed portion 75, the other boss 55b is still pressed toward the slanting surface 78 while guided by the groove 76. When the photo-sensor 51 is further moved in the direction X, the boss 55b is contacted with the curved surface 81 as illustrated in FIG. 21. When the photo-sensor 51 is further moved, the boss 55b is contacted with the flat surface 79 as illustrated in FIG. 22.

In this insertion process of the photo-sensor 51 of from the state illustrated in FIG. 20 to the state illustrated in FIG. 22, the photo-sensor is smoothly moved. This is because a curved surface 81 is formed between the slanting surface 78 and the flat surface 79, and thereby the slanting surface is smoothly connected with the flat surface. Therefore, the risk of occurrence of the problem in that the photo-sensor 51 hits and damages the pulse code wheel 50 can be decreased.

The photo-sensor 51 is further moved in the direction X, the boss 55b also enters into the recessed portion 75 as illustrated in FIG. 17. Thus, the operation of setting the photo-sensor 51 is completed. Thus, the groove 76 guides the bosses 55a and 55b to the recessed portion 75. When the bosses 55a and 55b enter into the recessed portion 75, the photo-sensor 51 is positioned, i.e., the photo-sensor acquires the predetermined, position. Therefore, the outer portion of the pulse code wheel 50, which has the black portions 50a, are located between the light emitting member 51a and the light receiving member 51b.

As mentioned above, the bosses 55a and 55b are smoothly moved along the groove 76 and are engaged with the recessed portion 75 due to the slanting surface 78 and the curved surface 81 formed on the bottom surface of the groove, the efficiency of the positioning operation of the photo-sensor 51 is greatly enhanced.

In the state of the photo-sensor 51 illustrated in FIG. 17, the surface 38 of the photo-sensor 51 is contacted with the surface 36 of the frame 72, and the photo-sensor 51 is set to the predetermined (home) position of the frame 72. In this regard, the boss 55a is contacted with an end wall 82 of the recessed portion 75. Therefore, the photo-sensor 51 cannot be further moved in the direction X. In addition, the other boss 55b is contacted with another end wall 83 of the recessed portion 75, the photo-sensor 51 cannot be also moved in the direction opposite to the direction X. In addition, since the width of the groove in a direction Y perpendicular to the directions X and Z is almost the same as the diameter of the bosses 55a and 55b and thereby the bosses are contacted with side walls 84 (illustrated in FIG. 19) of the recessed portion 75, the photo-sensor 51 cannot be moved in the direction Y. Therefore, the photo-sensor 51 is positioned relative to the frame 72 without being moved in the directions X and Y.

In order that the photo-sensor 51 can be easily set to the frame 72 even when the sizes of the parts used vary, it is possible that a small gap of not greater than 0.5 mm maybe formed between the bosses 55 and the recessed portion 75 in the directions X and Y. In this case, the precision of positioning of the photo-sensor 51 slightly deteriorates. The size of the small gap is determined depending on the assembling efficiency, precision of the parts used, positioning precision required, etc. Specifically, when the assembling efficiency has priority and/or the precision of the parts used is relatively low, a relatively large gap is formed. In contrast, when the positioning precision has priority, a small gap or no gap is formed.

When the photo-sensor 51 acquires the predetermined position, the holes 77a of the frame 72 (illustrated in FIG. 19) are connected with the holes 56a and 56b of the photo-sensor 51 (illustrated in FIG. 16), respectively. The rivets 60 and 60 are then inserted into the holes to fix the photo-sensor 51 to the frame 72. Thus, the attaching operation of the photo-sensor 51 is completed. Instead of the fixation method using the rivets 60, other fixation methods using screws, adhesives, etc. can also be used.

In this first example, the photo-sensor 51 is positioned relative to the frame 72 while the bosses 55a and 55b are fit into the recessed portion 75 with or without a small gap therebetween. Therefore, even when the optical encoder is used for a long period of time while the fixation of the photo-sensor 51 deteriorates due to vibration of the image forming apparatus 1 and degradation of the rivets 60, occurrence of the problem in that the photo-sensor 51 is moved from the home position (i.e., from the pulse code wheel 50) can be prevented, resulting in prevention of deterioration of image qualities and failure of the image forming apparatus 1.

SECOND EXAMPLE OF TRANSFER BELT UNIT

Figure 24:
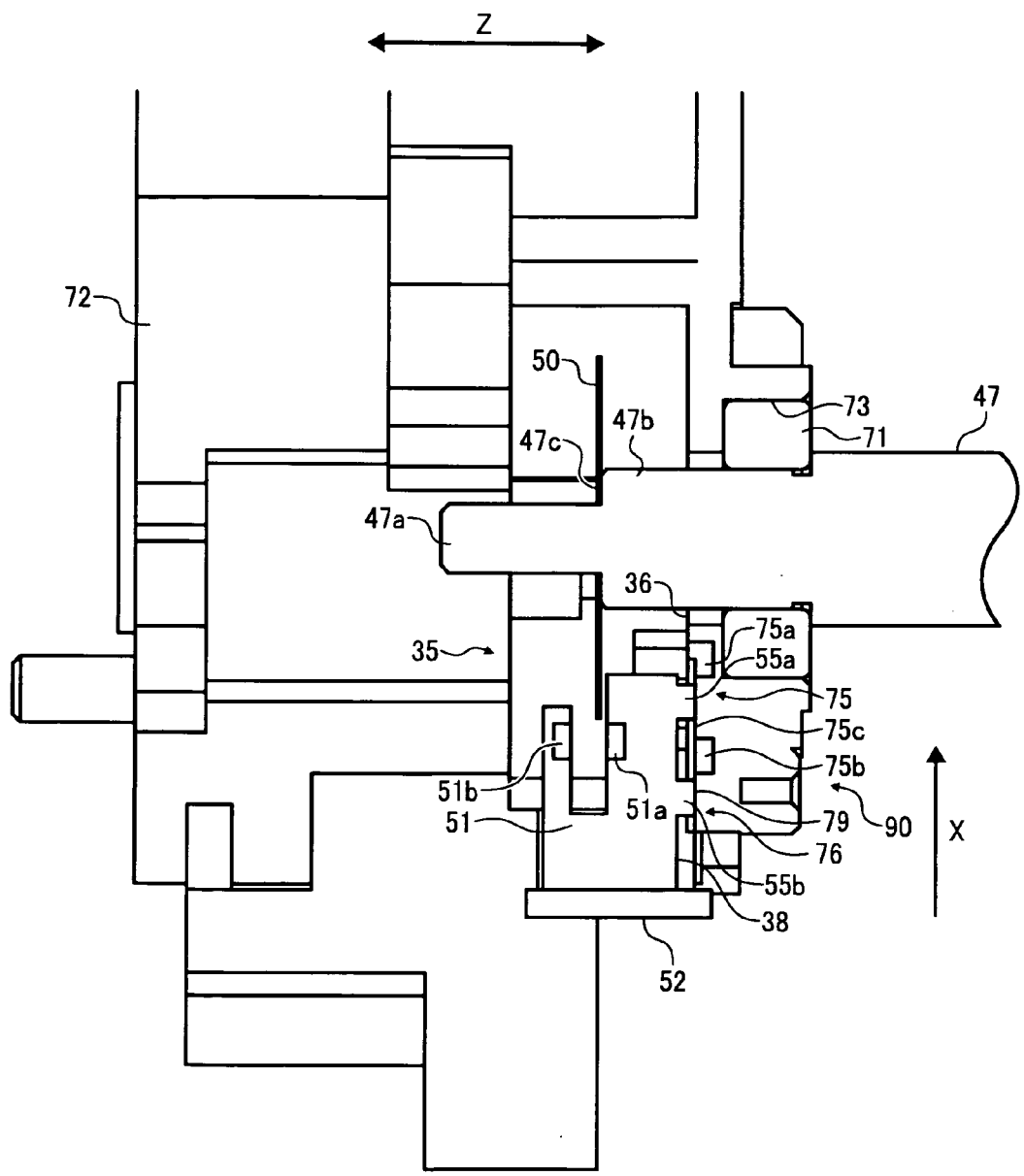
FIG. 24 is a cross-sectional view of the optical encoder illustrated in FIG. 23 in the process of setting the sensor module.
Figure 25:
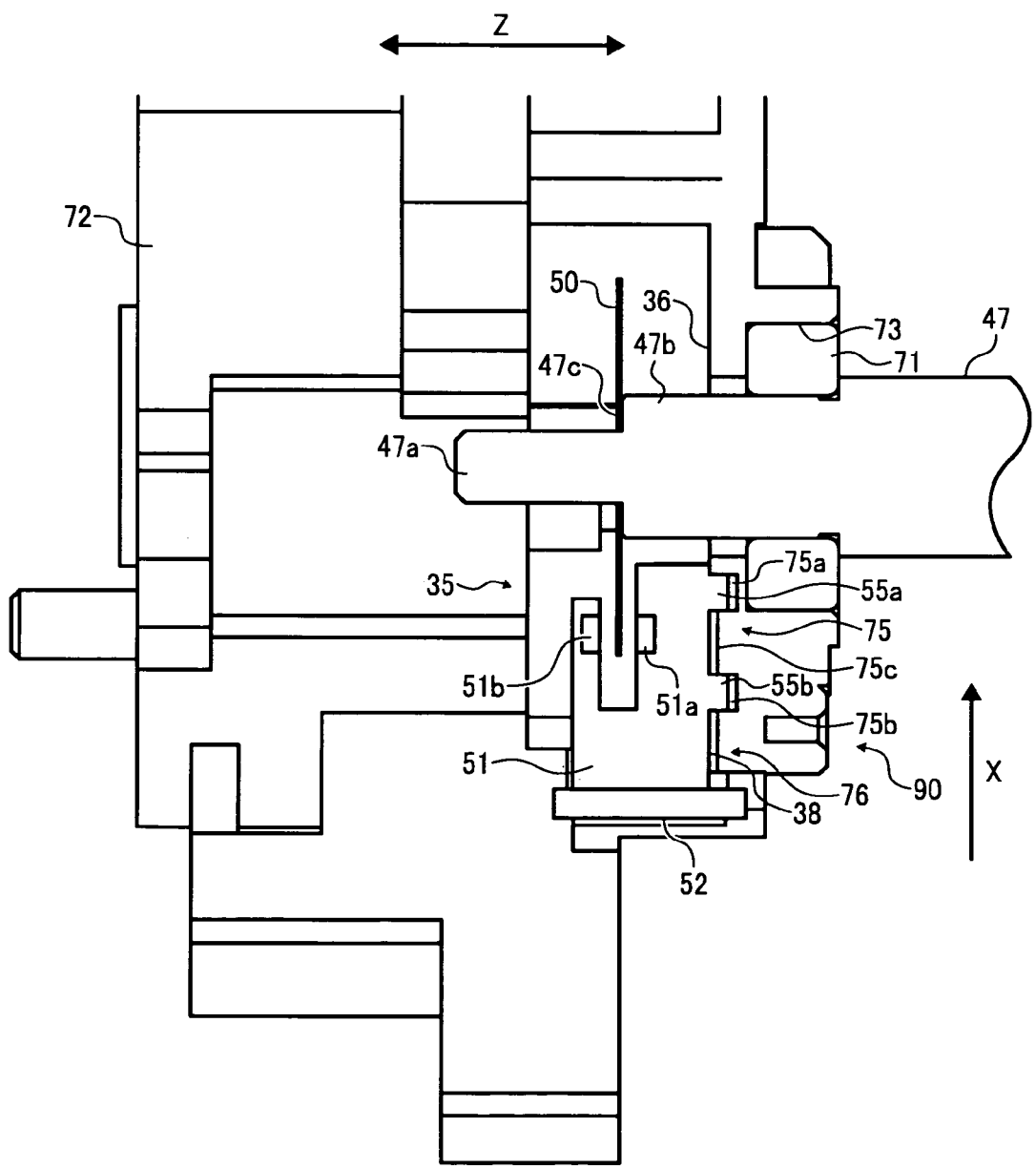
FIG. 25 is a cross-sectional view of the optical encoder illustrated in FIG. 23 after setting the sensor module.

The second example of the transfer belt unit will be explained by reference to FIGS. 23 to 25. The second example uses a modified version of the sensor module 90. In the following explanation, the above-mentioned parts have the same numbers and detailed explanation thereof is omitted. In addition, explanation of the methods for using the parts is sometimes omitted.

Figure 23:
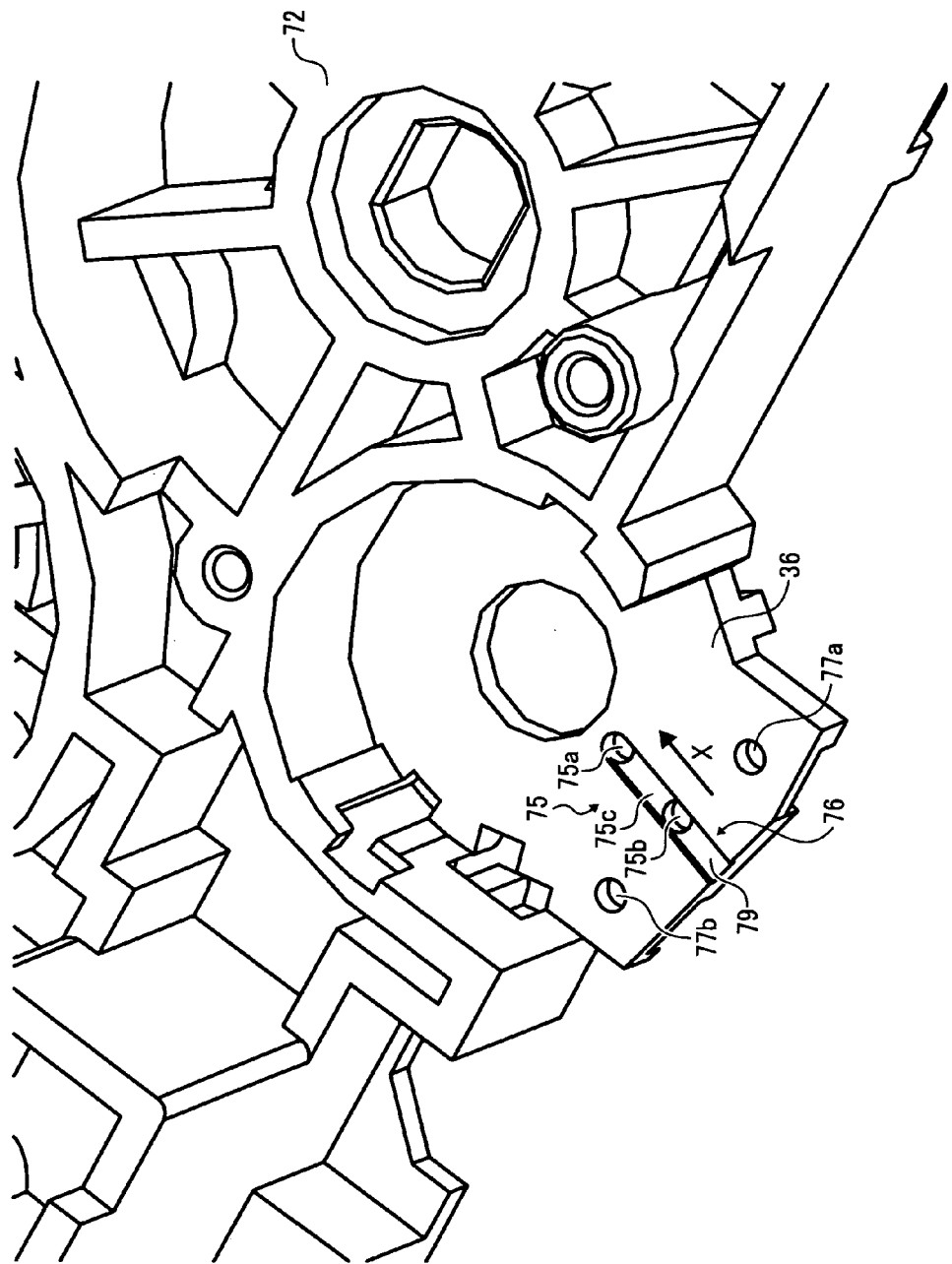
FIG. 23 is a schematic perspective view of another example of the optical encoder having a different groove and different recessed portions.

FIG. 23 is a perspective view illustrating the frame 72 of the second example of the transfer belt unit. FIG. 24 is a cross-sectional view of the optical encoder illustrated in FIG. 23 in the process of setting the photo-sensor to the frame. FIG. 25 is a cross-sectional view of the optical encoder after setting the photo-sensor to the frame.

In this sensor module 90, circular recessed portions 75a and 75b are formed instead of the recessed portion 75 in the first example. In this second example, the number of the recessed portions 75a and 75b is the same as that of the bosses 55a and 55b.

As illustrated in FIG. 23, the entire bottom surface of the groove 76 is the flat surface 79. A groove 75c having the same depth as the groove 76 is formed between the recessed portions 75a and 75b. The others are the same as the first example. The interval between the recessed portions 75a and 75b is the same as the interval between the bosses 55a and 55b, and the diameter of the recessed portions 75a and 75b is the same as the diameter of the bosses 55a and 55b.

When the photo-sensor 51 is set to the frame 72, the photo-sensor is inserted such that the bosses 55a and 55b are moved in the direction X along the groove 76 similar to the first example. In this case, as illustrated in FIG. 24, both the bosses 55a and 55b are contacted with the flat surface 79 and the surface 38 is maintained to be parallel to the surface 36 in the inserting process. Therefore, the movement of the photo-sensor 51 in the inserting process is more stable than that in the first example, namely, the photo-sensor 51 can be inserted more smoothly than in the first example. Therefore, the risk of occurrence of the problem in that the photo-sensor 51 hits and damages the pulse code wheel 50 can be further decreased.

When the photo-sensor 51 is further moved in the direction X, the bosses 55a and 55b are respectively engaged with the recessed portions 75a and 75b, and thereby the photo-sensor 51 is set to the predetermined position of the frame 72. Similarly to the first example, the photo-sensor 51 is fixed to the frame 72 with the rivets 60.

In this second example, the number of the recessed portions 75a and 75b is the same as that of the bosses 55a and 55b. Therefore, the engagement of the recessed portions 75a and 75b with the bosses 55a and 55b is strong and can be maintained even after long repeated use. In this second example, the groove 76 may have the same structure as the groove 76 in the first example.

Although the diameter of the bosses 55a and 55b (and the recessed portions 75a and 75b) are the same in this example, the diameter may be different. For example, it is preferable that the diameter of the boss 55a is greater than that of the recessed portion 75b so that the boss 55a is not engaged with the recessed portion 75b when moving the sensor module in the direction X.

THIRD EXAMPLE OF THE TRANSFER BELT UNIT

The third example of the transfer belt unit will be explained by reference to FIGS. 26 to 29.

Figure 26:
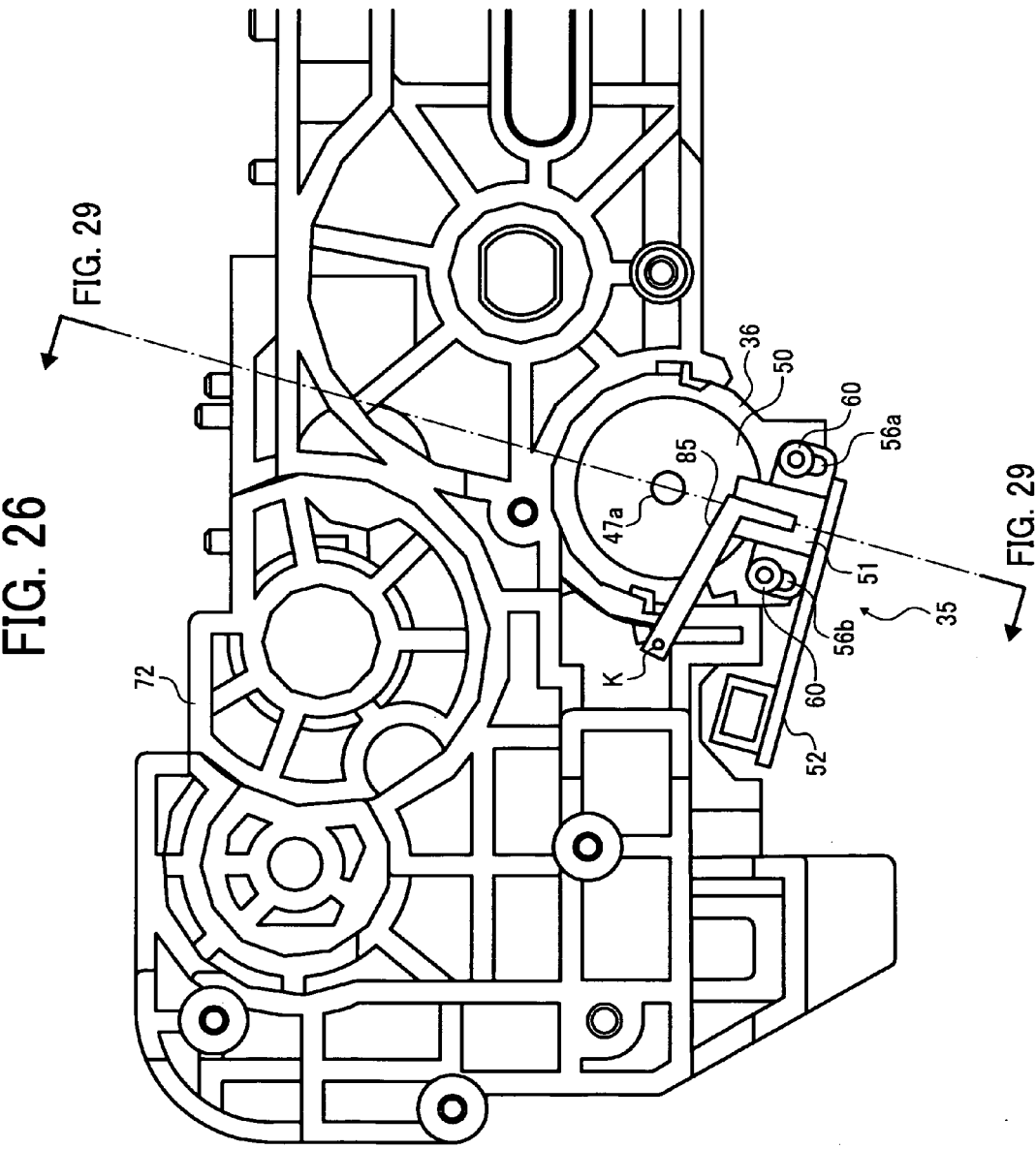
FIG. 26 is a schematic front view of yet another example of the optical encoder of the present invention.
Figure 27:
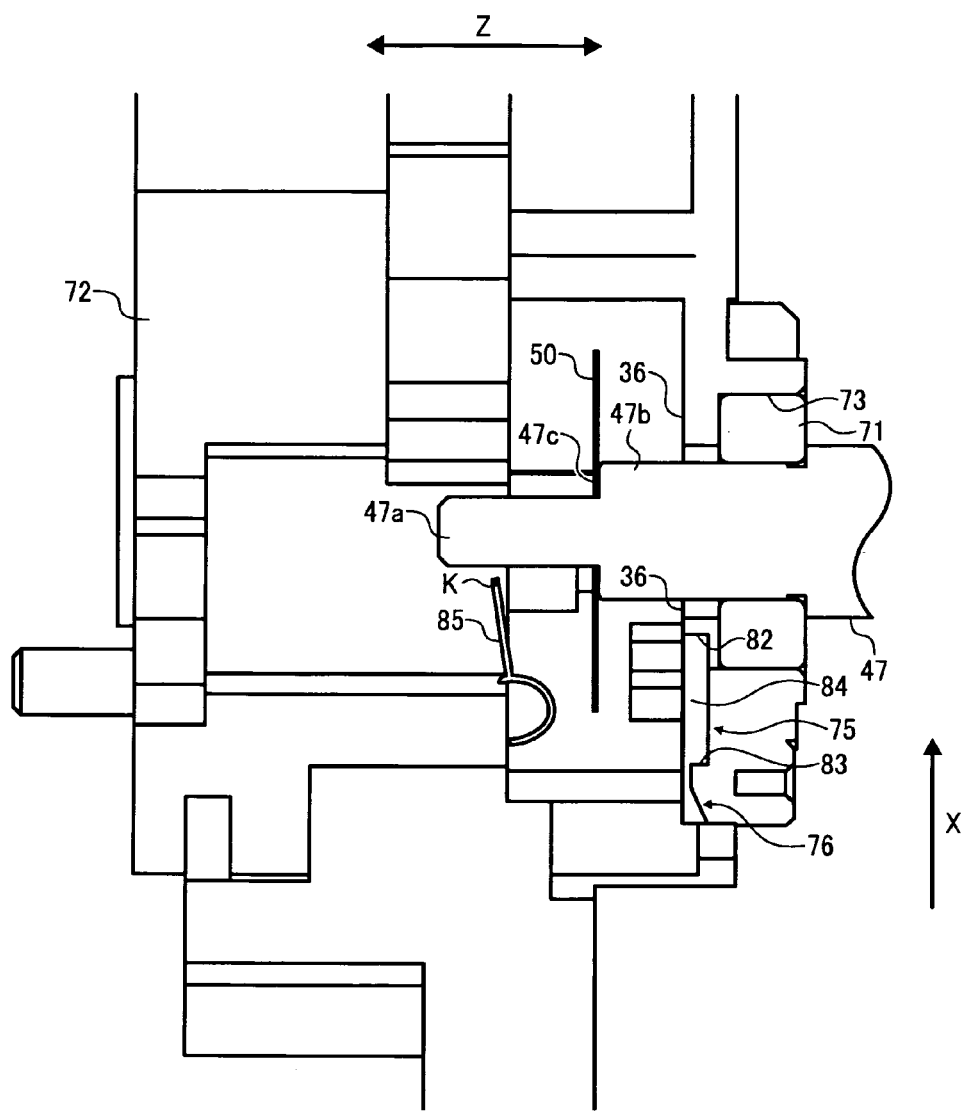
FIGS. 27-29 are schematic cross-sectional views of the optical encoder at the cut surface illustrated by a chain line in FIG. 26 before, in the process of, and after setting the sensor module.
Figure 28:
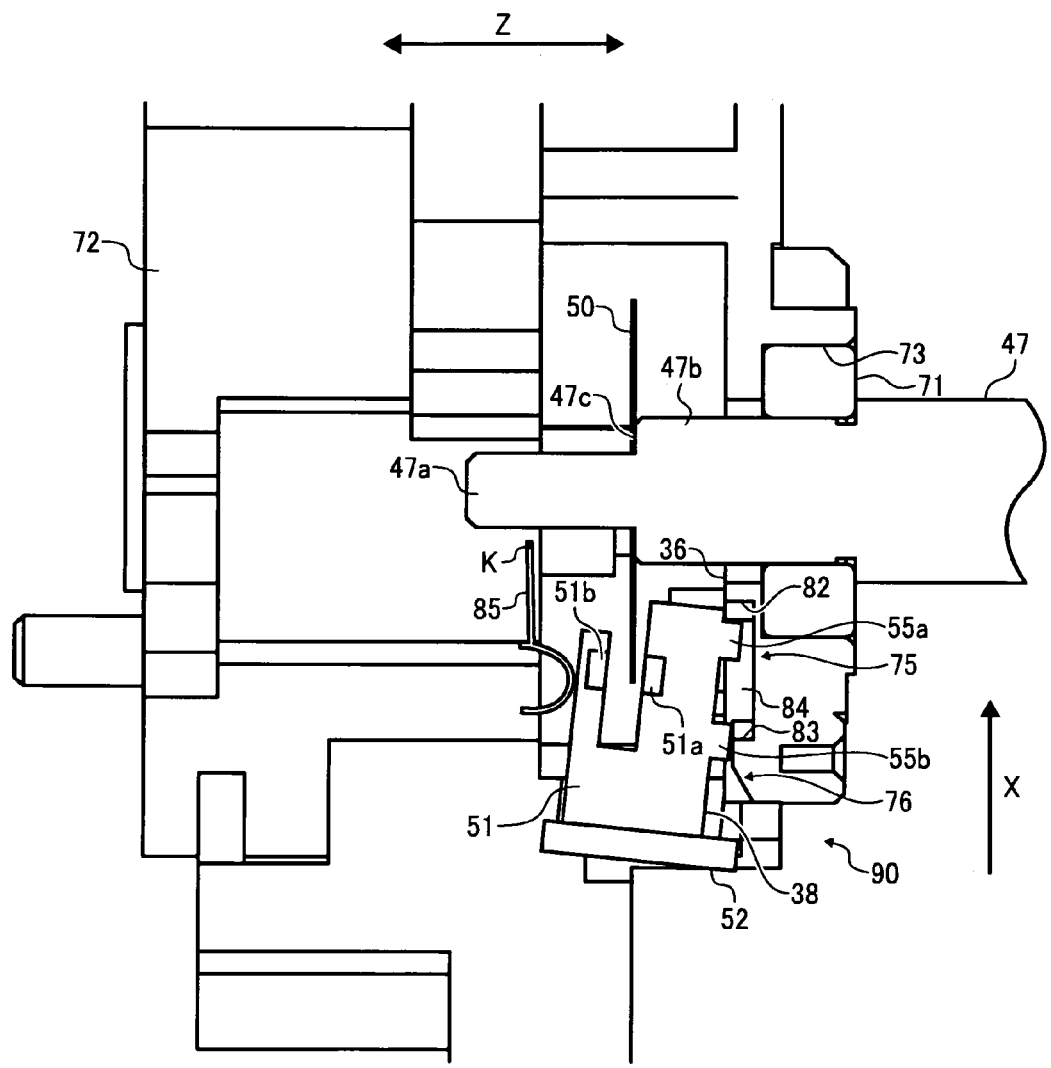
Figure 29:
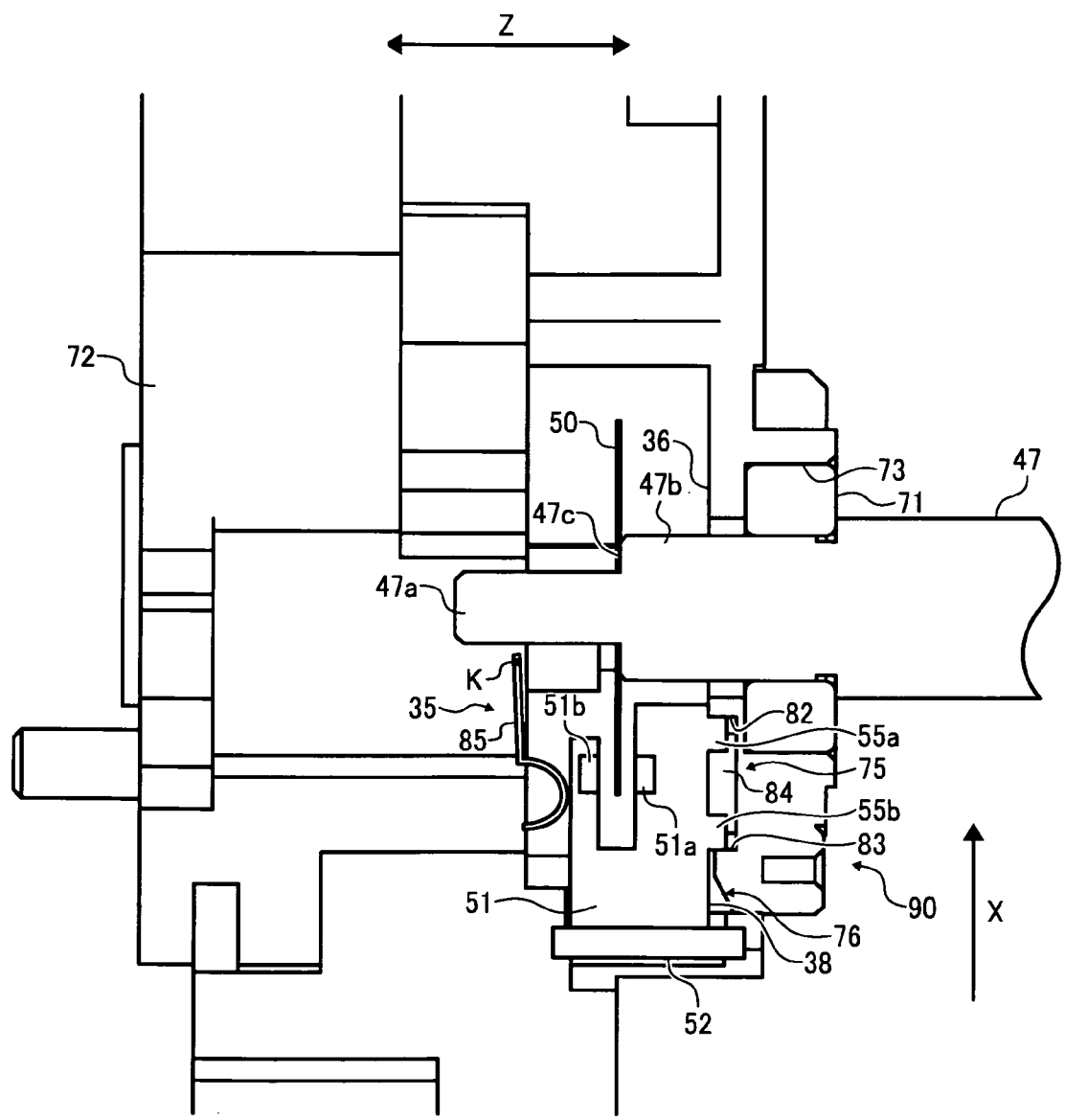

FIG. 26 is a front view illustrating the optical encoder in which the photo-sensor 51 has been set to the frame 72. FIG. 27 is a cross-sectional view illustrating the optical encoder before setting the photo-sensor. FIG. 28 is a cross-sectional view illustrating the optical encoder in the process of setting the photo-sensor. FIG. 29 is a cross-sectional view illustrating the optical encoder after setting the photo-sensor.

This third example is the same as the first example except that a plate spring 85 serving as a pressing member is provided on the frame 72 to press the photo-sensor 51 in such a direction that the bosses 55a and 55b enter into the recessed portion 75 when the photo-sensor 51 is moved in the direction X while the bosses 55 are guided by the groove 76. As illustrated in FIG. 26, one end of the plate spring 85 is fixed to a point K of the frame 72 using a fixing member (not shown) such as screws. As illustrated in FIG. 27, the plate spring 85 is not contacted with the pulse code wheel 50 before the photo-sensor setting operation.

As illustrated in FIG. 29, the plate spring 85 is contacted with the photo-sensor 51 to press the photo-sensor even after the photo-sensor is set to the frame 72. In this regard, since the main function of the plate spring 85 is to press the photo-sensor 51 during the photo-sensor setting operation, it is possible that the plate spring 85 is not contacted with the photo-sensor 51 after the photo-sensor is set to the predetermined position of the frame 72. However, the plate spring 85 is preferably contacted with the photo-sensor 51 even after the photo-sensor is set to the frame 72 such that the photo-sensor can stably maintain the position.

The photo-sensor setting operation in third example is the same as that in the first example except that the plate spring 85 is set to the frame 72 after the pulse code wheel 50 is attached to the driven roller 47. In the photo-sensor setting operation in this third example, the plate spring 85 presses the upper surface of the photo-sensor 51 as illustrated in FIG. 28 such that the photo-sensor is pressed toward the surface 36 of the frame 72.

In the photo-sensor setting operation in the first example, it is necessary to press the photo-sensor 51 with a hand (or a finger) toward the frame 72 to prevent the pulse code wheel from being damaged by the photo-sensor. However, such a pressing operation is not necessary in this third example, and the photo-sensor 51 can be easily set by merely moving in the direction X. Therefore, the assembling can be easily performed. In addition, the pressing operation is securely performed compared to the manual pressing operation in the first example, the risk of occurrence of the problem in that the photo-sensor 51 hits and damages the pulse code wheel can be further decreased. Therefore, an assembling mistake is hardly committed.

Figure 30:
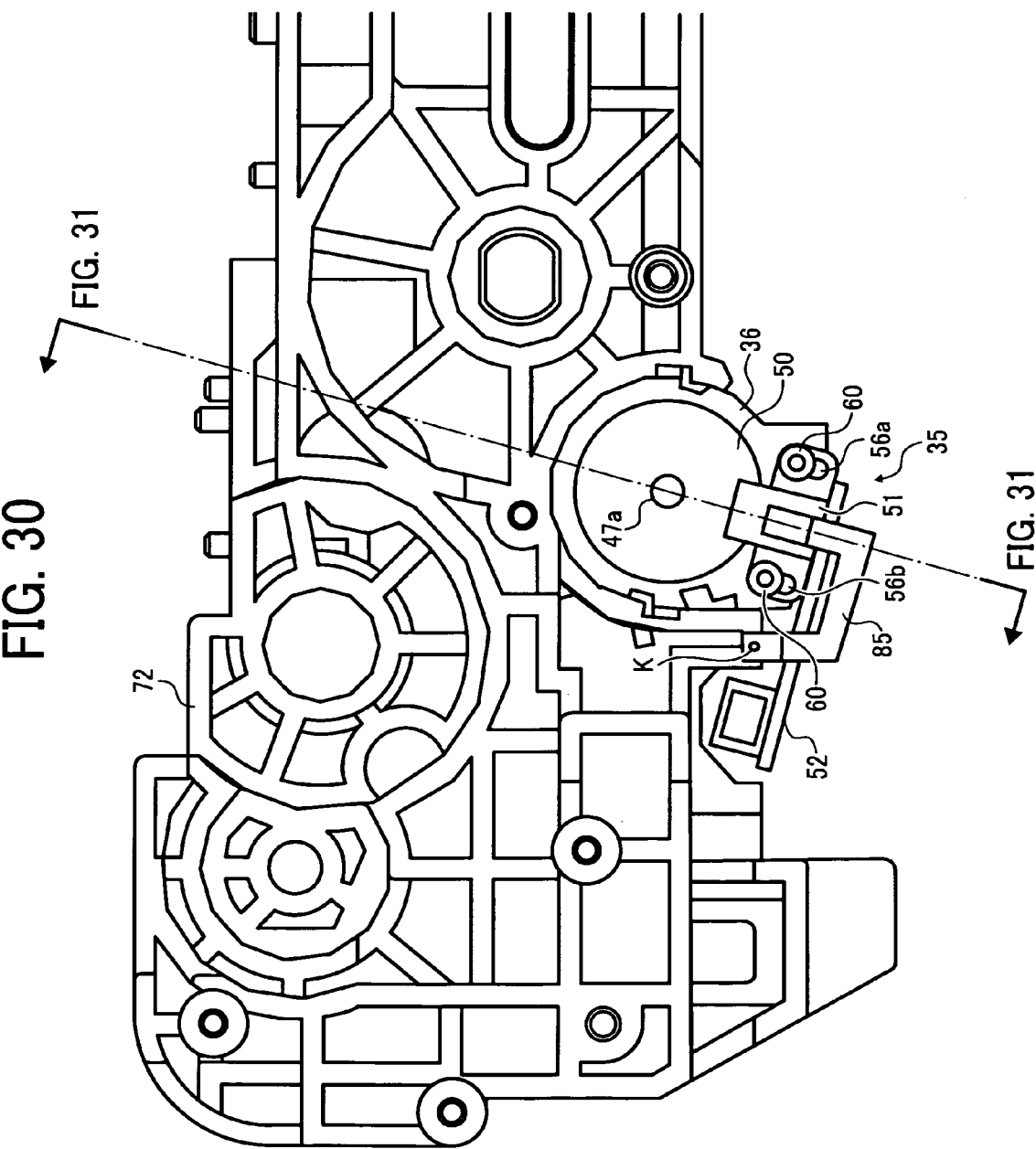
FIG. 30 is a schematic front view of a modified version of the optical encoder illustrated in FIG. 26, which has a different pressing member.
Figure 31:
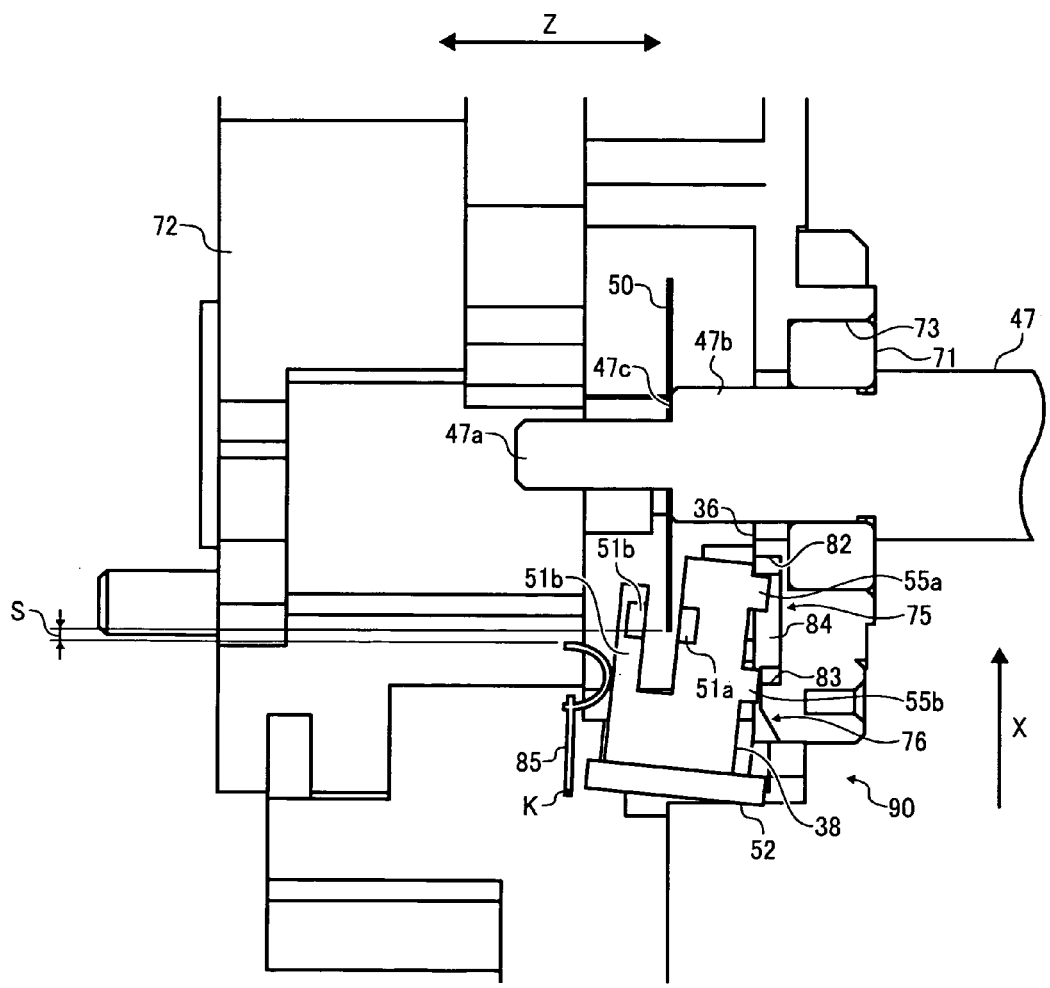
FIG. 31 is a schematic cross-sectional view of the modified optical encoder at the cut surface illustrated by a chain line in FIG. 30.

FIG. 30 is a front view illustrating the photo-sensor 51 set on the frame 72, and FIG. 31 is a cross-sectional view illustrating the photo-sensor at the cut surface indicated by a chain line in FIG. 30. As illustrated in FIGS. 30 and 31, it is preferable that the plate spring 85 is not overlapped with the pulse code wheel 50 when observed from the direction Z. Specifically, as illustrated in FIG. 31, a distance S between the tip of the plate spring 85 and the outer end of the pulse code wheel 50 is preferably greater than 0 (i.e., S>0). In this case, the photo-sensor setting operation can be performed more easily.

When $S \leq 0$, the plate spring 85 has to be fastened to the frame 72 after the pulse code wheel 50 is set to the driven roller 47. However, when S>0, the plate spring fastening operation can be performed before or after the pulse code wheel 50 is set to the driven roller 47. In addition, when the pulse code wheel 50 is detached or attached (for example, the pulse code wheel is replaced with a new pulse code wheel), it is not necessary to detach the plate spring 85.

In FIG. 31, the distance S represents the distance between the tip of the plate spring 85 and the outer end of the pulse code wheel 50 measured in the process of setting the photo-sensor 51. The distance S increases before the photo-sensor setting operation or after detaching the photo-sensor from the frame 72. Since the reason why the condition S>0 should be satisfied is to prevent the plate spring 85 from being contacted with the pulse code wheel 50, it is acceptable that the condition (S>0) is not satisfied in the process of setting the photo-sensor 51, but the condition is preferably satisfied before the photo-sensor setting operation or after detaching the photo-sensor from the frame 72.

The above-mentioned plate spring 85 can be used for the second example mentioned above.

FOURTH EXAMPLE OF THE TRANSFER BELT UNIT

The fourth example of the transfer belt unit 30 will be explained by reference to FIGS. 32 to 38.

Figure 32:
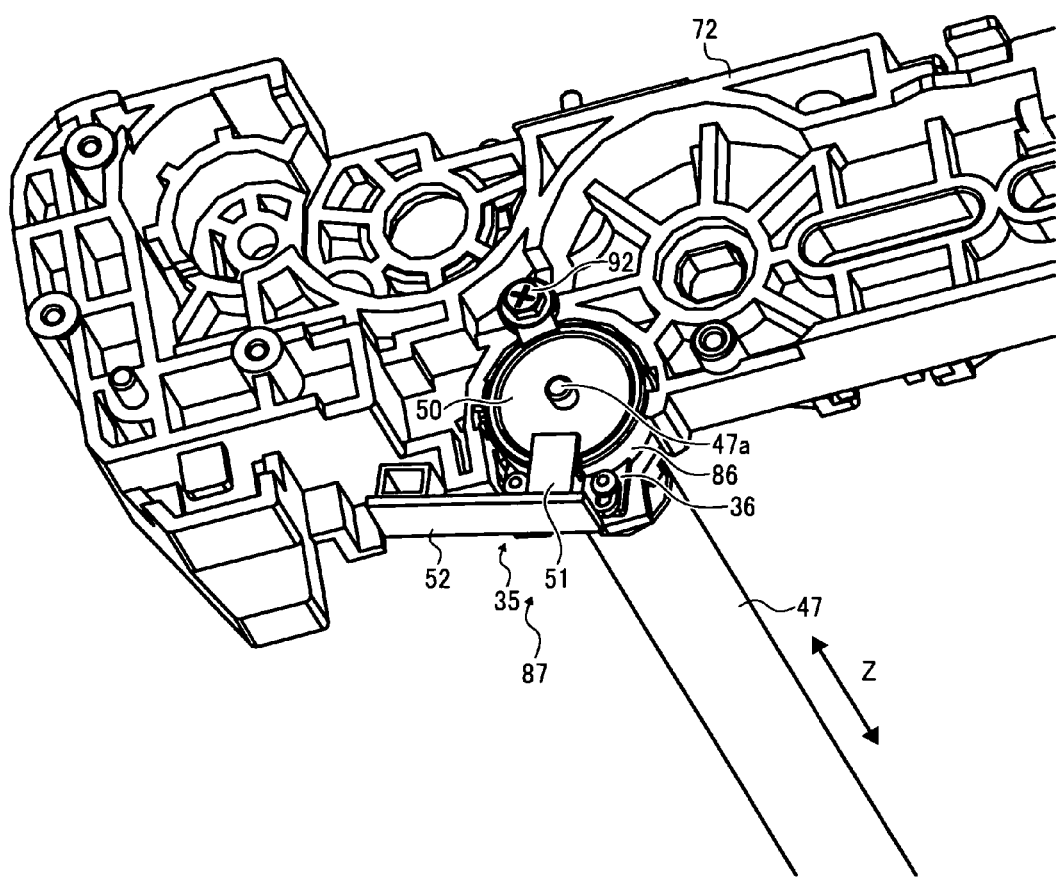
FIGS. 32 and 33 are schematic perspective views of another example of the optical encoder of the present invention.
Figure 33:
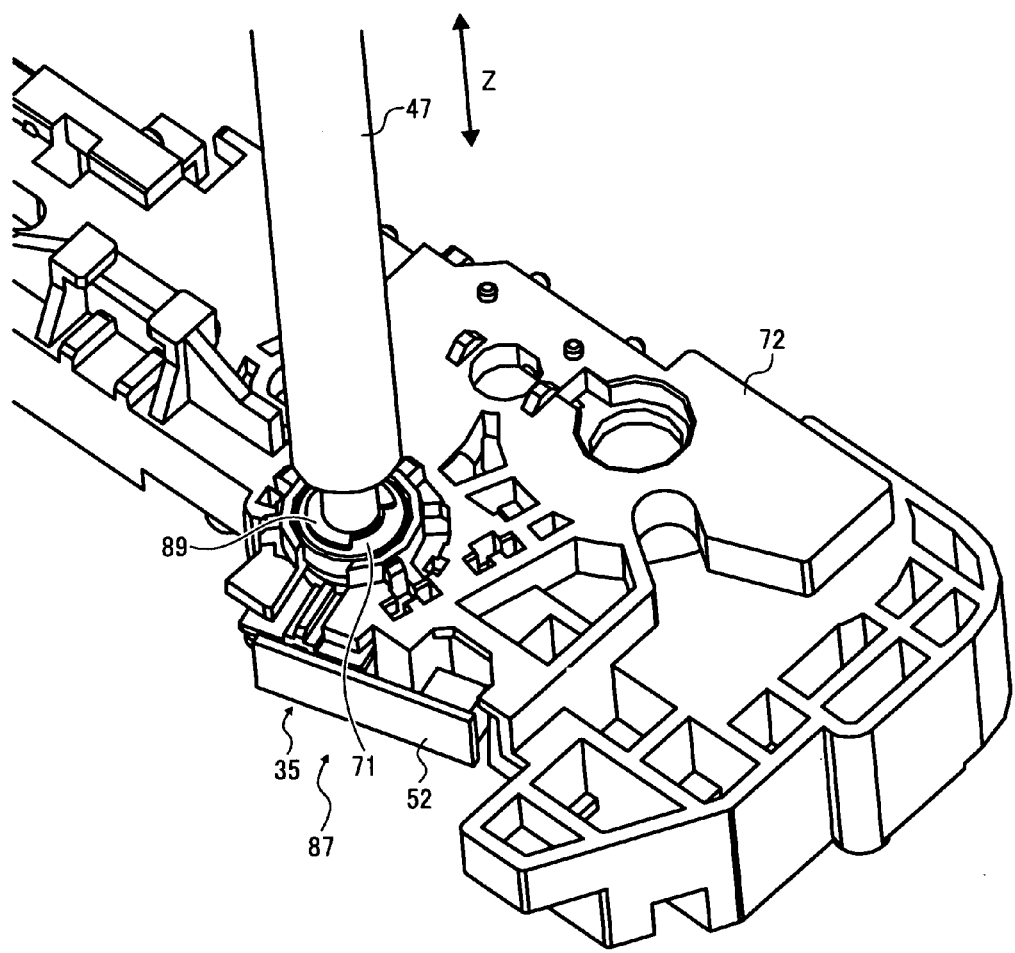
Figure 34:
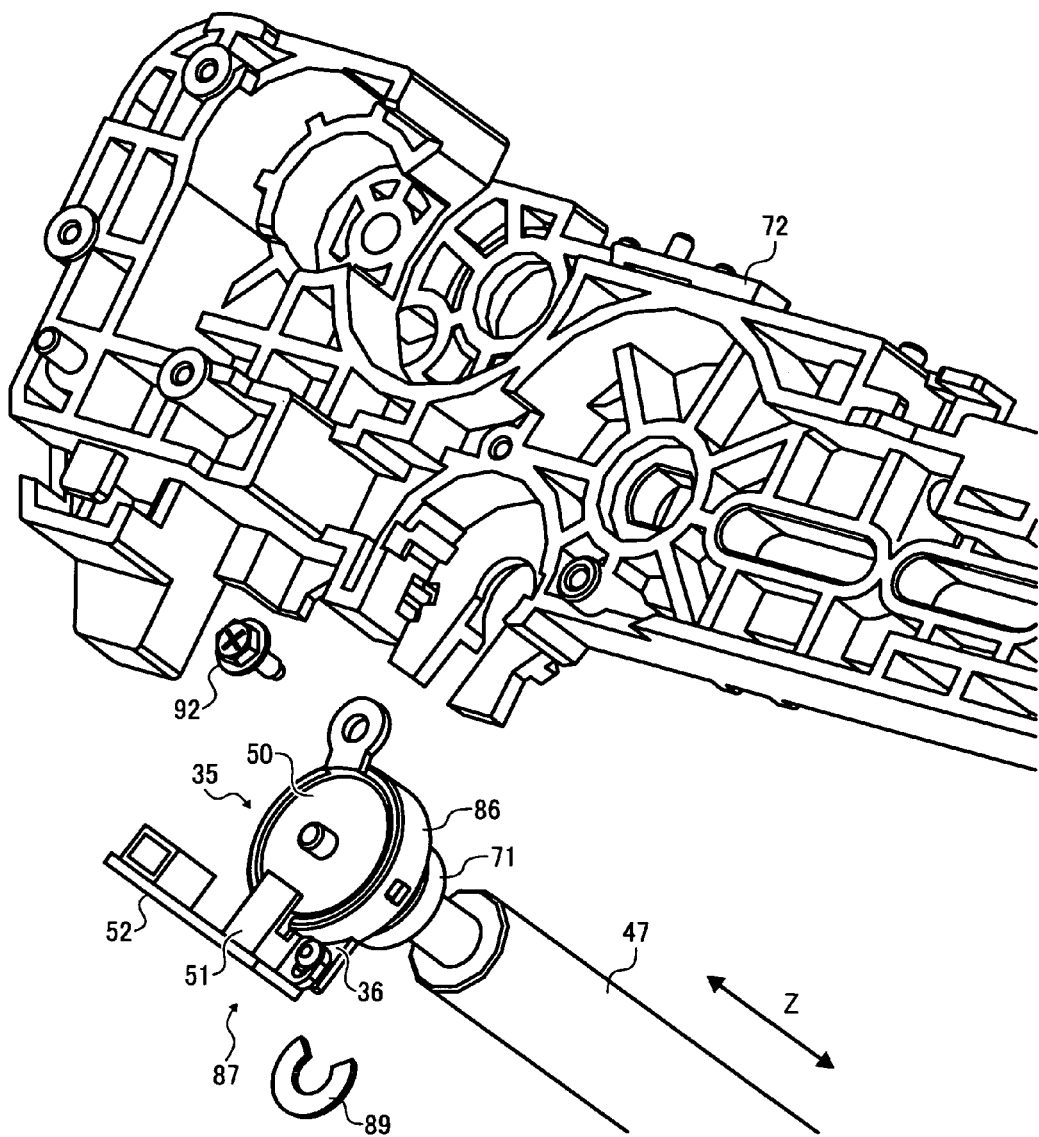
FIG. 34 is a schematic perspective view of the optical encoder illustrated in FIG. 32 in a state in which the sub-unit is not attached.
Figure 35:
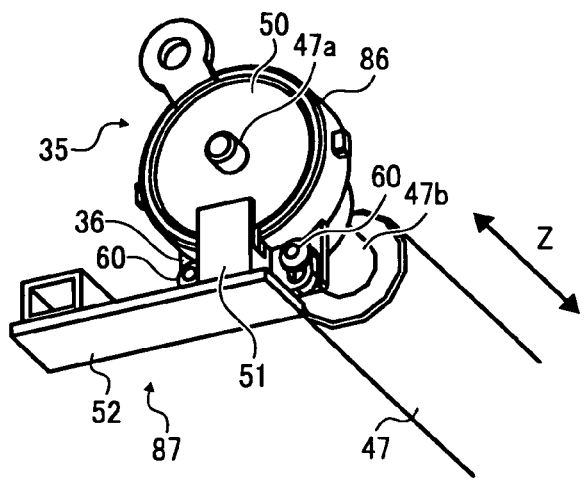
FIG. 35 is a schematic perspective view of the sensor module of the optical encoder illustrated in FIG. 34.
Figure 36:
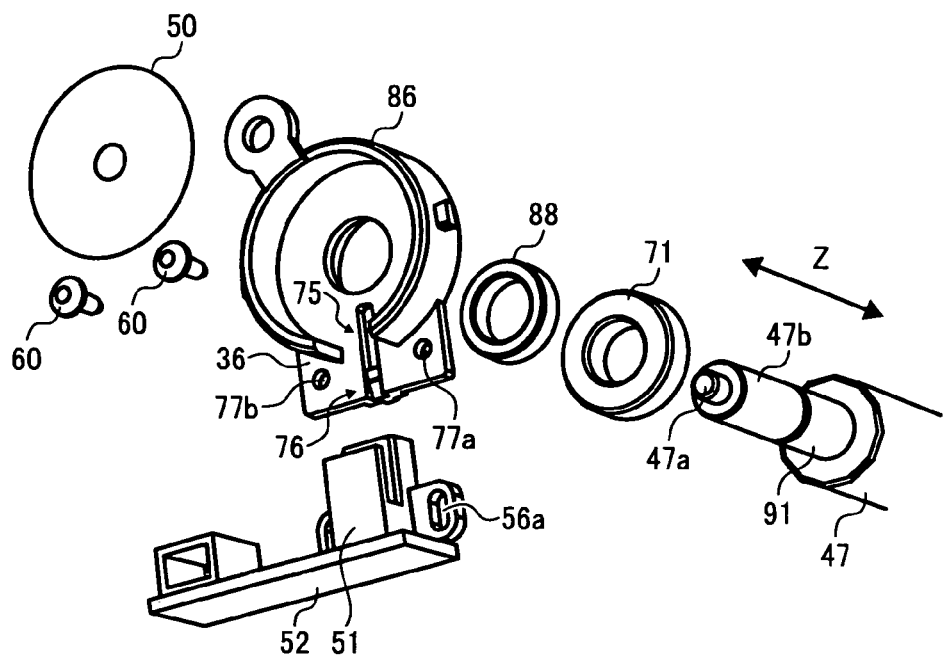
FIG. 36 is a schematic exploded view of the sensor module illustrated in FIG. 35.
Figure 37:
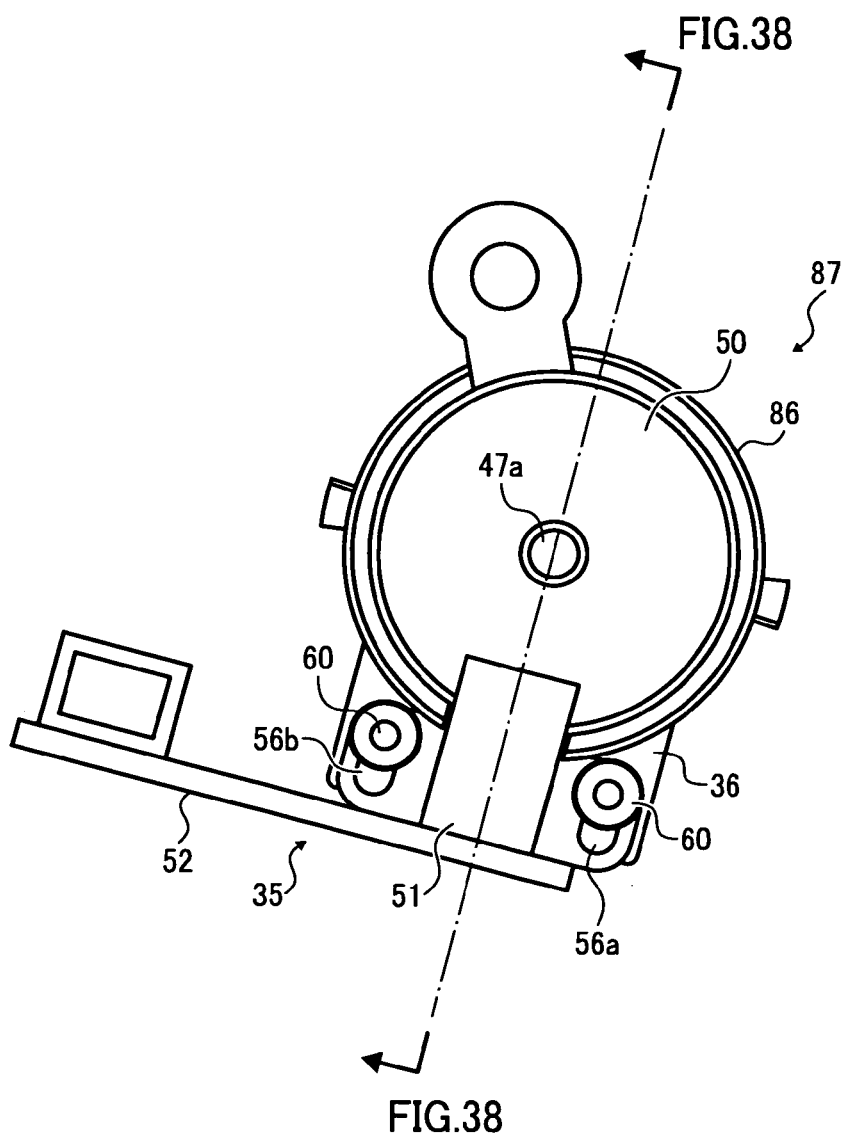
FIG. 37 is a schematic front view of the sensor module illustrated in FIG. 35.
Figure 38:
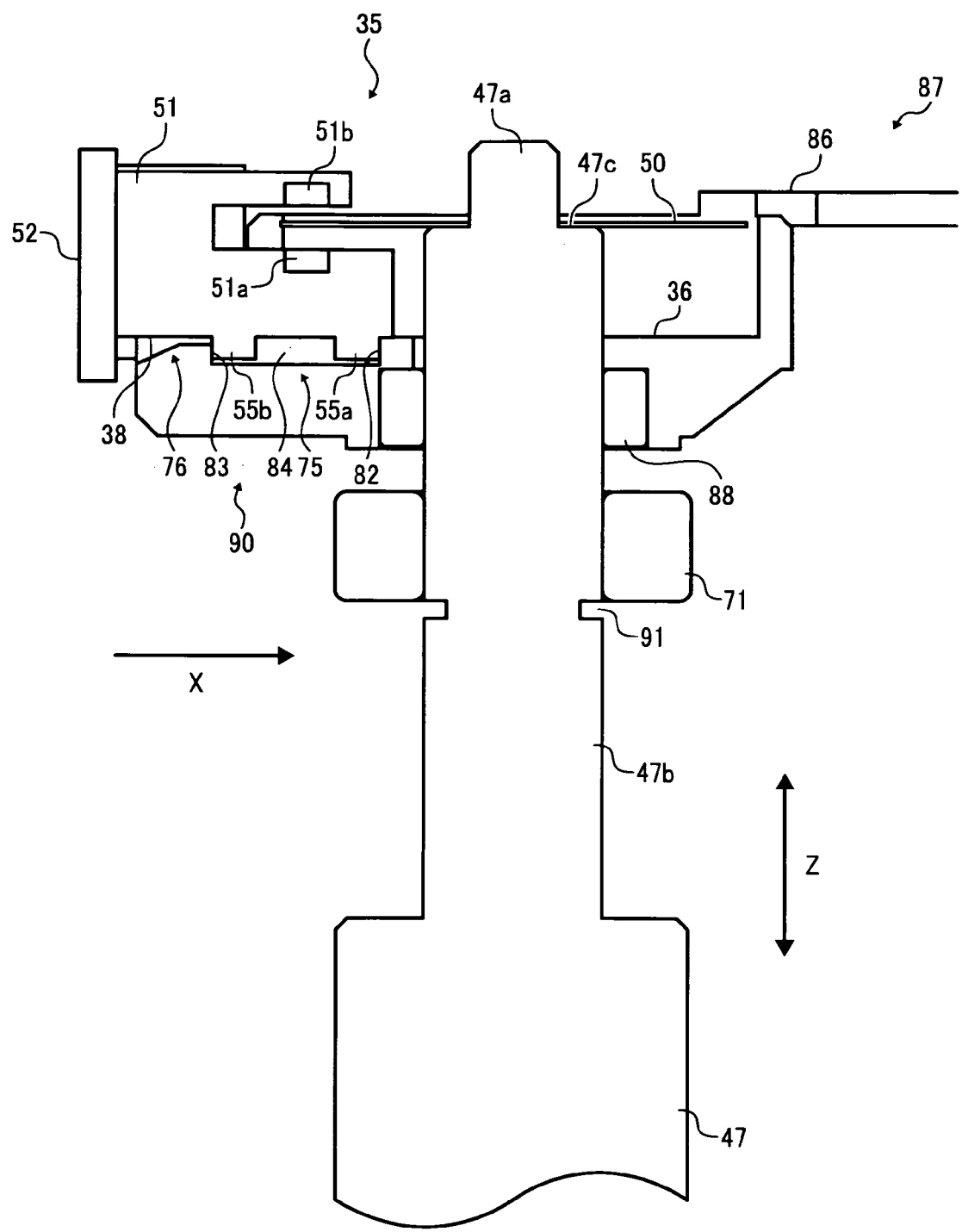
FIG. 38 is a schematic cross-sectional view of the sensor module at the cut surface illustrated by a chain line in FIG. 37.

FIGS. 32 and 33 are perspective views illustrating the optical encoder, in which the photo-sensor 51 and a sub-unit 87 have been set to the frame, when observed from the front side and the rear side, respectively. FIG. 34 is a perspective view illustrating the optical encoder, in which the photo-sensor 51 has been set but the sub-unit 87 is not yet set to the frame, when observed from the front side. FIG. 35 is a perspective view illustrating the photo-sensor 51 illustrated in FIG. 34. FIG. 36 is an exploded view illustrating the optical encoder illustrated in FIG. 35. FIG. 37 is a front view illustrating the optical encoder illustrated in FIG. 35. FIG. 38 is a cross-sectional view illustrating the optical encoder at the cut surface indicated by a chain line in FIG. 37.

In the first to third examples mentioned above, the frame 72 serves as the counter part member (i.e., the first support), on which the photo-sensor 51 is set and positioned, while serving as the support (second support) for supporting the pulse code wheel 50, the transfer belt 40 and the driven roller 47. However, in this fourth example, although the frame 72 serves as the second support for supporting the transfer belt 40 and the driven roller 47, but does not serve as the counterpart member (first support) on which the photo-sensor 51 is set and positioned. In the fourth example, a case 86 serves as the counterpart member, and the subunit 87 includes the case 86 and the photo-sensor 51, which is set to the case 86. The subunit 87 is set to the frame 72 serving as the second support.

As illustrated in FIGS. 36 and 38, the case 86 is integrated with a bearing 88, which is inserted with force into the case 86. In addition, as illustrated in FIG. 38, the second portion 47b of the driven roller 47 is inserted with force into the bearing 88. The second portion 47b is inserted into a bearing 71, but is not fixed thereto. Namely, the second portion 47b is rotatably supported by the bearing 71. The second portion 47b has a peripheral groove 91 to be engaged with a snap ring 89 (illustrated in FIG. 34).

This fourth example is the same as the first example except that instead of the frame 72, the case 86 serves as the counterpart member (i.e., the first support) and has the surface 36, to which the photo-sensor 51 is set and which has a recessed portion 75, etc.

As illustrated in FIG. 34, the subunit 87, which is prepared by attaching the photo-sensor 51 to the case 86, is inserted into the predetermined portion of the frame 72. In this regard, the bearing 71 is moved in the direction Z such that the subunit 87 acquires the predetermined position, and then bearing 71 is fixed to the frame 72 and the driven roller 47 using the snap ring 89. Further, the case 86 is fixed to the frame 72 with a screw 92. Thus, the subunit 87 is assembled.

Thus, assembling of the optical encoder 35 is performed as subassembly of the subunit 87 in the fourth example whereas assembling of the optical encoder 35 is performed as assembly of the transfer belt unit 30 in the first to third examples. Therefore, the photo-sensor setting operation, which influences the quality and precision of the optical encoder 35, can be easily performed in the fourth example.

The recessed portions 75a and 75b, and the groove 76 used for the second example, and the plate spring 85 used for the third example can be applied to the fourth example.

FIFTH EXAMPLE OF THE TRANSFER BELT

The fifth example of the transfer belt unit 30 will be explained by reference to FIGS. 39 to 42.

Figure 39:
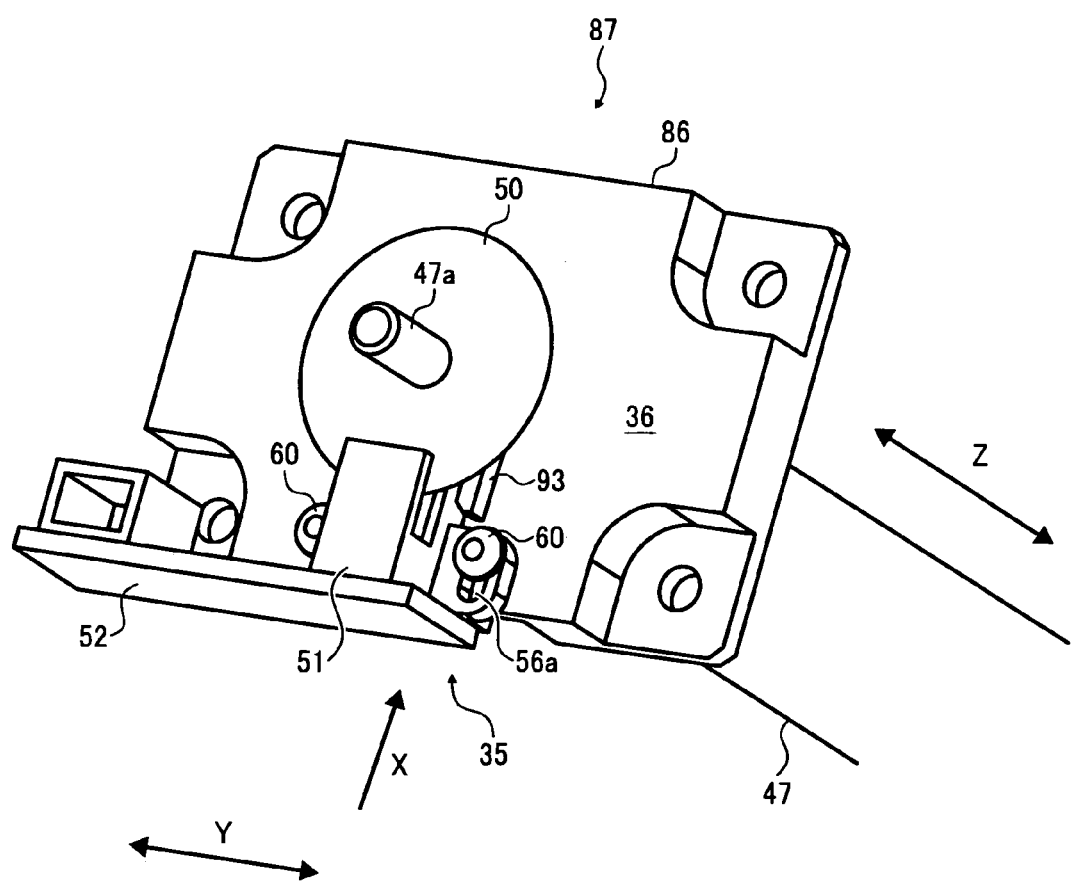
FIG. 39 is a schematic perspective view of another example of the optical encoder of the present invention.
Figure 40:
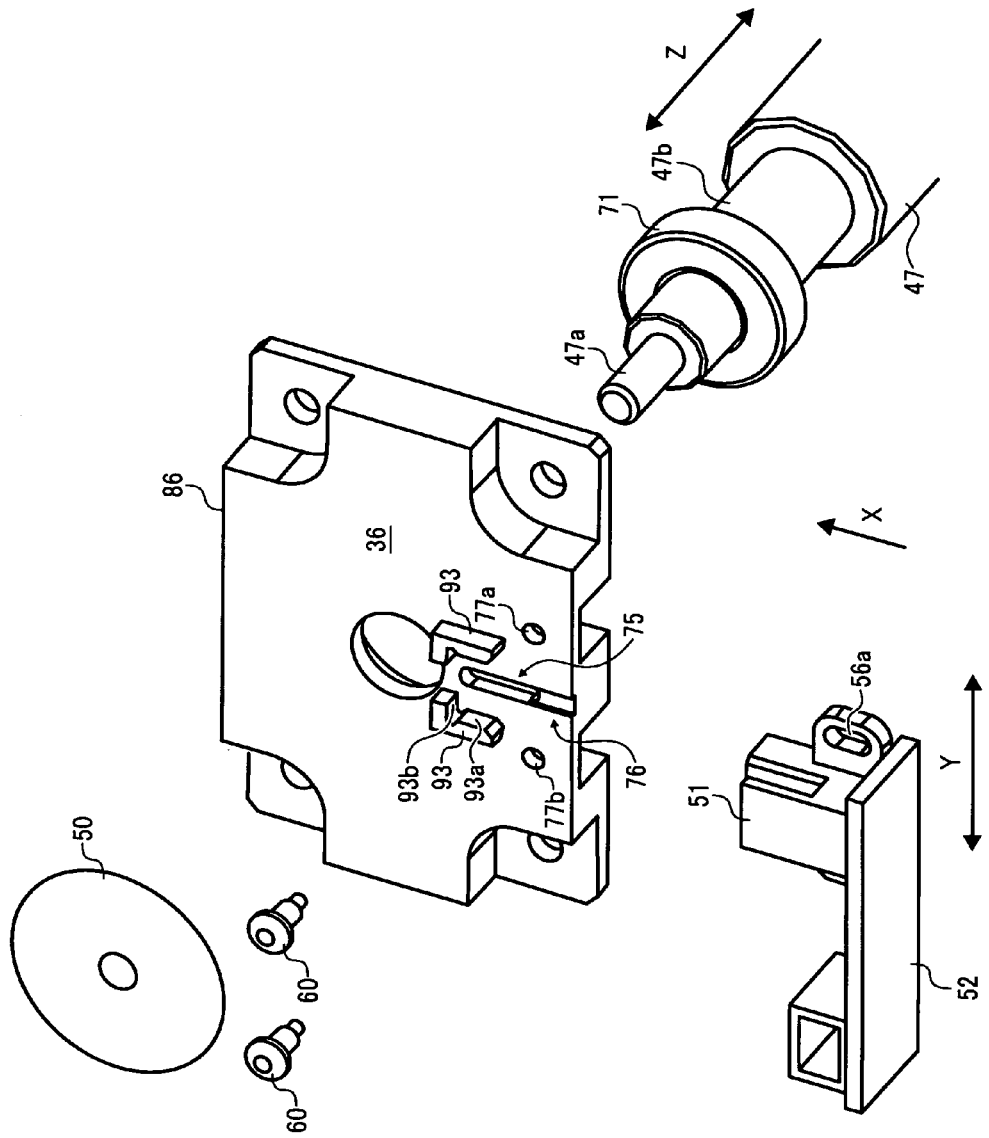
FIG. 40 is a schematic exploded view of the optical encoder illustrated in FIG. 39.
Figure 41:
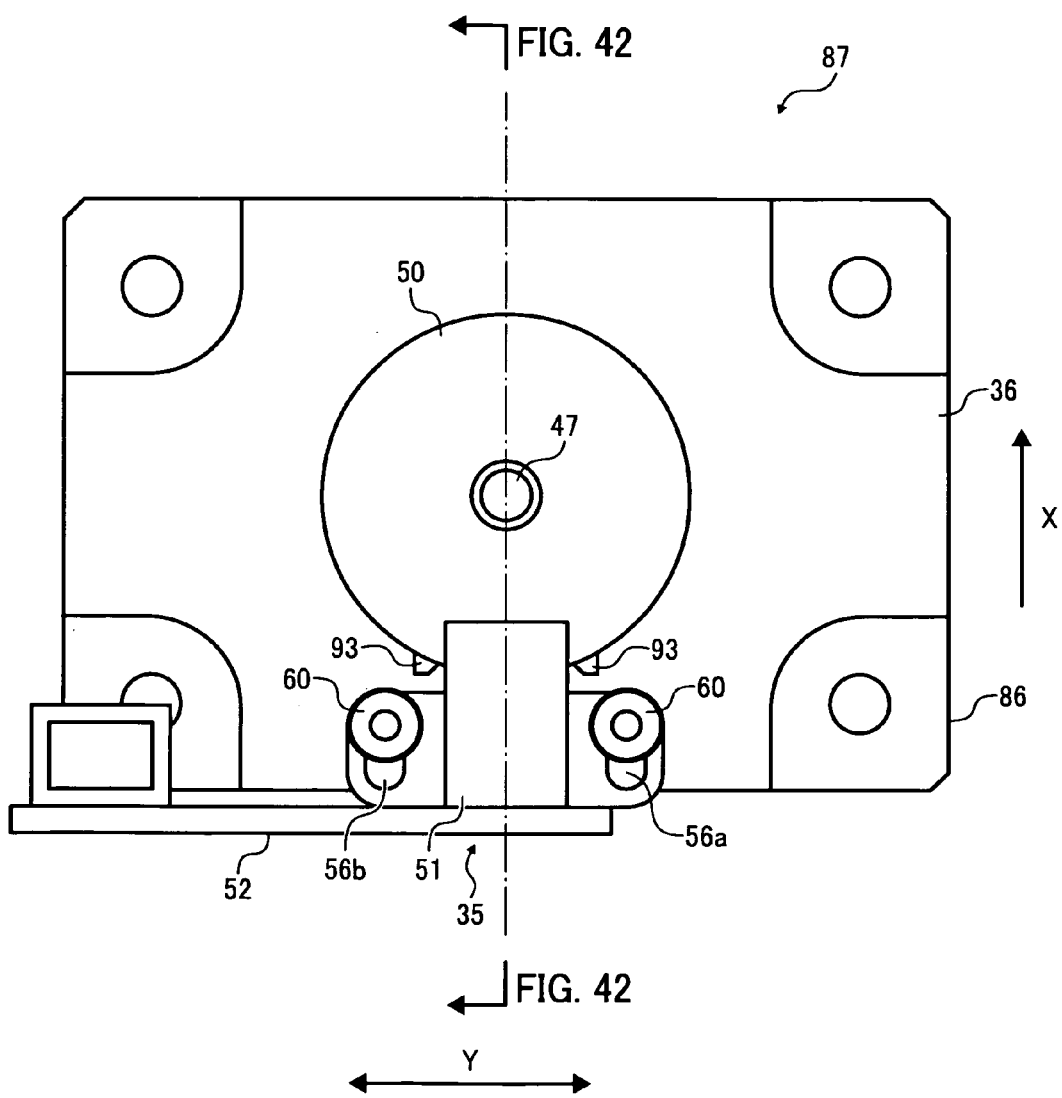
FIG. 41 is a schematic front view of the optical encoder illustrated in FIG. 39.
Figure 42:
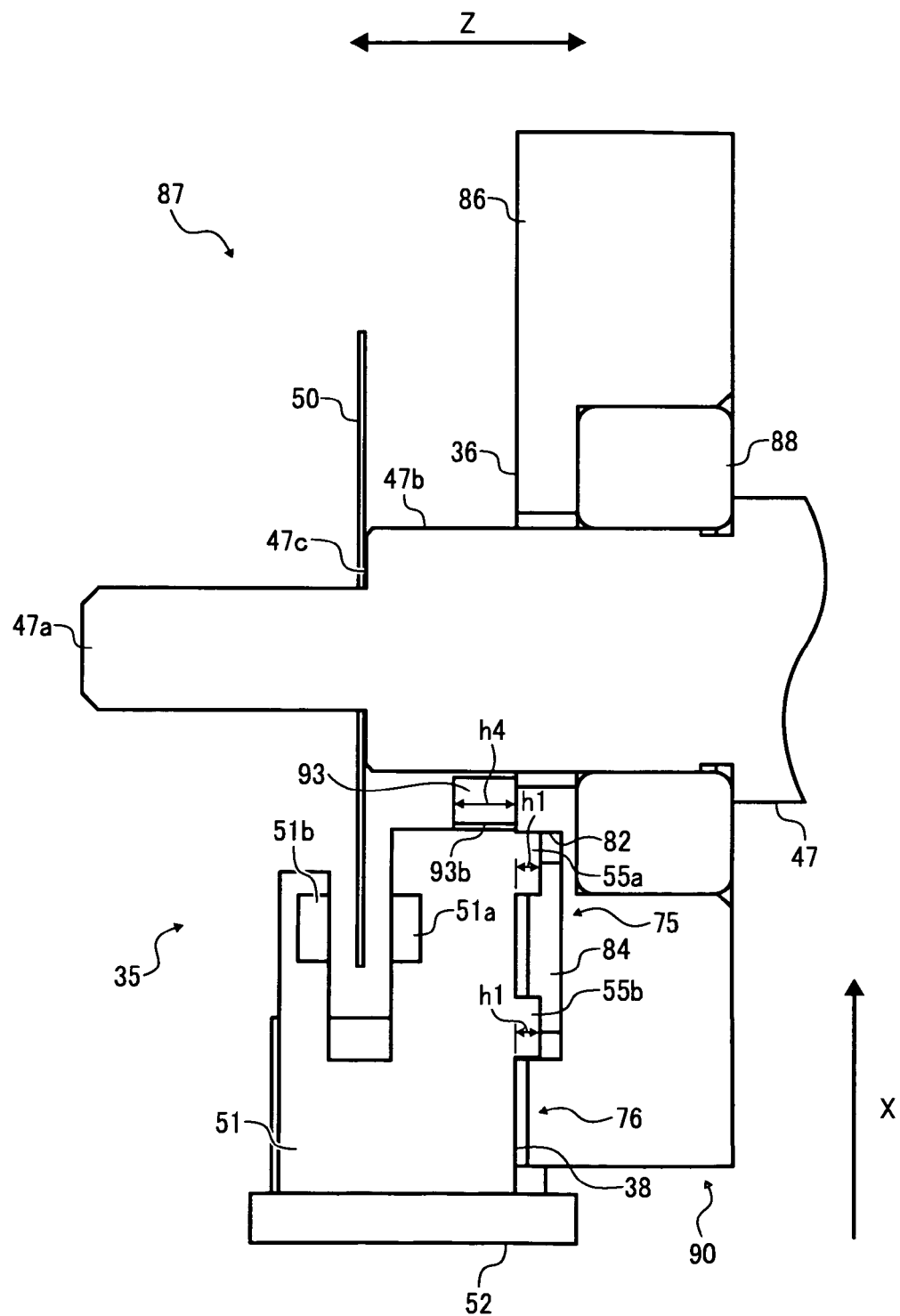
FIG. 42 is a schematic cross-sectional view of the optical encoder at the cut surface illustrated by a chain line in FIG. 41.

FIG. 39 is a perspective view illustrating the assembled optical encoder. FIGS. 40 and 41 are an exploded perspective view and a front view, respectively, which illustrate the assembled optical encoder. FIG. 42 is a cross-sectional view illustrating the optical encoder at the cut surface indicated by a chain line in FIG. 41.

As illustrated in FIG. 40, in this fifth example, the optical encoder has the case 86, which serves as a counterpart member (i.e., the first support) and which has a guide 93 for guiding the photo-sensor 51 in the direction Y, which is perpendicular to the directions X and Z.

The fifth example is the same as the fourth example except for the following points:
(1) The case has the guide 93;
(2) The way to fix the case 86 to the frame 72 is different; and
(3) The shape of the groove 76 is different from that in the fourth example, and is the same as that in the second example.

As illustrated in FIG. 42, the guide 93 projects from the surface 36 and has a height h4 greater than the height h1 of the bosses 55 (i.e., h1<h4) in the direction Z. The distance between inner walls 93a and 93a (illustrated in FIG. 40) of the guide 93 in the direction Y is almost equal to the width of the photo-sensor 51, but the entrance of the guide 93 (i.e., the upstream portion of the guide 93 relative to the direction X) has a greater distance than the other portions of the guide 93. Specifically, as illustrated in FIG. 40, the inner walls 93a and 93a of the guide 93 are slanted at the entrance thereof such that the entrance is widened.

As illustrated in FIG. 40, the guide 93 has a surface 93b at a downstream end thereof in the direction X. As illustrated in FIG. 42, the surface 93b is opposed to an end of the photo-sensor 51. The surface 93b is located on a downstream side from the end of the wall 82 and the distance therebetween is about 1 mm.

When the photo-sensor 51 is moved in the direction X to set the photo-sensor to the predetermined position, it is necessary for the groove 76 to guide the bosses 55a and 55b. In this operation, it is not easy to visually determine whether the bosses 55 are guided by the groove 76 or the bosses are moved on the surface 36 without guided by the groove. Namely, in the first to fourth examples, whether or not the bosses 55 are guided by the groove 76 is mainly determined by feeling of hands performing the moving operation. If the photo-sensor 51 is moved in the direction X while the bosses 55 are not guided by the groove 76, the problem in that the photo-sensor 51 hits and damages the pulse code wheel 50 can occur.

In order to avoid the problem, the guide 93 is provided in the fifth example. Specifically, when the photo-sensor 51 is moved in the direction X while the bosses 55 are not guided by the groove 76, the photo-sensor is stopped by the guide 93, thereby preventing occurrence of the problem. In addition, since the height h4 of the guide 93 is greater than the height h1 of the bosses 55, movement of the photo-sensor can be securely stopped.

In addition, the entrance of the guide 93 is widened as mentioned above. Therefore, when the bosses 55 are moved while slightly deviated from the groove 76, the position of the bosses in the direction Y can be adjusted by the entrance of the guide 93, and thereby the bosses can be securely guided by the groove 76. Thus, the bosses 55 can be securely engaged with the recessed portion 84 and thereby the photo-sensor 51 can be securely set to the predetermined position of the case 86.

When the photo-sensor 51 is moved in the direction X while the bosses 55 are guided by the groove 76, the end potions of the photo-sensor in the direction Y are guided by the inner walls 93a and 93a of the guide 93. When the photo-sensor is further moved in the direction X, the photo-sensor is moved to a position at which the bosses 55 can be engaged with the recessed portion 75. In this regard, excessive movement of the photo-sensor in the direction X is stopped by the surface 93b, thereby preventing occurrence of the problem in that the photo-sensor 51 hits and damages the pulse code wheel 50.

Thus, whether the photo-sensor 51 is guided by the guide 93 can be easily determined visually. Therefore, the state in which the bosses 55 are guided by the groove 76 can be securely maintained.

When the bosses 55 are engaged with the recessed portion 75 and thereby the photo-sensor 51 acquires the predetermined position, a gap of about 1 mm is formed between the tip of the photo-sensor 51 and the surface 93b, i.e., the tip of the photo-sensor 51 is not contacted with the surface 93b, due to the distance between the surface 93b and the end wall 82 of the recessed portion 75. This is sometimes called "rough guide." "Rough guide" is advantageous for the operation in which the photo-sensor 51 is set to the predetermined position with high precision by engaging the bosses 55 with the recessed portion 75.

Figure 43:
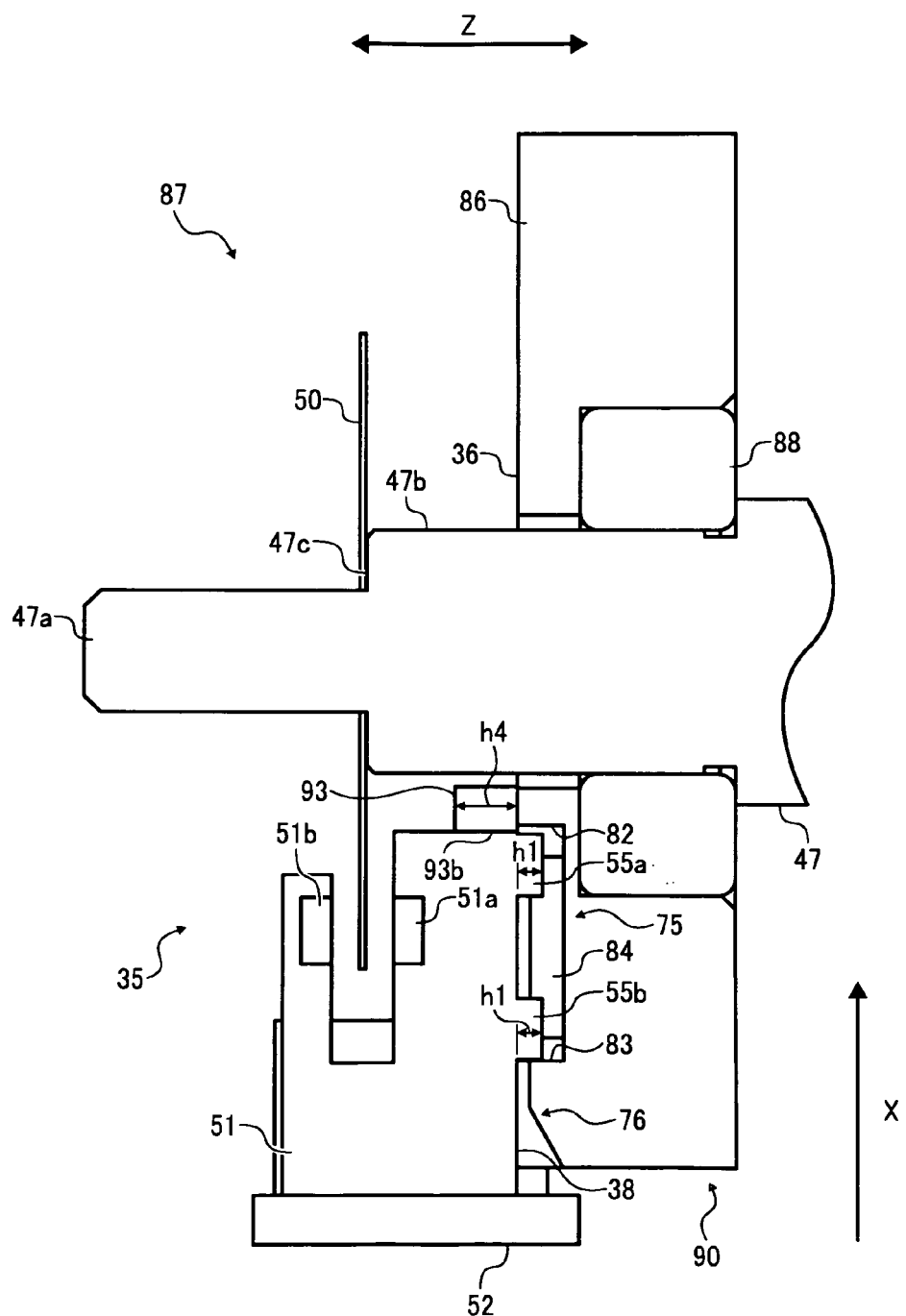
FIG. 43 is a schematic cross-sectional view of a modified version of the optical encoder illustrated in FIG. 42.

In FIG. 43, the surface 93b is located on an upstream side from the surface 82 by about 1 mm relative to the direction X unlike the rough guide case illustrated in FIG. 42. Therefore, when the bosses 55 are engaged with the recessed portion 75 and the photo-sensor 51 acquires the predetermined position, the tip of the photo-sensor 51 is contacted with the surface 93b and is not contacted with the surface 82 of the recessed portion 75 (the distance therebetween is about 1 mm). In this case, when the photo-sensor 51 is moved in the direction X and the tip of the photo-sensor is contacted with the surface 93b, the bosses 55 can be engaged with the recessed portion 75. Since it is not necessary to confirm that the bosses 55 are engageable with the recessed portion 75, the photo-sensor setting operation can be performed with great efficiency.

In this fifth example, the photo-sensor 51 is a subunit. However, it is not essential. In addition, the groove 76 used for the first example, the recessed portions 75a and 75b used for the second example, and the plate spring 85 used for the third example can be applied to the fifth example.

Hereinbefore, the sensor module for optical encoders, the optical encoder, the moving speed controlling device using the sensor module, the transfer device using the moving speed controlling device, the image forming apparatus using the transfer device, and the method for preparing the optical encoder have been explained by reference to several examples. However, the present invention is not limited thereto, and additional modifications and variations of the present invention are possible.

For example, the optical encoder is not limited to a rotary encoder type optical encoder, and can be a linear encoder type optical encoder. Such a linear encoder type optical encoder is used for inkjet-recording type image forming apparatus. Specifically, such image forming apparatus have an inkjet recording device, a mechanism of reciprocating the inkjet recording device, and a linear encoder type optical encoder for moving the inkjet recording device at a predetermined speed.

Figure 44:
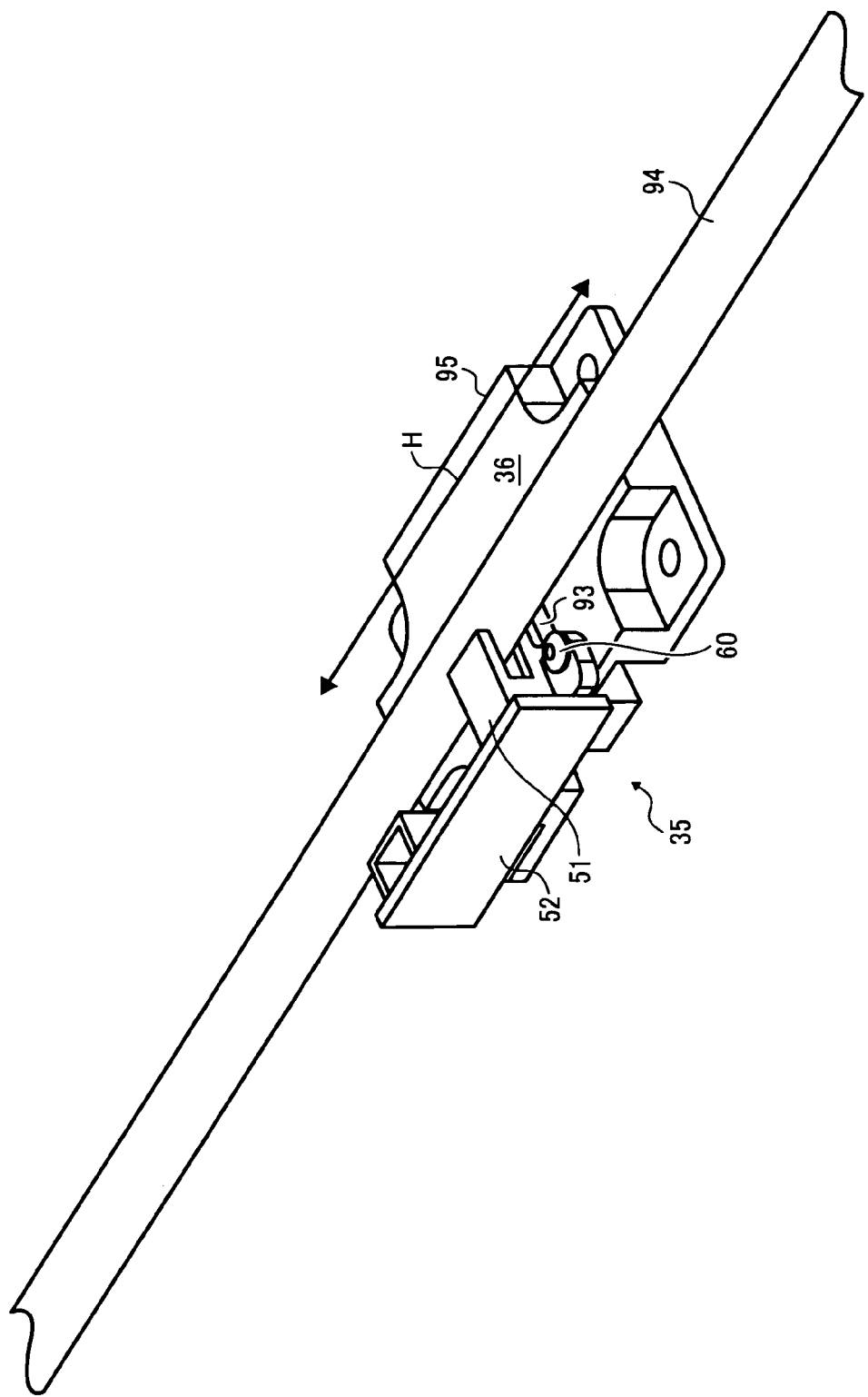
FIG. 44 is a schematic perspective view of another example of the optical encoder having a different shade member.
Figure 45:
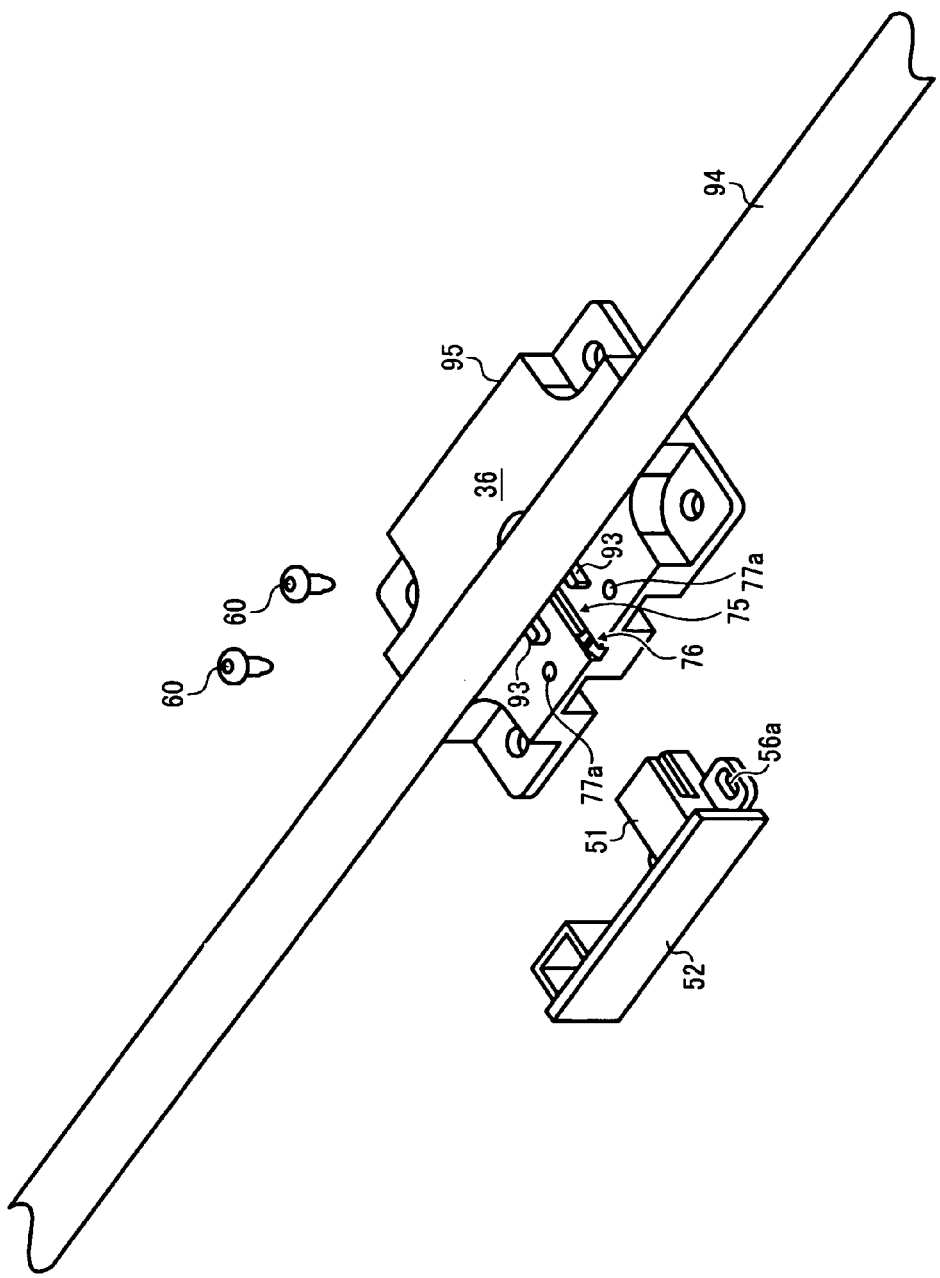
FIG. 45 is a schematic exploded view of the optical encoder illustrated in FIG. 44.

Linear encoder type optical encoders are almost the same as rotary encoder type optical encoders except that the linear encoder type optical encoders have a linear scale 94 as illustrated in FIGS. 44 and 45 whereas the rotary encoder type optical encoders have a pulse code wheel (such as the pulse code wheel 50). Therefore, the linear scale 94 will be mainly explained below, and explanation of the other members will be omitted.

The linear scale 94 has a shading pattern (not shown in FIGS. 44 and 45) like the black portions 50a formed on the pulse code wheel 50. Similarly to the pulse code wheel 50, the linear scale 94 moves through the space formed between the light emitting member and the light receiving member of the sensor module, and the light emitted from the light emitting member toward the light receiving member is blocked by the shading pattern. Namely, the linear scale 94 serves as a shade member.

As illustrated in FIG. 44, the linear scale 94 extends in a direction H, and is fixed to a frame (not shown) of the image forming apparatus. The photo-sensor 51 is set to a case 95, which corresponds to the frame 72 or the case 86 and serves as a counterpart member (i.e., the first support) of the photo-sensor. The case 95 is moved together with the photo-sensor 51 while the linear scale 94 is fixed. In this regard, the case 95 and the inkjet recording device moved together with the case are the moving members whose moving speed should be controlled.

Figure 46:
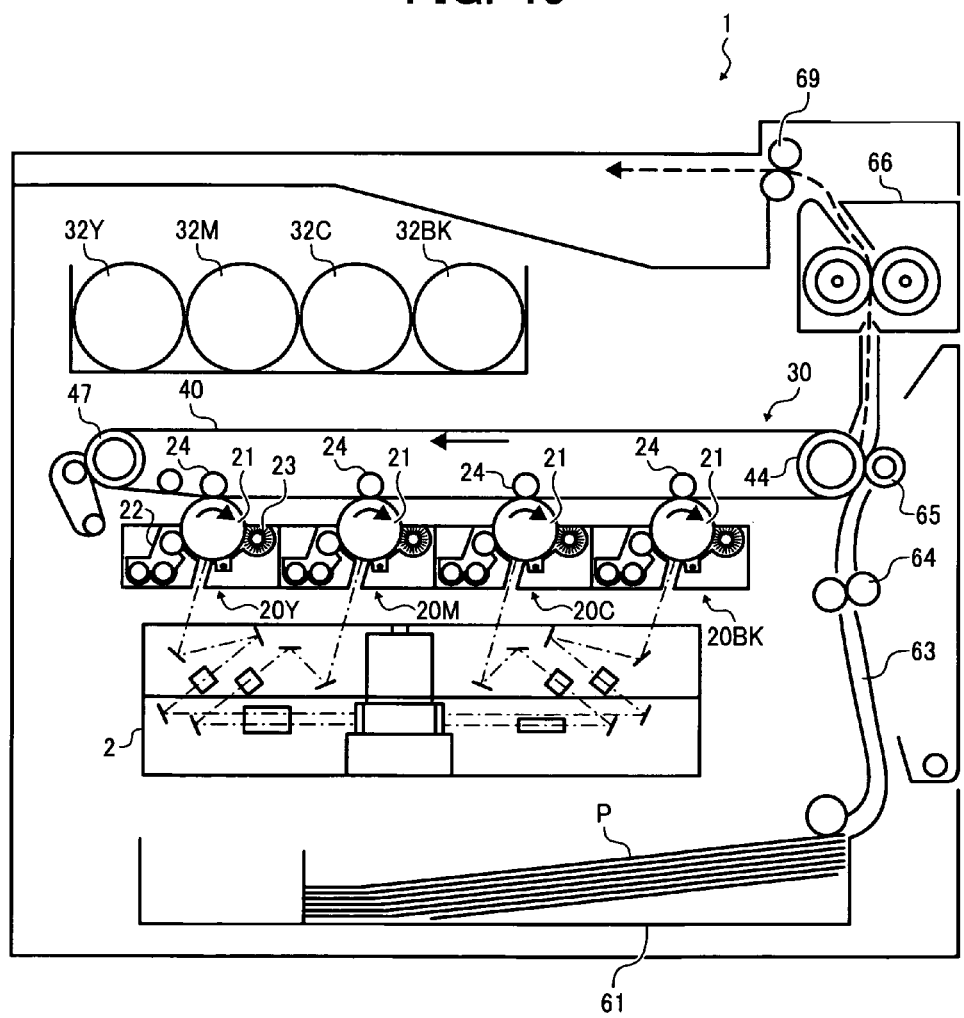
FIG. 46 is a schematic front view of another example of the image forming apparatus of the present invention.

The structure of the image forming apparatus of the present invention is not limited to the structure illustrated in FIG. 9, and image forming apparatus having such a structure as illustrated in FIG. 46 can also be used. In FIG. 46, the like reference characters designate like corresponding parts in FIG. 9. Therefore explanation of the same parts will be omitted.

In the image forming apparatus 1 illustrated in FIG. 9, color toner images formed on the photoreceptor drums 21 are transferred one by one to the receiving material sheet P fed by the transfer belt 40 at the transfer positions where the transfer rollers 24 press the transfer belt. In contrast, in the image forming apparatus illustrated in FIG. 46, color toner images formed on the photoreceptor drums 21 are transferred one by one to the transfer belt 40 by the transfer rollers 24 to form a combined color toner image on the transfer belt. On the other hand, the receiving material sheet P fed from the receiving material storing/feeding device 61 is guided to the registration roller 64 by the guide 63. The receiving material sheet P is timely fed to a secondary transfer nip formed by a secondary transfer roller 65 and the transfer belt 40. The combined color toner image on the transfer belt 40 is transferred to the receiving material sheet P at the transfer nip. Thus, the image transfer method of the image forming apparatus illustrated in FIG. 46 is different from the method of the image forming apparatus illustrated in FIG. 9.

In the image forming apparatus illustrated in FIG. 46, the moving member whose moving speed should be detected and controlled is the transfer belt 40 and the driven roller 47 similarly to the image forming apparatus illustrated in FIG. 9.

The present invention can be applied to any moving members which are driven to rotate or move, such as belt members (e.g., transfer belts), and drum members (e.g., photoreceptor drums).

The recessed portion is not limited to the recessed portions 75, 75a and 75b, and may be through-holes such as cylindrical through-holes.

The groove is not limited to the groove 76, and may be a groove whose end does not reach the edge of the counterpart member (i.e., the first support) such as the frame 72 and case 86.

The number of the bosses (and the corresponding recessed portions) may be three or more.

The shape of the bosses is not limited to the circular shape, and noncircular shapes such as elliptical shapes including the prolate ellipsoid shape of the recessed portion 75.

The above-mentioned sensor module for optical encoders, the optical encoder, the moving speed controlling device using the sensor module, and the transfer device using the moving speed controlling device can be used for apparatus other than image forming apparatus.

As mentioned above, by using the present invention, a sensor module can be set to a predetermined position with high precision without damaging the shade member (such as pulse code wheel). In addition, even when the sensor module (optical encoder) is used for a long period of time while receiving external forces such as vibration of the apparatus, the sensor module (optical encoder) can maintain the position. In addition, the optical encoder can be easily assembled.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2007-171122, filed on Jun. 28, 2007, the entire contents of which are herein incorporated by reference.

What is claimed is:

1. An optical encoder for detecting a speed of a moving member, comprising:
   a sensor module including:
      a light emitting member configured to emit light,
      a light receiving member opposed to the light emitting member in a first direction to receive the light emitted from the light emitting member, and
      at least one boss;
   a shade member having a shading pattern, which has a light shielding portion and a light transmitting portion and which is located between the light emitting member and the light receiving member to block the light, wherein one of the sensor module and the shade member moves together with the moving member so that the sensor module detects the speed of the moving member; and
   a first support configured to support the sensor module, including:
      at least one recessed portion, which is engaged with the at least one boss to support the sensor module, and
      a guide groove, which is connected with the at least one recessed portion and which extends in a second direction,
   wherein the sensor module is attached to the first support by being moved in the second direction while the at least one boss is guided by the guide groove, and
   wherein the at least one recessed portion has a depth in the first direction greater than a height of the at least one boss, and at least a portion of the guide groove adjacent to the recessed portion has a depth in the first direction less than the height of the at least one boss.

2. The optical encoder according to claim 1, wherein the groove extends from the recessed portion to an edge of the first support.

3. The optical encoder according to claim 1, wherein the groove has a slanting bottom surface, which slants such that the depth of the groove decreases toward the recessed portion.

4. The optical encoder according to claim 3, wherein the groove further has a flat bottom surface, which is connected with the recessed portion, and a curved bottom surface, which is a convex surface and which is connected with the slanting bottom surface and the flat surface.

5. The optical encoder according to claim 1, wherein the sensor module has plural bosses, and the first support has plural recessed portions, and wherein a number of the plural bosses is equal to a number of the plural recessed portions.

6. The optical encoder according to claim 1, further comprising:
   a pressing member configured to press the sensor module in the first direction so that the at least one boss is engaged with the at least one recessed portion.

7. The optical encoder according to claim 6, wherein the pressing member is not overlapped with the shade member when observed from the first direction.

8. The optical encoder according to claim 1, wherein the first support further includes a guide configured to guide the sensor module in a third direction perpendicular to each of the first and second directions.

9. The optical encoder according to claim 8, wherein the guide has a height greater than the height of the at least one boss.

10. The optical encoder according to claim 1, wherein the first support further supports the shade member.

11. The optical encoder according to claim 1, further comprising:
   a second support configured to support the shade member, wherein the first support and the sensor module set on the first support constitutes a subunit, and wherein the subunit is set on the second support.

12. A moving speed controlling device for controlling a speed of a moving member, comprising:
   the optical encoder according to claim 1 configured to detect the speed of the moving member; and
   a controller configured to control the speed of the moving member according to a detection result of the optical encoder.

13. An apparatus comprising:
   a moving member;
   the moving speed controlling device according to claim 12 configured to control a speed of the moving member; and
   a second support configured to support the shade member of the optical encoder of the moving speed controlling device.

14. The apparatus according to claim 13, wherein the first support serves as the second support.

15. The apparatus according to claim 13, wherein the first support and the sensor module set on the first support constitutes a subunit, and wherein the subunit is set on the second support.

16. A method for preparing the optical encoder according to claim 1, comprising:
   setting the shade member;
   moving the sensor module in the second direction while pressing the sensor module in the first direction so that the at least one boss is engaged with the at least one recessed portion after sliding on the groove and the shade member enters into a space formed by the light emitting member and the light receiving member of the sensor module; and
   fixing the sensor module to the first support.

* * * * *